US009250768B2

(12) United States Patent
Kim

(10) Patent No.: US 9,250,768 B2
(45) Date of Patent: Feb. 2, 2016

(54) TABLET HAVING USER INTERFACE

(71) Applicant: Samsung Electronics Co., Ltd., Suwon-si (KR)

(72) Inventor: Hyun Woo Kim, Seoul (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 179 days.

(21) Appl. No.: 13/761,546

(22) Filed: Feb. 7, 2013

(65) Prior Publication Data
US 2013/0212535 A1    Aug. 15, 2013

(30) Foreign Application Priority Data

Feb. 13, 2012  (KR) .................. 10-2012-0014171
Apr. 9, 2012   (KR) .................. 10-2012-0036777

(51) Int. Cl.
G06F 3/0482    (2013.01)
G06F 3/0484    (2013.01)
G06F 3/0488    (2013.01)

(52) U.S. Cl.
CPC ............ G06F 3/0482 (2013.01); G06F 3/0484 (2013.01); G06F 3/04883 (2013.01); G06F 3/04886 (2013.01)

(58) Field of Classification Search
CPC combination set(s) only.
See application file for complete search history.

(56) References Cited

U.S. PATENT DOCUMENTS

| 5,249,263 | A  | * | 9/1993  | Yanker ............... G06F 3/04845 345/594 |
| 5,581,670 | A  | * | 12/1996 | Bier ..................... G06F 3/0481 345/629 |
| 5,731,801 | A  | * | 3/1998  | Fukuzaki ....................... 715/842 |
| 5,796,866 | A  | * | 8/1998  | Sakurai et al. ................ 382/187 |
| 6,011,542 | A  | * | 1/2000  | Durrani et al. ............... 345/156 |
| 6,252,597 | B1 | * | 6/2001  | Lokuge .................. G06F 3/0481 715/841 |
| 6,337,698 | B1 |   | 1/2002  | Keely, Jr. et al. |
| 7,058,902 | B2 | * | 6/2006  | Iwema et al. .................. 715/810 |
| 7,385,592 | B2 | * | 6/2008  | Collins ......................... 345/173 |
| 8,402,391 | B1 | * | 3/2013  | Doray et al. ................... 715/834 |
| 2002/0097277 | A1 | * | 7/2002 | Pitroda .......................... 345/854 |
| 2002/0122158 | A1 | * | 9/2002 | Miyashita et al. ............. 353/30 |
| 2003/0020687 | A1 | * | 1/2003 | Sowden et al. ............... 345/157 |
| 2004/0212617 | A1 | * | 10/2004 | Fitzmaurice et al. ......... 345/440 |
| 2005/0088418 | A1 |   | 4/2005  | Nguyen |

(Continued)

FOREIGN PATENT DOCUMENTS

| JP | 2007-179502 | 7/2007 |
| JP | 2009-169820 | 7/2009 |
| JP | 2010-154090 | 7/2010 |

OTHER PUBLICATIONS

International Search Report mailed May 15, 2013 issued in International Patent Application No. PCT/KR2013/001022.

Primary Examiner — Phenuel Salomon
(74) Attorney, Agent, or Firm — Staas & Halsey LLP

(57) ABSTRACT

A tablet may include a display to display information and to receive information, and a controller to control the display to display a user interface on the left of a display area of the display in a right-hand user mode in which the information is input using a right hand and to control the display to display the user interface on the right of the display area in a left-hand user mode in which the information is input using a left hand.

20 Claims, 55 Drawing Sheets

(56) References Cited

U.S. PATENT DOCUMENTS

| | | | |
|---|---|---|---|
| 2006/0022953 A1* | 2/2006 | Franttila | G06F 3/04886 345/173 |
| 2006/0143577 A1* | 6/2006 | Hsieh | G06F 3/0482 715/815 |
| 2006/0197750 A1 | 9/2006 | Kerr et al. | |
| 2007/0216660 A1* | 9/2007 | Sposato et al. | 345/173 |
| 2009/0254839 A1* | 10/2009 | Kripalani et al. | 715/753 |
| 2009/0309956 A1* | 12/2009 | Hawkins et al. | 348/14.08 |
| 2010/0310136 A1* | 12/2010 | Tsuda | G06F 1/1626 382/124 |
| 2011/0032424 A1 | 2/2011 | Vanduyn et al. | |
| 2011/0093890 A1* | 4/2011 | Araki | H01R 13/6461 725/37 |
| 2012/0036480 A1* | 2/2012 | Warner | G06F 3/04847 715/833 |

* cited by examiner

FIG. 10
| NAME | SHAPE |
|---|---|
| TAP |  |
| DRAG |  |
| FLICKING |  |
| ZOOM-IN |  |
| ZOOM-OUT | 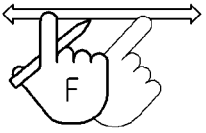 |
| PRESS |  |
| WRITING/DRAWING |  |

FIG.13
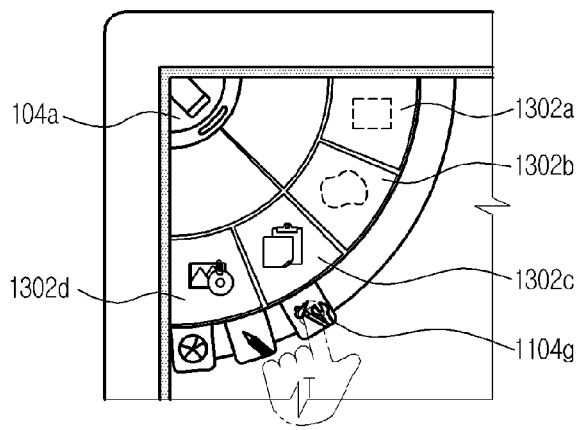
(A)
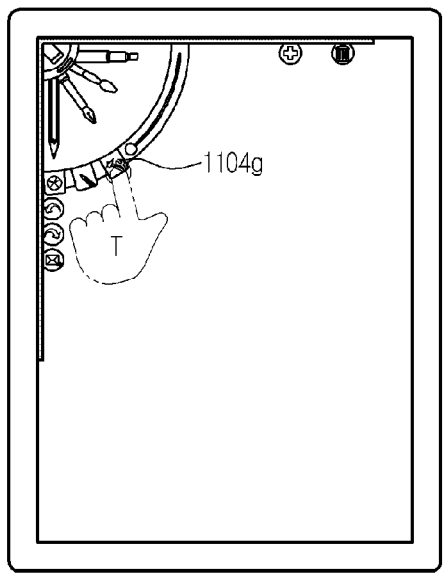
(B)
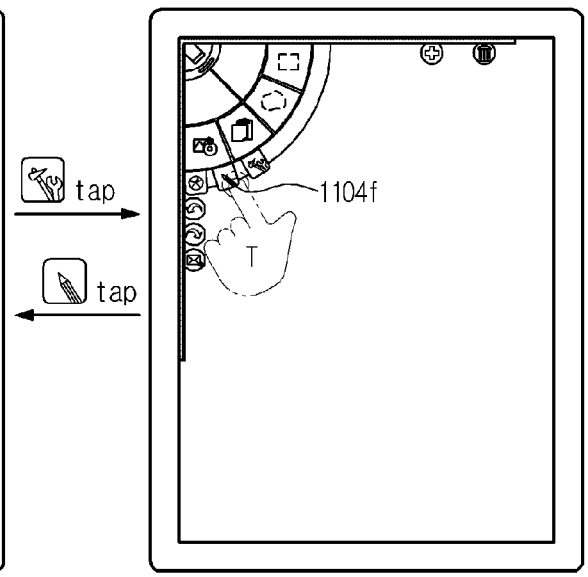
(C)

FIG. 24
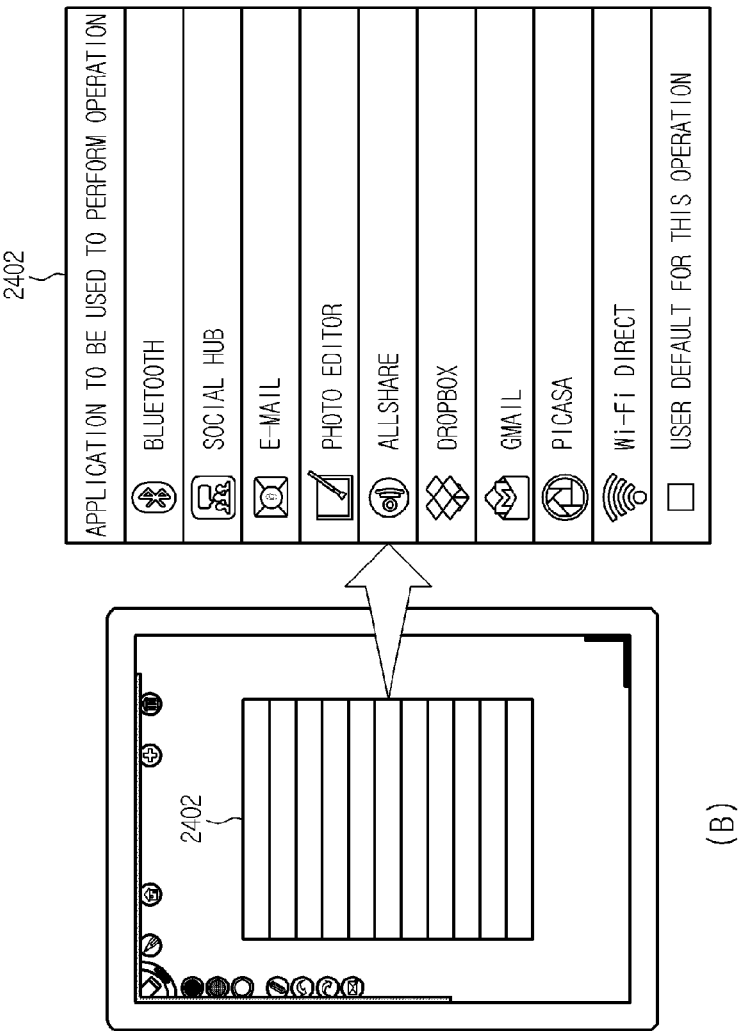
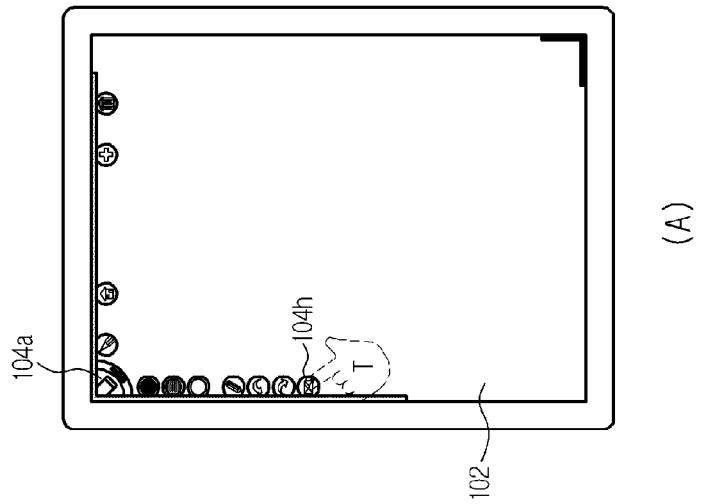

FIG. 40
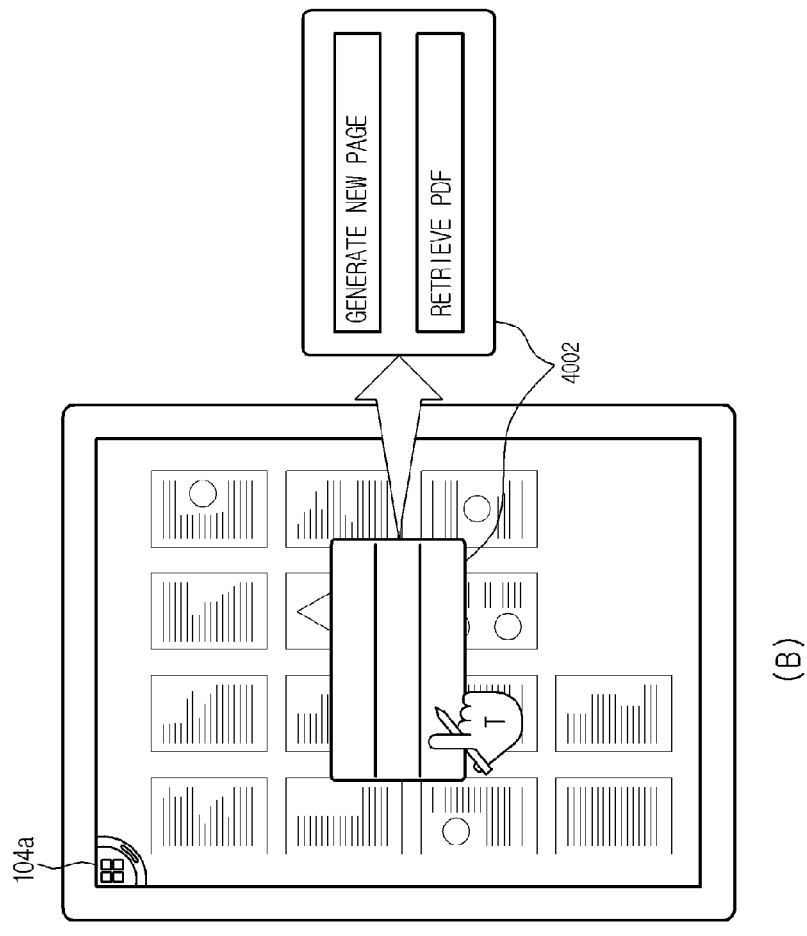
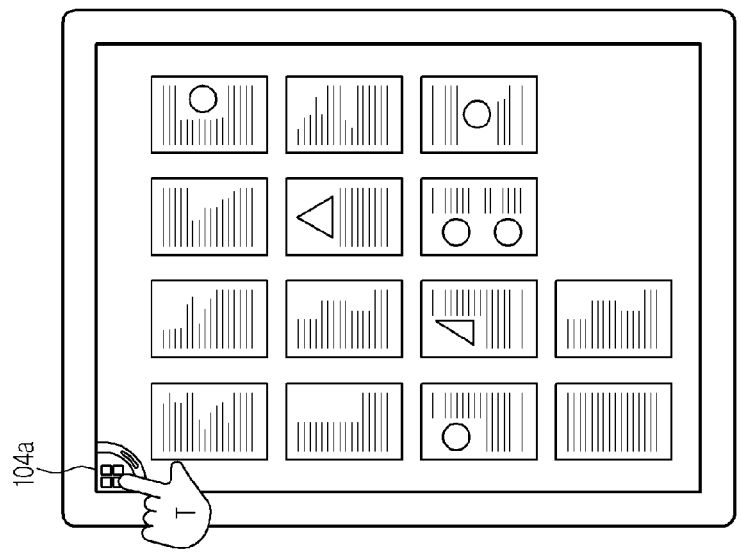

TABLET HAVING USER INTERFACE

CROSS-REFERENCE TO RELATED APPLICATIONS

This application claims the priority benefit of Korean Patent Application No. 2012-14171, filed on Feb. 13, 2012 and Korean Patent Application No. 2012-36777, filed on Apr. 9, 2012 in the Korean Intellectual Property Office, the disclosure of which is incorporated herein by reference.

BACKGROUND

1. Field

Embodiments relate to a portable electronic apparatus, and more particularly, to a tablet having a display, which can receive pen-based input or touch-based input while displaying information on the display.

A tablet refers to a device including a display to which pen/stylus/touch based input can be applied. Accordingly, various types of devices can be included in the category of the tablet if a pen/stylus/touch based input can be applied to a display of the device even though the actual name of the device is different from tablet. For example, a mobile phone, a smart pad, a web pad, a multimedia device, a monitor, a game console, etc. which have touch screen displays through which pen/stylus/touch based input can be applied can be included in the category of the tablet.

2. Description of the Related Art

In a computing field, pen/stylus/touch based input has come into widespread use as mobile computing devices such as smart pads, smartphones, etc. have come into widespread use. It is possible to write letters or draw pictures on the smart pad and smartphone through pen/stylus/touch based input. This function is widely used for students to take notes in a lecture or for office workers to record content of a conference, for example.

When a user wants to manipulate a menu (i.e. user interface) during writing or drawing through pen/stylus/touch based input, the user has to move their hands to manipulate the menu and then resume the writing or drawing work. Accordingly, continuity of the writing or drawing work is not secured and work efficiency is deteriorated.

SUMMARY

In an aspect of one or more embodiments to easily manipulate a user interface without sacrificing continuity of input operation when applying pen/stylus/touch based input to a tablet.

In accordance with an aspect of one or more embodiments, there is provided a tablet including: a display to display information and to receive information; and a controller to control the display to display a user interface on the left of a display area of the display in a right-hand user mode in which the information is input using a right hand and to control the display to display the user interface on the right of the display area in a left-hand user mode in which the information is input using a left hand.

The information may be input according to at least one of pen-based input and touch-based input.

The tablet may further include a bezel to support the display, wherein at least two proximity sensors for sensing approach of the right hand and the left hand are provided to the bezel.

The at least two proximity sensors may sense whether the right hand and the left hand approach and approach directions of the right hand and the left hand.

The controller may receive an external input for deactivating the at least two proximity sensors, deactivate the at least two proximity sensors in response to the external input, receive an external input for selecting one of the right-hand user mode and the left-hand user mode, and set an operation mode to one of the right-hand user mode and the left-hand user mode in response to selection of one of the right-hand user mode and the left-hand user mode.

The controller may control the display to display the user interface on the left of the display area of the display in the right-hand user mode and control the display to display the user interface on the right of the display area of the display in the left-hand user mode.

The controller may determine a position at which the user interface is displayed on the basis of whether the right hand and the left hand approach and approach directions of the right hand and the left hand, which are sensed through the at least two proximity sensors.

The controller may receive an external input for activating the at least two proximity sensors and activate the at least two proximity sensors in response to the external input.

The controller may control the display to display the user interface on the left of the display area of the display when approach of the left hand is sensed and control the display to display the user interface on the right of the display area of the display when approach of the right hand is sensed.

The controller may set the right-hand user mode when approach of the left hand is sensed and set the left-hand user mode when approach of the right hand is sensed.

The aspect ratio of the display may conform to the aspect ratio of the international standard paper size.

The tablet may further include: a palette module to receive a user event and to generate a command corresponding to the received user event; a view module to receive the command from the palette module to participate in display of information through the display; and a pen manager module to generate a pen object through at least one pen engine.

The view module may include a canvas view module having a layer manager module and a layer, a note manager module to manage information about a page of a note, an up page view module to receive a bitmap of the page from the note manager module and to output the bitmap according to the user event to constitute a screen, and a curl view module to receive the bitmap of the page from the note manager module and to output the bitmap as an animation according to the user event.

The canvas view module may receive a pen object from the view module, receive a bitmap to be rendered from the layer manager module, and perform drawing in response to the user event.

The layer manager module of the canvas view module may receive a current page object from the note manager module and manage an action history of the layer.

The layer may generate an action history object whenever writing or drawing is corrected and store the action history object.

A page displayed on the display may include a first layer having content that is not added/corrected/deleted and a second layer having content that is added/corrected/deleted.

The first layer may be a form layer including a predetermined form.

The first layer may correspond to at least one of a text and an image including content input by a user.

The overall display area of the display including the region in which the user interface is displayed may be used as a writing/drawing area.

In a region in which the user interface and a writing/drawing object overlap, the user interface may be displayed above the writing/drawing object.

In a region in which the user interface and a writing/drawing object overlap, the user interface may be displayed more distinctly and the writing/drawing object is displayed less distinctly.

The proximity sensors may correspond to one of a high-frequency oscillation-type sensor, a capacitive sensor, a magnetic sensor, a photoelectric sensor and an ultrasonic sensor.

The tablet may further include an acceleration sensor to sense motion of the tablet by measuring a dynamic force of the tablet when the tablet moves.

The acceleration sensor may be a gyroscopic sensor.

The controller may sense rotation of the tablet through the acceleration sensor and control the display to change the position of the user interface such that the position of the user interface corresponds to one of the right-hand user mode and the left-hand user mode in consideration of the rotating direction of the tablet when the tablet rotates.

The tablet may further include an optical sensor to receive an optical signal transmitted through at least one lens and to convert the optical signal into an electric signal.

The controller may generate a video signal using the converted electric signal.

The optical sensor may be an illuminance sensor for sensing the intensity of radiation around the tablet.

The tablet may further include a communication unit through which wired communication through an external port and wireless communication through an antenna are performed.

The external port may correspond to at least one of a USB (Universal Serial Bus) port and a FireWire port.

The tablet may further include an audio signal processor to convert audio data into an electric signal and to transmit the electric signal to a speaker or to convert an electric signal that has converted from sound waves through a microphone into audio data.

The display may be composed of a touchscreen and a display panel, and the touchscreen may be provided to one of the front side, back side and both sides of the display panel.

The touchscreen may be arranged on the front side of the display panel when the touchscreen is a resistive touchscreen and the display play panel is a liquid crystal display.

The touchscreen may be arranged on one of the front side and back side of the display panel when the touchscreen is a resistive touchscreen and the display play panel is e-paper.

The touchscreen may be arranged on the front side of the display panel when the touchscreen is a capacitive touchscreen.

The touchscreen may be arranged on the back side of the display panel when the touchscreen is of an electromagnetic induction type.

When both a capacitive touch panel for touch input and an electromagnetic induction panel for pen input are used as the touchscreen, the capacitive touch panel may be arranged on the front side of the display panel and the electromagnetic induction panel may be located on the back side of the display panel.

The user interface may include an expandable menu button having at least one lower menu button.

The expandable menu button may be expanded when the expandable menu button is tapped.

The at least one lower menu button may be displayed in an expanded area of the expandable menu button.

When the at least one lower menu button displayed in the expanded area of the expandable menu button is moved to the outside of the expanded area, the at least one lower menu button may be converted into an independent menu button.

The at least one lower menu button may be moved to the outside of the expanded area in a drag & drop manner.

The at least one lower menu button may include at least one of a first lower menu button for setting a color, a second lower menu button for setting a pen, a third lower menu button for setting a tool, and a fourth lower menu button for selecting and setting a line thickness.

The first lower menu button may be used to display colors to be selected in one of a color wheel form and a honeycomb form.

The color wheel form and the honeycomb form may be toggled whenever the first lower menu button is tapped.

Pen types selectable through the second lower menu button may be displayed as default when the expanded menu button is expanded.

The selectable pen types may include at least one of a pen, an ink pen, a brush and a highlighter.

The fourth lower menu button may be in the form of a slide bar through which a line thickness is varied in a slide direction.

The third lower menu button may include at least one of a first tool by which a rectangular cut/copy/delete region is selected, a second tool by which a user freely selects a cut/copy/delete region, a third tool by which a target selected through cut/copy is pasted at a desired position, and a fourth tool by which an image stored in a storage unit is retrieved.

When a rectangular region is selected through the first tool, a pop-up for selecting one of cutting, copying and deletion of the selected rectangular region may be generated.

When the user freely selects a region through the second tool, a pop-up for selecting one of cutting, copying and deletion of the selected region may be generated.

When data is stored in a clipboard through cut/copy, the controller may designate a position at which the data will be pasted and control the data to be pasted at the designated position.

The controller may control a pop-up for confirming whether to paste the data at the designated position to be generated when the paste position is designated.

The controller may control thumbnails of previously stored images to be displayed on the display when the fourth tool is tapped, and select an image to be retrieved from the thumbnails displayed on the display.

The controller may designate a position at which the image will be pasted upon selection of the image to be retrieved, and control a pop-up for confirming whether to paste the image at the designated position to be generated when the paste position is designated.

The expandable menu button may be returned to a state before being expanded when the expanded menu button in an expanded state is tapped.

A fast eraser mode may be provided when the expanded menu button is pressed.

Pen-based input may operate as an eraser when the expanded menu button in an unexpanded state is pressed.

The user interface may include at least one independent menu button by which a predetermined operation is performed.

The at least one independent menu button may include at least one of a first independent menu button for adjusting a line thickness and selecting a pen type, a second independent menu button for switching between a page level and a note level, a third independent menu button for selecting a color and adjusting saturation, a fourth independent menu button for switching between pen-based input and touch-based input, a fifth independent menu button for canceling a predetermined number of unit operations and returning to a previous state, a sixth independent menu button for cancelling a predetermined number of unit operations restored through the fifth independent menu button, a seventh independent menu button for transmitting content through a social network service (SNS) or e-mail service, an eighth independent menu button for generating a new page after a current page, and a ninth independent menu button for deleting all writing/drawing objects of the current page.

Predetermined different line thicknesses may be displayed in a line thickness display window in such a manner that the line thicknesses are sequentially switched from a predetermined minimum thickness to a predetermined maximum thickness when the first independent menu button is pressed for a predetermined time or longer.

When manipulation of pressing the first independent menu button is ended, a line thickness displayed when the manipulation is ended may be selected and writing/drawing may be performed in the selected line thickness.

Switching between the note level and the page level may be performed when the second independent menu button is tapped.

Saturation levels of a corresponding color may be sequentially displayed in a saturation display window from a predetermined minimum value to a predetermined maximum value when the third independent menu button is pressed for a predetermined time or longer.

When manipulation of pressing the third independent menu button is ended, a saturation level displayed when the manipulation is ended may be selected and writing/drawing may be performed in the selected saturation level.

When the color is an achromatic color, brightness levels instead of saturation levels of the color may be sequentially displayed from a predetermined minimum value to a predetermined maximum value.

A pop-up for transmitting the current page through e-mail may be generated when the seventh independent menu button is tapped, and the current page may be sent via e-mail through a menu selected from menus provided through the pop-up.

The current page may be converted into an image and sent.

The user interface may operate in response to both a pen event and a touch event.

The independent menu button may be represented as if the independent menu button has elasticity through graphical representation on the display.

The independent menu button may be represented as if the independent menu button has magnetism through graphical representation on the display.

A first note level pop-up including menus of note-level operations may be generated at the note level when the expandable menu button is tapped.

The first note level pop-up may include at least one of a 'generate new note' menu by which a new note is generated and a 'retrieve PDF' menu by which a previously generated PDF file is retrieved.

The controller may control the display to display a note cover image and a virtual keyboard, to display an input box into which a note title is input at the top of the note cover image and to receive a note title input through the virtual keyboard and generates the note under the input title upon selection of the 'generate new note' menu.

The controller may control the display to display a list of previously stored PDF files, retrieves selected PDF files upon selection of the PDF files, and generate a new note composed of the retrieved PDF files in response to selection of the 'retrieve PDF' menu.

The controller may control the display to display a retrieving state of the selected PDF files through a state display window that indicates a retrieval state, when the selected PDF files are retrieved.

A second note level pop-up including menus of note-level operations may be generated upon selection of at least one note while pressing the expandable menu button at the note level.

The second note level pop-up may include at least one of a 'copy' menu by which a note is copied, a 'cut' menu by which a note is cut, a 'delete' menu by which a note is deleted, a 'send PDF file via e-mail' menu by which a note is converted into a PDF file, attached to an e-mail and sent, and a 'change cover' menu by which a cover image of a note is changed.

The controller may receive information about a position at which at least one note selected to be copied will be pasted, control the display to generate a copy menu pop-up upon reception of the information about the paste position, and perform a corresponding control operation according to a menu selected from menus of the copy menu pop-up in response to selection of the 'copy' menu.

The copy menu pop-up may include a 'paste before' menu by which the copied note is pasted before the selected position, a 'paste after' menu by which the copied note is pasted after the selected position, and a 'generate note' menu by which a new note including the content of the copied note is generated.

The controller may receive information about a position at which at least one note selected to be cut will be pasted, control the display to generate a cut menu pop-up upon reception of the information about the paste position, and perform a corresponding control operation according to a menu selected from menus of the cut menu pop-up in response to selection of the 'cut' menu.

The cut menu pop-up may include a 'paste before' menu by which the cut note is pasted before the selected position, a 'paste after' menu by which the cut note is pasted after the selected position, and a 'generate note' menu by which a new note including the content of the cut note is generated.

The controller may delete the at least one selected note in response to selection of the 'delete' menu.

The controller may convert the selected note into a PDF file, control the display to display an e-mail creation screen, and automatically attach the PDF file to the e-mail creation screen in response to selection of the 'send PDF file via e-mail' menu.

The e-mail creation screen may include an input box for a recipient e-mail account, a reference e-mail account, a title and file attachment, a text input window, and a virtual keyboard.

The controller may control the display to display at least one cover and change the cover of the selected note to a selected new cover upon selection of the new cover in response to the 'change cover' menu.

The cover may be provided as default by the tablet.

The cover may be purchased in an online market.

The cover may be a custom-made cover that is customized and distributed.

A first page level pop-up including menus of page-level operations may be generated at the page level when the expandable menu button is tapped.

The first page level pop-up may include at least one of a 'generate new page' menu by which a new page is generated and a 'retrieve PDF' menu by which a previously generated PDF file is retrieved.

The controller may control the display to display a new page in the display area of the display in response to selection of the 'generate new page' menu.

The controller may control the display to display a list of previously stored PDF files, to retrieve selected PDF files upon selection of the PDF files and to display the PDF files in response to selection of the 'retrieve PDF' menu.

The controller may control the display to display a retrieving state of the selected PDF files through a state display window that indicates a retrieval state when the selected PDF files are retrieved.

A second page level pop-up including menus of page-level operations may be generated upon selection of at least one page while pressing the expandable menu button at the page level.

The second page level pop-up may include at least one of a 'copy' menu by which a page is copied, a 'cut' menu by which a page is cut, a 'delete' menu by which a page is deleted, a 'send PDF file via e-mail' menu by which a page is converted into a PDF file, attached to an e-mail and sent, and a 'change form' menu by which the form of a page is changed.

The controller may receive information about a position at which at least one page selected to be copied will be pasted, control the display to generate a copy menu pop-up upon reception of the information about the paste position, and perform a corresponding control operation according to a menu selected from menus of the copy menu pop-up in response to selection of the 'copy' menu.

The copy menu pop-up may include a 'paste before' menu by which the copied page is pasted before the selected position, a 'paste after' menu by which the copied page is pasted after the selected position, and a 'generate note' menu by which a new page including the content of the copied page is generated.

The controller may receive information about a position at which at least one page selected to be cut will be pasted, control the display to generate a cut menu pop-up upon reception of the information about the paste position, and perform a corresponding control operation according to a menu selected from menus of the cut menu pop-up in response to selection of the 'cut' menu.

The cut menu pop-up may include a 'paste before' menu by which the cut page is pasted before the selected position, a 'paste after' menu by which the cut page is pasted after the selected position, and a 'generate note' menu by which a new page including the content of the cut page is generated.

The controller may delete the at least one selected page in response to selection of the 'delete' menu.

The controller may convert the selected page into a PDF file, control the display to display an e-mail creation screen, and automatically attach the PDF file to the e-mail creation screen in response to selection of the 'send PDF file via e-mail' menu.

The e-mail creation screen may include an input box for a recipient e-mail account, a reference e-mail account, a title and file attachment, a text input window, and a virtual keyboard.

The controller may control the display to display at least one form and change the form of the selected page to a selected new form upon selection of the new form in response to selection of the 'change form' menu.

The form may be provided as default by the tablet.

The form may be purchased in an online market.

The form may be a custom-made form that is customized and distributed.

The number of notes displayed on the display at the note level may increase according to zoom-out operation performed on the display, the number of notes displayed on the display at the note level may decrease according to zoom-in operation performed on the display, and a plurality of notes displayed on the display at the note level may be selected through a drag operation performed on the display while pressing the expandable menu button.

Screen flicking may be performed at the note level through a drag operation performed on the display when the expandable menu button is not pressed.

The number of pages displayed on the display at the page level may increase according to zoom-out operation performed on the display, the number of page displayed on the display at the page level may decrease according to zoom-in operation performed on the display, and a plurality of pages displayed on the display at the page level may be selected through a drag operation performed on the display while pressing the expandable menu button.

Screen flicking may be performed at the page level through a drag operation performed on the display when the expandable menu button is not pressed.

The number of notes displayed on the display and the number of pages displayed on the display may decrease or increase in a predetermined order at the note level and the page level through zoom-in and zoom-out operations performed on the display.

16 notes, 4 notes, 1 note, 4 pages and 1 page may be sequentially displayed according to the zoom-in operation, and 1 page, 4 pages, 16 pages, 1 note, 4 notes and 16 notes may be sequentially displayed according to the zoom-out operation.

A first region of the boundary of the display area of the display may be represented as if the first region has magnetism through graphical representation on the display such that the independent menu button sticks to the first region.

A second region of the boundary of the display area of the display may be represented as a trash box through graphical representation on the display such that a unit menu button and content are deleted while passing through the second region.

The unit menu button deleted through the second region may be restored through the expandable menu button.

The content deleted through the second region may be restored according to a restoration command.

The controller may control the display to play a video in a region of the display area of the display and control writing/drawing to be performed on a region other than the region in which the video is played.

In accordance with an aspect of one or more embodiments, there is provided a method for automatically switching between a right-hand user mode and a left-hand user mode, including selecting activation of proximity sensors from an external input of a user using an environment setting menu; activating proximity sensors using a controller; sensing proximity of a left hand of the user or a right hand of the user using the proximity sensors; setting a right-hand user mode or a left-hand user mode based on information sensed by the proximity sensors; displaying user interface on left of display or right of display depending on information sensed by proximity sensors; and switching right-hand user mode to left-hand user mode based on information sensed by sensors and switching left-hand user mode to right-hand user mode based on information sensed by sensors.

According to an aspect of one or more embodiments, there is provided at least one non-transitory computer readable medium storing computer readable instructions to implement methods of embodiments.

According to an aspect, when pen/stylus/touch-based input is applied to the tablet, the user interface can be easily manipulated without losing continuity of input operation, remarkably improving work efficiency.

BRIEF DESCRIPTION OF THE DRAWINGS

These and/or other aspects of one or more embodiments will become apparent and more readily appreciated from the following description of embodiments, taken in conjunction with the accompanying drawings of which:

FIG. 10 shows examples of various interactions in the tablet according to an embodiment;

FIG. 13 illustrates a tool setting procedure through a tool setting menu button;

FIG. 24 illustrates a procedure of transmitting a current page through e-mail or social network service (SNS);

FIG. 40 illustrates a menu call procedure through manipulation of tapping the expandable menu button at the page level of the tablet according to an embodiment;

DETAILED DESCRIPTION

Figure 1:
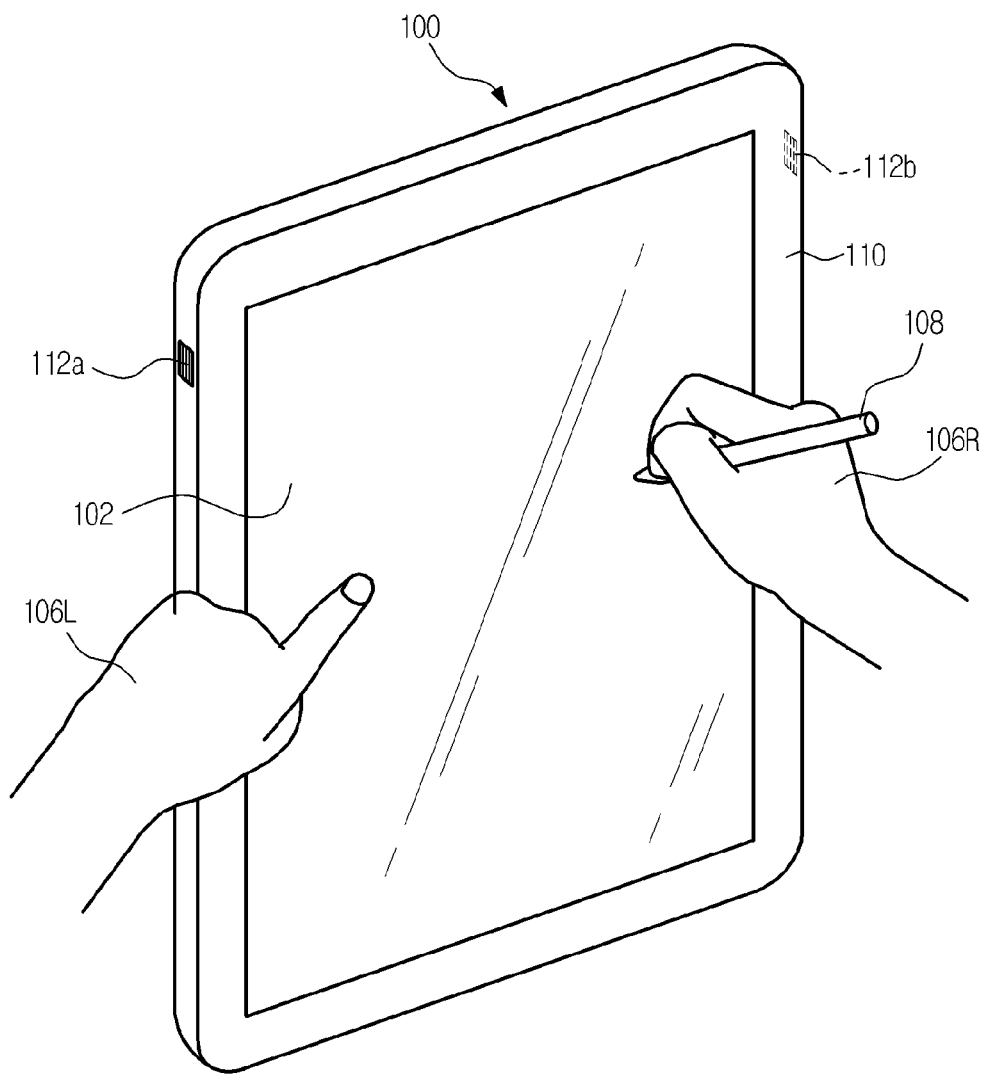
FIG. 1 shows the appearance of a tablet according to an embodiment.

Reference will now be made in detail to embodiments, examples of which are illustrated in the accompanying drawings, wherein like reference numerals refer to like elements throughout. Embodiments are described below by referring to the figures.

In the specification, a portable device is a device that includes one or more touchscreen displays and is configured to execute applications or display content. For example, the portable device can include a tablet personal computer (PC) (referred to as a tablet hereinafter), a portable multimedia player (PMP), a personal digital assistant (PDA), a smartphone, a cellular phone, a digital frame, etc. The tablet is exemplified in embodiments of the disclosure but is not limited thereto.

In the following description, a left-hand user is a user who usually grips a pen with the left hand to perform an information input operation such as writing or drawing whereas a right-hand user is a user who usually grips a pen with the right hand to perform an information input operation such as writing or drawing. A left-hand user mode is a mode in which a user performs an information input operation, such as writing or drawing, with a pen gripped by the left hand, whereas a right-hand user mode is a mode in which a user performs an information input operation, such as writing or drawing, with a pen gripped by the right hand.

FIG. 1 shows the appearance of a tablet 100 according to an embodiment. Referring to FIG. 1, the exterior of the tablet 100 is defined by a bezel 110 and a display 102 of the tablet 100 is supported by the bezel 110. The aspect ratio of the display 102 conforms to the aspect ratio of an international standard paper size. That is, in an embodiment, the display 102 has an aspect ratio of 1.414:1. The display 102 of the tablet 100 can receive pen-based input or touch-based input applied thereto while displaying information thereon. Pen-based input is an input method using a pen 108 (or stylus) and touch-based input is an input method using part of the human body, such as a finger. In the following description, the pen 108 includes a stylus. An input area of the display 102 according to an embodiment is classified as a first input area that allows only pen-based input and a second input area that permits both pen-based input and touch-based input. For example, the first input area allowing only pen-based input is an area in which a user writes or draws using the pen 108 and the second input area permitting both pen-based input and touch-based input is a user interface area for selecting a menu or setting an option. Both the first input area and the second input area can be defined such that both pen-based input and touch-based input can be applied thereto as necessary. In an embodiment, writing or drawing using the pen 108 is defined as pen-based input and tapping/pressing/dragging a user interface or content using part of the body, such as a finger, is defined as touch-based input.

At least two proximity sensors 112a and 112b may be provided to the bezel 110 of the table 100 according an embodiment. The proximity sensors 112a and 112b sense proximity of one of both hands 106L and 106R of the user to the bezel 110 of the tablet 100. A user interface displayed on the display 102 is hidden or revealed according to whether the hands 106L and 106R of the user approach the display 102. That is, the user interface is not displayed on the display 102 (hidden) when the hands 106L and 106R of the user are not within a predetermined distance of the bezel 110. If the hands 106L and 106R of the user approach within the predetermined distance of the bezel 110, the hidden user interface is displayed on the display 102 such that the user can manipulate the user interface. In this manner, the user interface can be hidden and displayed only when needed, and thus the overall input area of the display 102 can be used as an area for writing/drawing. To achieve this, the proximity sensors 112a and 112b can respectively be attached to both sides of the tablet 100, as shown in FIG. 1. Further proximity sensors may be attached to other positions of the tablet 100 as necessary. In addition, it is possible to detect a direction in which the hands 106L and 106R of the user approach the tablet 100 through the proximity sensors 112a and 112b and set one of the right-hand user mode and the left-hand user mode according to the detected approach direction so as to change a user interface display position. When proximity of the left hand of the user is detected, the right-hand user mode is set such that the user interface is displayed on the left of the display area of the display 102. When proximity of the right hand of the user is detected, the left-hand user mode is set such that the user interface is displayed on the right of the display area of the display 102.

Figure 2:
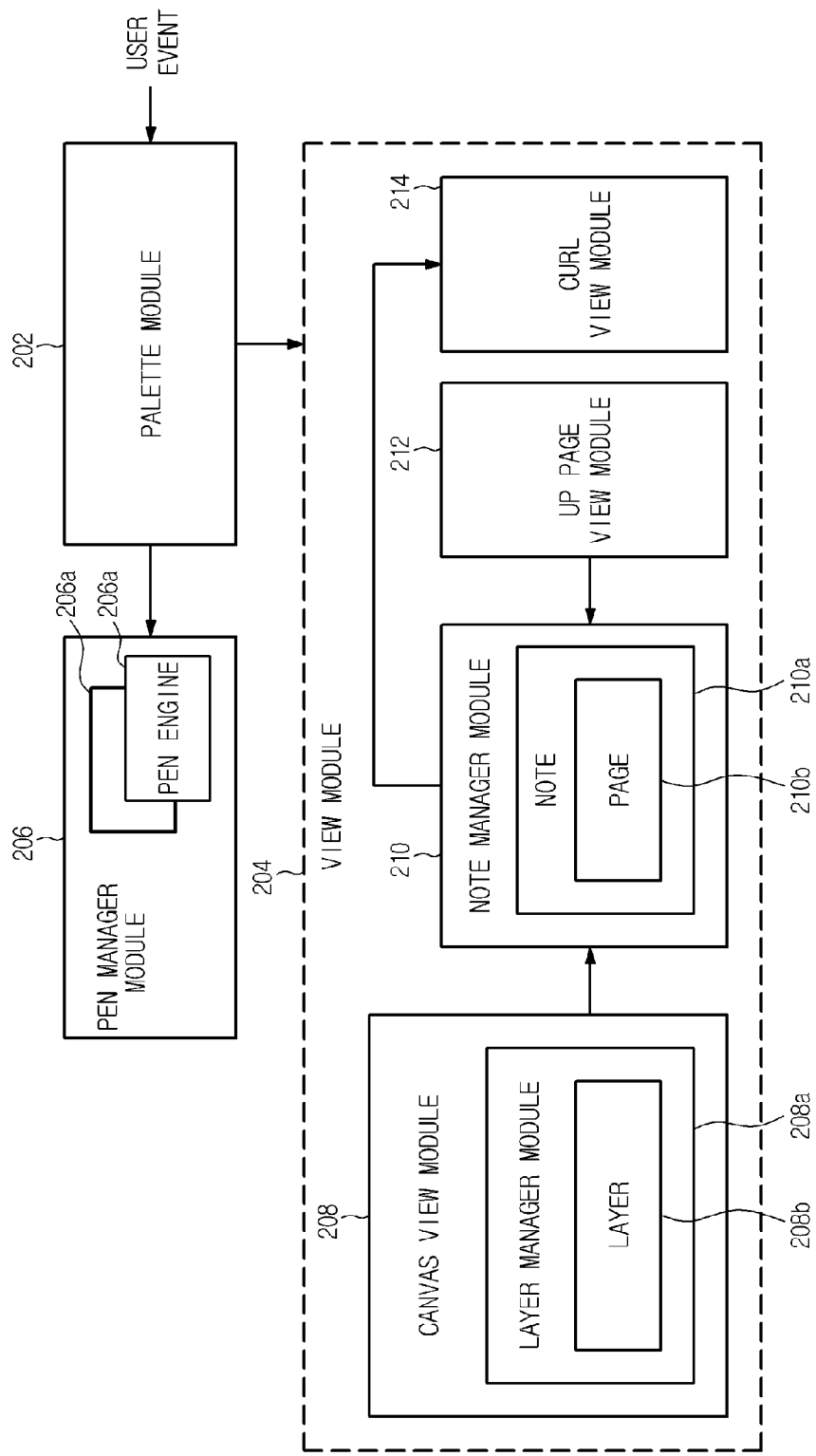
FIG. 2 shows a control system of the tablet shown in FIG. 1 as control module units.

FIG. 2 shows a control system of the tablet 100 shown in FIG. 1 as control module units. In FIG. 2, an arrow indicates that a module from which the arrow starts uses resources of a module indicated by the arrow. A palette module 202 receives a user event (pen event or touch event) and issues a command corresponding to the received event to a view module 204. A pen manager module 206 generates a pen object through at least one pen engine 206a.

The view module 204 transmits the command received from the palette module 202 to a lower module thereof. Lower modules of the view module 204 include a canvas view module 208, a note manager module 210, an up page view module 212, and a curl view module 214. The canvas view module 208 includes a layer manager module 208a and a layer 208b. The canvas view module 208 receives a pen object from the view module 204, receives a bitmap to be rendered from the layer manager module 208a and performs rendering in response to the user event. The layer manager module 208a of the canvas view module 208 receives a current page object from a note manager module 210 and manages an action history of the layer 208b. The layer 208b of the canvas view module 208 generates and stores an action history object whenever writing or drawing is corrected. The note manager module 210 includes a note 210a and manages information about a page 210b of the note 210a belonging to a corresponding application (which may be referred to as Appl). Each page 210b stores or retrieves a bitmap thereof. The up page view module 212 receives the bitmap of the page 210b from the note manager module 210 and outputs the bitmap according to a user event such that a screen is configured. The curl view module 214 receives the bitmap of the page 210b from the note manager module 120 and outputs the bitmap as an animation according to a user event.

Figure 3:
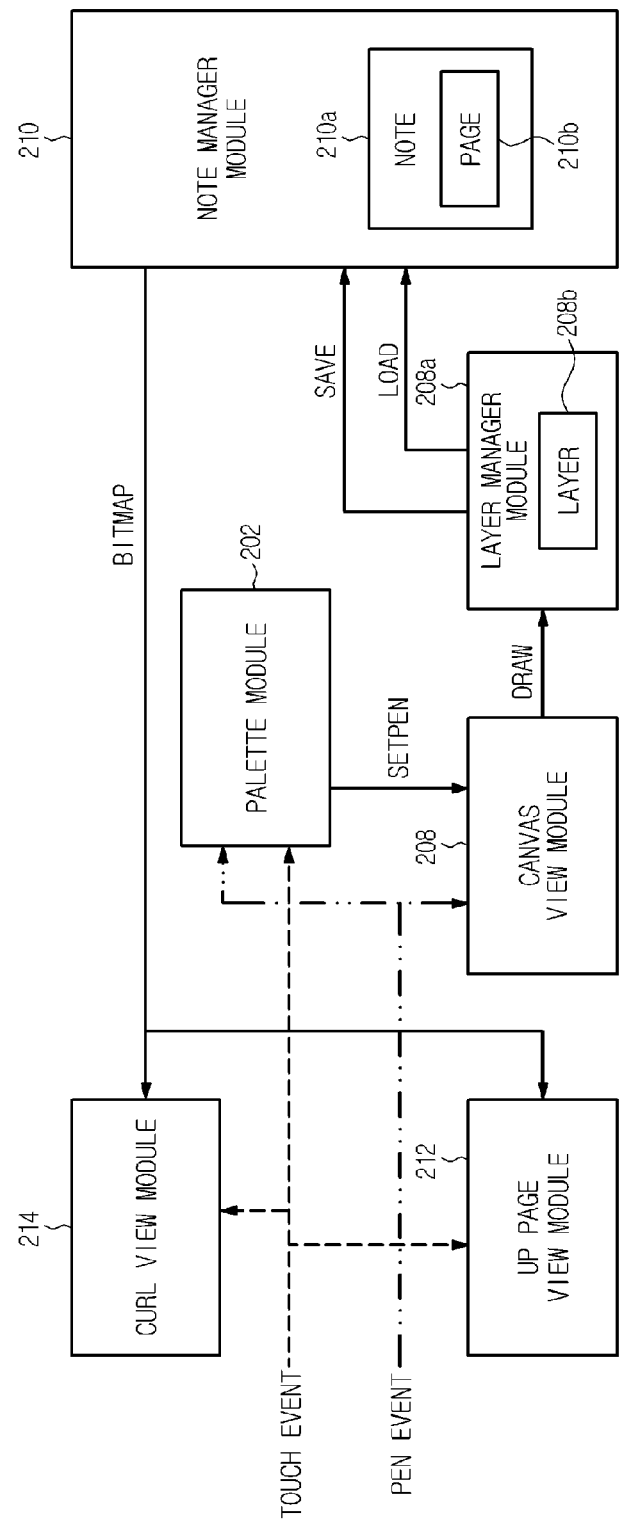
FIG. 3 shows a touch/pen event processing procedure of modules shown in FIG. 2.

FIG. 3 shows a touch/pen event processing procedure of the modules shown in FIG. 2. In FIG. 3, a dotted line arrow indicates an operation relationship according to an event (i.e. touch event) based on touch-based input, a two point chain line arrow indicates an operation relationship according to an event (i.e. pen event) based on pen-based input, and a solid line arrow indicates transmission of a command/data.

The canvas view module 208 transmits a drawing command to the layer manager module 208a such that a drawing operation is performed. The layer manager module 208a generates a save command and transmits the save command to the note manager module 210 such that a picture generated by the drawing operation is stored or generates a load command to fetch a previously stored picture from the note manager module 210. The note manager module 210 fetches the bitmap from the page 210b and transmits the bitmap to the up page view module 212 or the curl view module 214. The up page view module 212 receives the bitmap from the note manager module 210 and configures a screen corresponding to the touch event. The curl view module 214 receives the bitmap from the note manager module 210 and generates an animation corresponding to the touch event. The palette module 202 provides a tool SETPEN used for drawing to the canvas view module 208 in response to the touch event or pen event.

Figure 4:
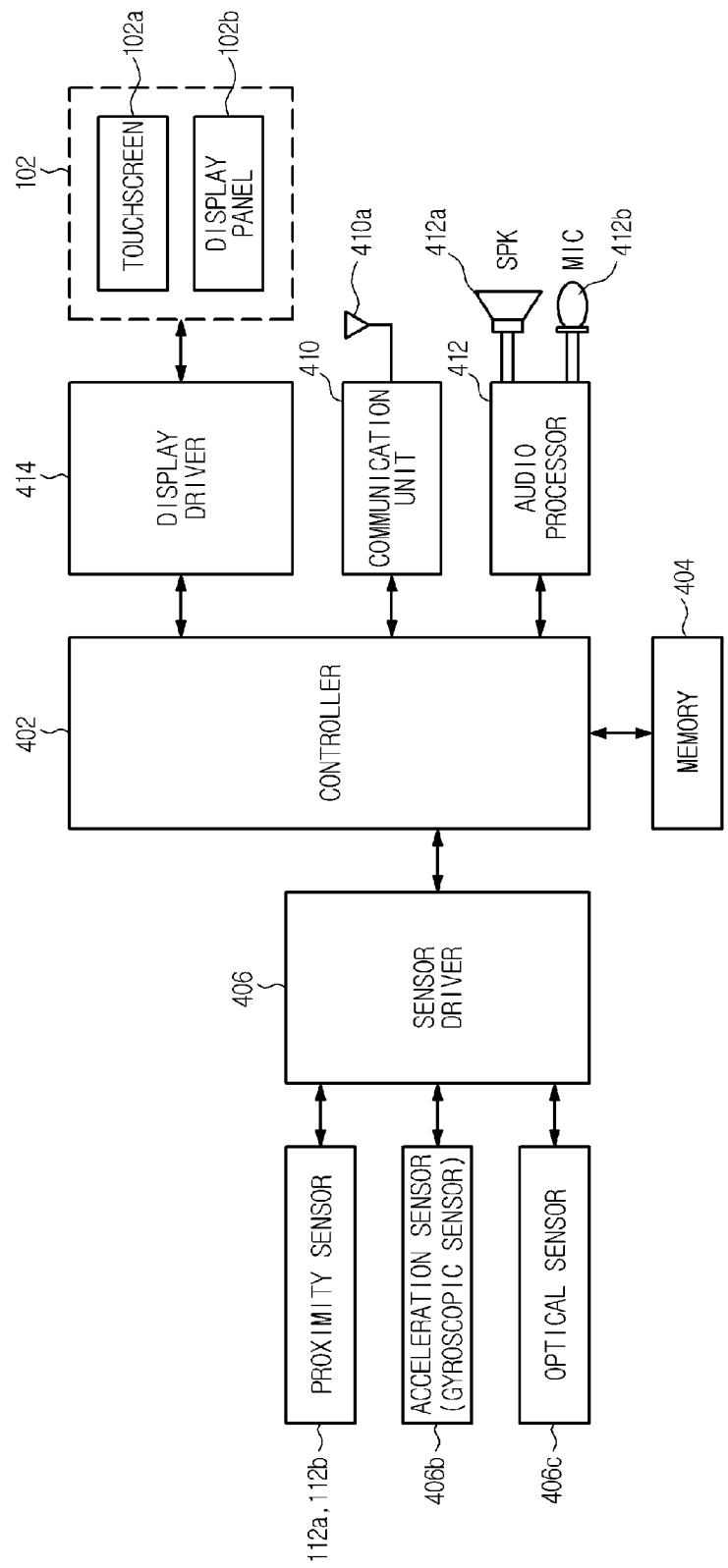
FIG. 4 shows the control system of the tablet shown in FIG. 1 as device units.

FIG. 4 shows the control system of the tablet 100 shown in FIG. 1 as device units. A controller 402 is a CPU which controls overall operations of the tablet 100. To achieve this, the controller 402 executes a software program stored in a memory 404 to generate commands necessary for control.

The proximity sensors 112a and 112b, an acceleration sensor 406b and an optical sensor 406c are connected to the controller 402 through a sensor driver 406 such that the sensors can communicate with the controller 402. The sensor driver 406 may be provided to each sensor. The proximity sensors 112a and 112b sense proximity of part of the boy of the user to the tablet 100. As described above with reference to FIG. 1, it is possible to automatically change a user interface display position according to whether the user is a left-hand user or a right-hand user using a sensing result of the proximity sensors 112a and 112b. Furthermore, using a sensing result of the proximity sensors 112a and 112b, it is possible to display a user interface on the display 102 when a hand of the user approaches the tablet 100 and to hide the user interface from the display 102 when the hand of the user moves away from the tablet 100. The proximity sensors 112a and 112b may be one of a high-frequency oscillation-type sensor, a capacitive sensor, a magnetic sensor, a photoelectric sensor, and an ultrasonic sensor. The acceleration sensor 406b measures dynamic force such as acceleration, vibration, impact, etc. when the tablet 100 moves and is used to detect a motion of the tablet 100. The acceleration sensor 406b may be a gyroscopic sensor. Since the gyroscopic sensor can recognize motions of a total of six axes including a rotary element, the gyroscopic sensor can detect a motion of the tablet 100 more accurately than a general acceleration sensor including no rotating element. The optical sensor 406c is an element that constructs a camera module and may be composed of a CCD (charge-coupled device) or CMOS (complementary metal-oxide semiconductor). The optical sensor 406c can receive an optical signal projected through at least one lens of the camera module and converts the optical signal into an electric signal such that a still image or a moving image can be generated. The optical sensor 406c may be an illuminance sensor for measuring the intensity of radiation around the tablet 100.

In addition, a communication unit 410 and an audio signal processor 412 are connected to the controller 402 such that the communication unit 410 and the audio signal processor 412 can communicate with the controller 402. The communication unit 410 enables wired communication with other devices through an external port and performs wireless communication through an antenna 410a. The external port may be a communication port through which an external device can be directly connected to the communication unit 410, such as a USB (Universal Serial Bus) port or a FireWire port. The audio signal processor 412 provides an audio interface between the user and the tablet 100. The audio signal processor 412 converts audio data into an electric signal and transmits the electric signal to a speaker 412a, or converts an electric signal, which has been converted from sound waves through a microphone 412b, into audio data.

The display 102 is connected to the controller 402 such that the display 102 can communicate with the controller 402. The display 102 is composed of a touchscreen 102a and a display panel 102b. The touchscreen 102a may be arranged on the front side, back side or both sides of the display panel 102b. For example, when the touchscreen 102a is of a resistive type, the touchscreen 102a can be arranged on the front side of the display panel 102b if the display panel 102b is a liquid crystal display (LCD) and can be arranged on one of the front side and back side of the display panel 102b if the display panel 102b is flexible e-paper. When the touchscreen 102a is of a capacity type, the touchscreen 102a can be located on the front side of the display panel 102b. If the touchscreen 102a is of an electromagnetic induction type, the touchscreen 102a can be arranged on the back side of the display panel 102b. When both a capacitive touch panel for touch input and an electromagnetic induction panel for pen input are used, the capacitive touch panel can be located on the front side of the display panel 102b and the electromagnetic induction panel can be arranged on the back side of the display panel 102b.

Figure 5:
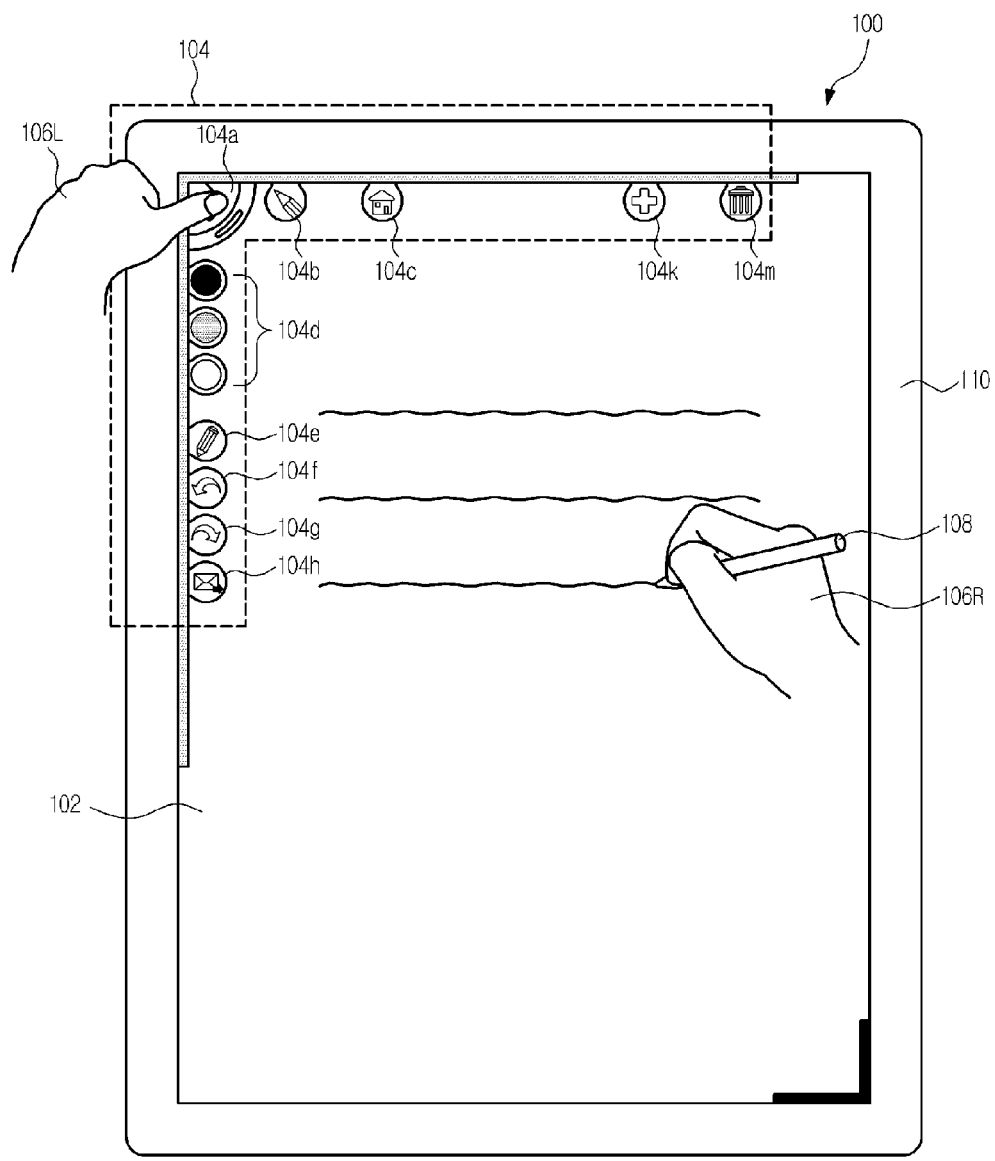
FIG. 5 illustrates a user interface of the tablet shown in FIG. 1.

FIG. 5 illustrates a user interface 104 of the tablet 100 shown in FIG. 1. The user interface 104 is displayed on the display 102 of the tablet 100. The user interface 104 may include an expandable menu button 104a and independent menu buttons 104b, 104c, 104d, 104e, 104f, 104g, 104h, 104k and 104m. In the following description, the independent menu buttons 104b, 104c, 104d, 104e, 104f, 105g, 104h, 104k and 104m are denoted by 104b-104m.

Figure 11:
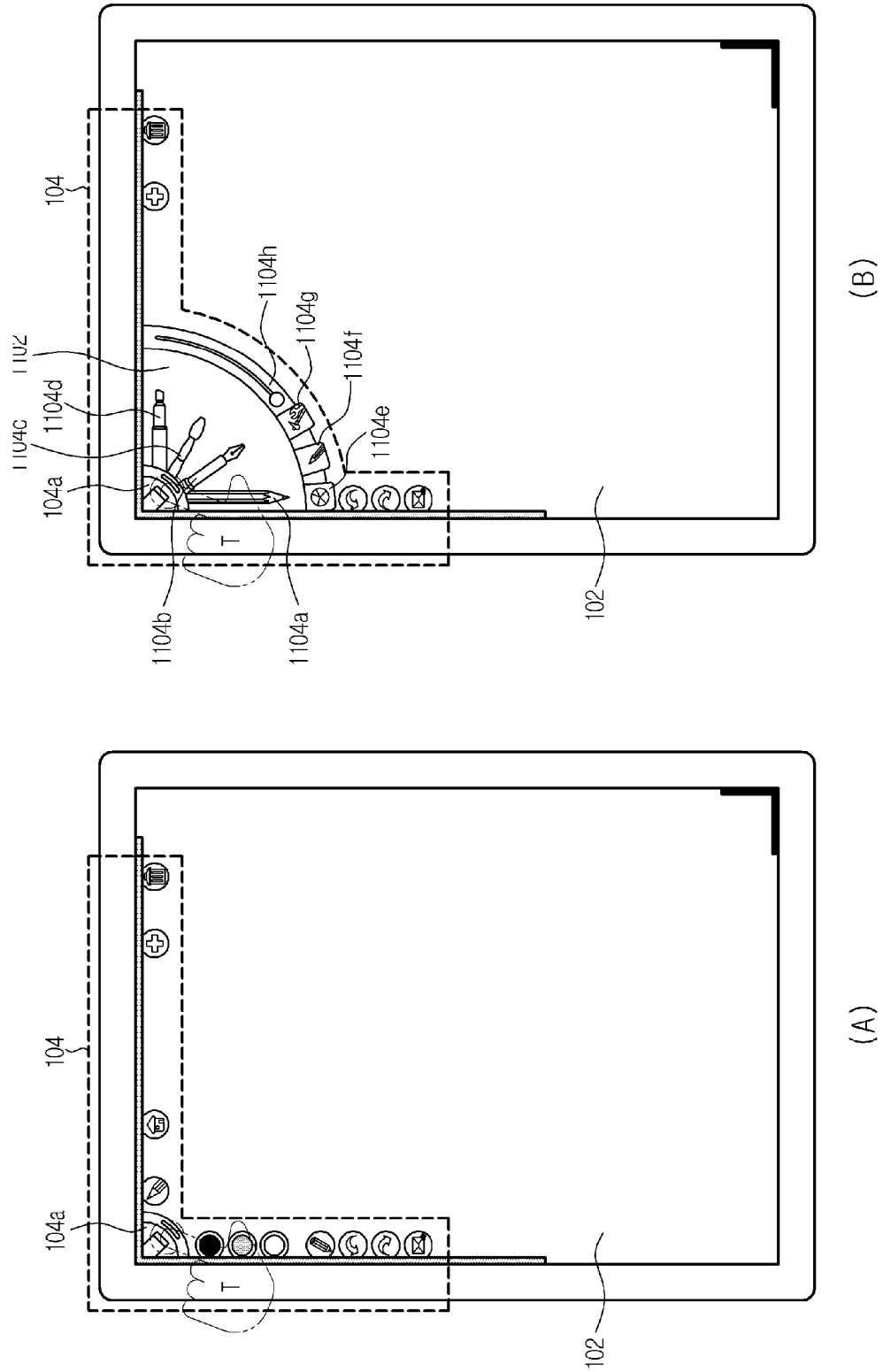
FIG. 11 illustrates an expansion characteristic of an expandable menu button of the user interface of the tablet according to an embodiment.

The expandable menu button 104a is expanded when tapped (touched for a short time and then released) to show lower menu buttons included therein (refer to FIG. 11). Furthermore, when the expandable menu button 104a is pressed (touch state is maintained for a predetermined time or longer), a pen event operates as an eraser to delete a picture or writing (refer to FIG. 26).

The independent menu buttons 104b-104m may include an 'adjust pen thickness/select pen' menu button 104b, 'home' menu button 104c, 'select color/adjust saturation' menu button 104d, 'toggle pen/touch' menu button 104e, 'undo' menu button 104f, 'redo' menu button 104g, 'SNS' menu button 104h, 'generate page' menu button 104k, and 'clear' menu button 104m. The 'adjust pen thickness/select pen' menu button 104b is a first independent menu button by which a line thickness adjustment interface can be executed through press manipulation for a predetermined time or longer and various predetermined types of pens can be selected through tap manipulation. The 'home' menu button 104c is a second independent menu button by which a page level and a note level are switched. The note level is a mode in which a note can be copied/deleted/corrected. The 'select color/adjust saturation' menu button 104d is a third independent menu button by which a specific color can be selected. In the case of a chromatic color, a saturation adjustment interface can be executed by pressing the 'select color/adjust saturation' menu button 104d for a predetermined time or longer. In the case of an achromatic color, a gradation control interface can be executed by pressing the 'select color/adjust saturation' menu button 104d for a predetermined time or longer. The 'toggle pen/touch' menu button 104e is a fourth independent menu button by which one of pen-based input and touch-based input can be selected. The 'undo' menu button 104f is a fifth independent menu button by which a predetermined number (e.g. one) of unit operations are cancelled to return to a previous state. The 'redo' menu button 104g is a sixth independent menu button by which a predetermined number (e.g. one) of unit operations recovered through the 'undo' menu button 104f are cancelled. The 'SNS' menu button 104h is a seventh menu button by which content can be transmitted through SNS or e-mail service. The 'generate page' menu button 104k is an eighth menu button by which a new page is generated (added) after a current page. The 'clear' menu button 104m is a ninth independent menu button by which written/drawn content of a current page displayed on the display area of the display 102 are deleted to initialized the page.

All components of the user interface 104 operate in response to both a pen event and a touch event. The user interface 104 is displayed at different positions in the right-hand user mode (first mode) and the left-hand user mode (second mode). The right-hand user mode is a mode in which a user inputs information through a method such as writing and/or drawing with the pen 108 gripped by the right hand 106R, whereas the left-hand user mode is a mode in which a user inputs information through a method such as writing and/or drawing with the pen 108 gripped by the left hand 106L. Here, input of information may be touch-based input performed by a hand gripping the pen 108.

In the tablet 100 according to an embodiment, the user interface 104 is displayed on the left of the display area of the display 102 in the right-hand user mode, as shown in FIG. 5, such that the user can input information using the right hand and, at the same time, manipulate the user interface 104 using the left hand. Particularly, the display 102 can be controlled such that the user interface 104 is displayed in one of the upper and lower regions of the left side of the display area of the display 102. Furthermore, the display 102 can be controlled such that part of the user interface 104 is displayed in one of the upper and lower regions of the left side of the display area of the display 102 and the remaining part of the user interface 104 is displayed at one of the top and bottom of the display area of the display 102. For example, the user can manipulate the user interface 104 using the left hand 106L while inputting information through writing or drawing with the pen 108 gripped by the right hand 106R in the right-hand user mode. If the user manipulates the user interface 104 using the right hand 106R while inputting information through writing or drawing with the right hand 106R, the user has to temporarily stop information input, and thus continuity of information input work is not secured. However, when the user interface 104 is displayed on the left of the display area of the display 102 in the right-hand user mode, as shown in FIG. 5, the user can manipulate the user interface 104 with the left hand 106L while continuing information input without releasing the right hand 106R from the display 102, and thus continuity of the information input work using the right hand 106R can be secured, remarkably improving work efficiency.

Figure 6:
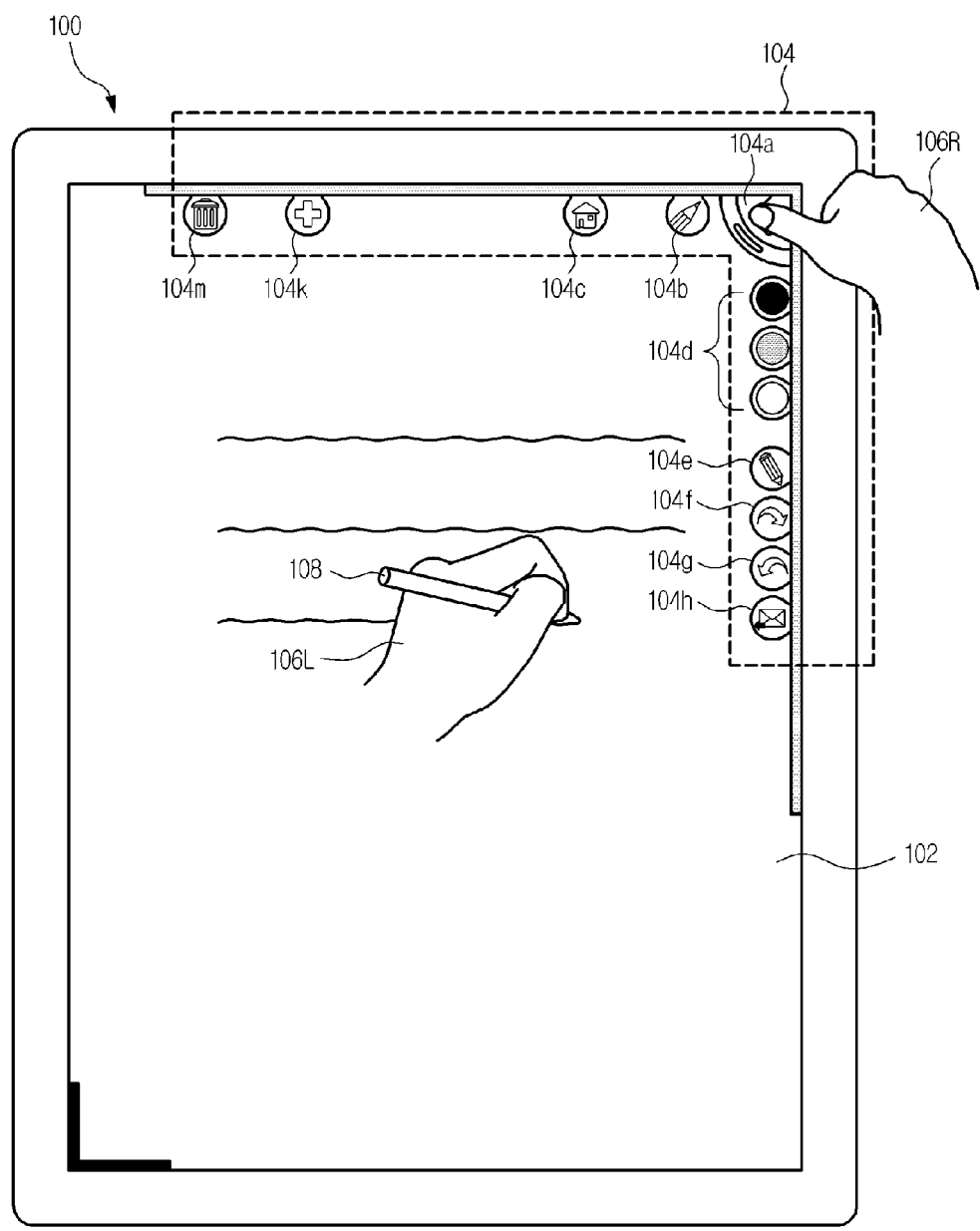
FIG. 6 illustrates a left-hand user mode (second mode) of the tablet according to an embodiment.

FIG. 6 illustrates the left-hand user mode (second mode) of the tablet 100 according to an embodiment. In an embodiment, the user interface 104 is displayed on the right of the display area of the display 102 in the left-hand user mode, as shown in FIG. 6, such that the user can input information using the left hand and, at the same time, manipulate the user interface 104 using the right hand. Particularly, the display 102 can be controlled such that the user interface 104 is displayed in one of the upper and lower regions of the right side of the display area of the display 102. Furthermore, the display 102 can be controlled such that part of the user interface 104 is displayed in one of the upper and lower regions of the right side of the display area of the display 102 and the remaining part of the user interface 104 is displayed at one of the top and bottom of the display area of the display 102. For example, the user can manipulate the user interface 104 using the right hand 106R while inputting information through writing or drawing with the pen 108 gripped by the left hand 106L in the left-hand user mode. If the user manipulates the user interface 104 using the left hand 106L while inputting information through writing or drawing with the left hand 106L, the user has to temporarily stop information input, and thus continuity of information input work is not secured. However, when the user interface 104 is displayed on the right of the display area of the display 102 in the left-hand user mode, as shown in FIG. 6, the user can manipulate the user interface 104 with the right hand 106R while continuing information input without releasing the left hand 106L from the display 102, and thus continuity of the information input work using the left hand 106L can be secured, remarkably improving work efficiency.

As described above, it is possible to secure continuity of information input to improve work efficiency by displaying the user interface 104 on the left of the display area of the display 102 in the right-hand user mode (first mode) in which the user inputs information using the right hand 106R and displaying the user interface 104 on the right of the display area of the display 102 in the left-hand user mode (second mode) in which the user inputs information using the left hand 106L.

Figure 7:
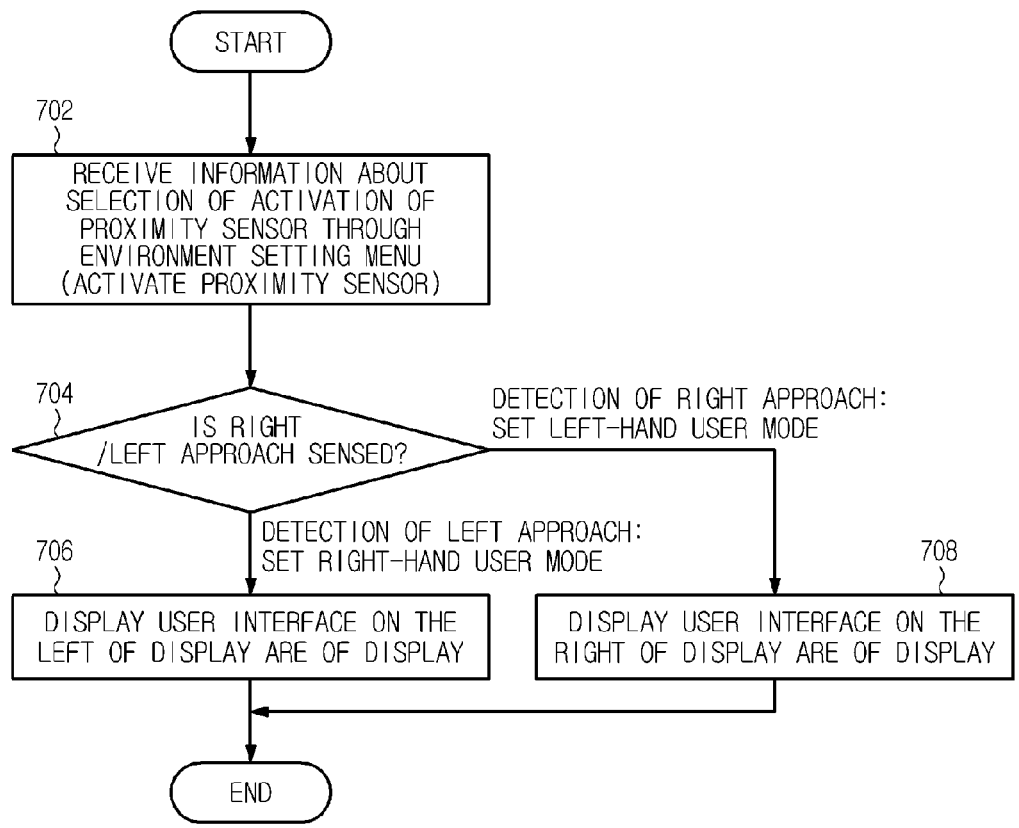
FIG. 7 is a flowchart illustrating a method of automatically switching right-hand/left-hand user modes of the tablet according to an embodiment.

FIG. 7 is a flowchart illustrating a method of automatically switching between the right-hand user mode and left-hand user mode of the tablet according to an embodiment. In the automatic switching method shown in FIG. 7, proximity of the body of the user to the tablet 100 is sensed through the proximity sensors 112a and 112b and switching between the right-hand user mode and the left-hand user mode is automatically performed according to the sensed result. When the user generates an external input by selecting activation of the proximity sensors 112a and 112b through an environment setting menu, the controller 402 of the tablet 100 activates the proximity sensors 112 and 112b in response to the external input (i.e. selection) (702). The activated proximity sensors 112a and 112b sense proximity of the body (e.g. the left hand or right hand) of the user to the tablet 100 (704). The controller 402 sets the right-hand user mode or the left-hand user mode according to the sensed result of the proximity sensors 112a and 112b. If the left proximity sensor 112a of the tablet 100, shown in FIG. 1, senses proximity of the body (e.g. left hand) of the user to the tablet 100, the controller 402 sets the tablet 100 to the right-hand user mode and displays the user interface 104 on the left of the display area of the display 102

(refer to FIG. 5) upon determining that the left hand of the user approaches the left side of the tablet 100 and pen-based input is performed through the right hand of the user (706). If the right proximity sensor 112b of the tablet 100, shown in FIG. 1, senses proximity of the body (e.g. right hand) of the user to the tablet 100, the controller 402 switches the operation mode of the tablet 100 to the left-hand user mode and displays the user interface 104 on the right of the display area of the display 102 (refer to FIG. 6) upon determining that the right hand of the user approaches the right side of the tablet 100 and pen-based input is performed through the left hand of the user (708). Switching between operation modes is automatically performed when the two proximity sensors 112a and 112b sense proximity of the body of the user to the tablet 100. The automatic switching mode set in this manner is maintained until the user deactivates the proximity sensors 112a and 112b and then directly sets the right-hand user mode or the left-hand user mode through the environment setting menu.

Figure 8:
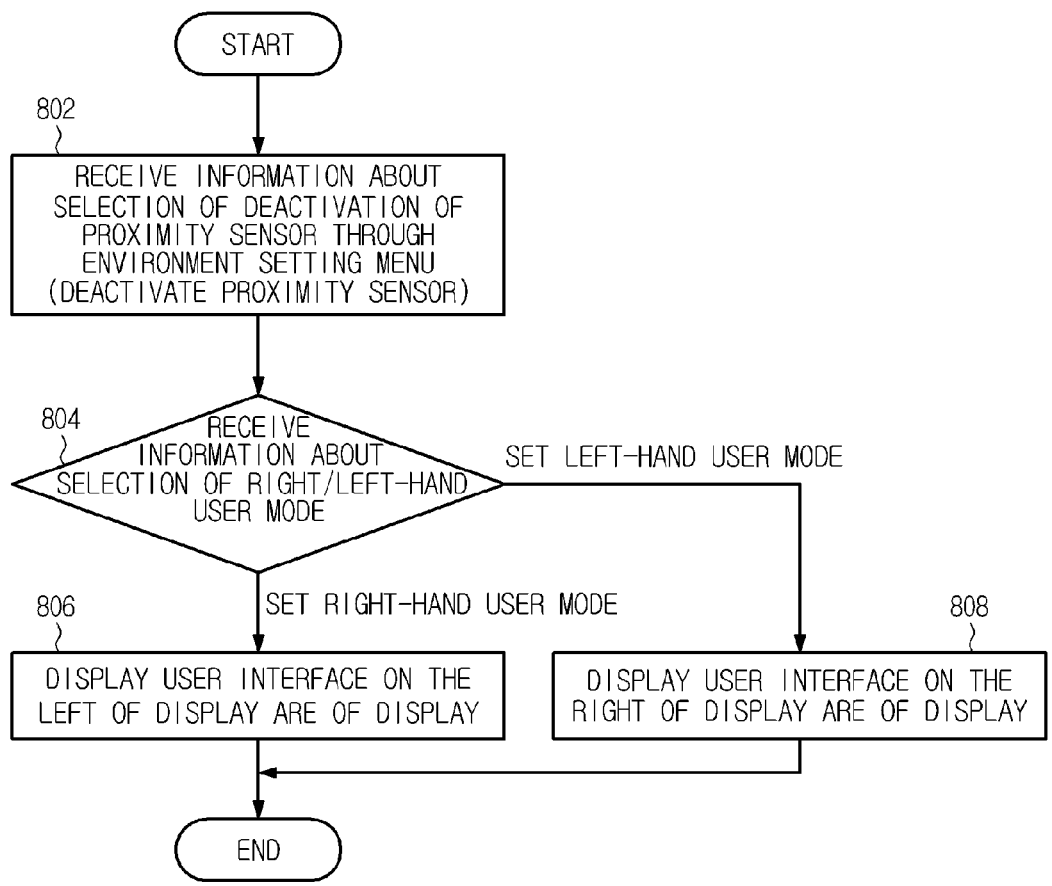
FIG. 8 is a flowchart illustrating a method of manually switching right-hand/left-hand user modes of the tablet according to an embodiment.

FIG. 8 is a flowchart illustrating a method of manually switching between the right-hand user mode and the left-hand user mode of the tablet according to an embodiment. In the manual switching method shown in FIG. 8, one of the right-hand user mode and the left-hand user mode, which is directly selected by the user through the environment setting menu, is fixed as an operation mode while the proximity sensors 112a and 112b are deactivated. Specifically, when the user selects inactivation of the proximity sensors 112a and 112b through the environment setting menu, the controller 402 of the tablet 100 deactivates the proximity sensors 112a and 112b in response to the selection of the user (802). The deactivated proximity sensors 112a and 112b do not respond to proximity of the body (e.g. left hand or right hand) of the user to the tablet 100. The controller 402 receives an external input corresponding to selection of one of the right-hand user mode and the left-hand user mode by the user through the environment setting menu (804). If the user selects the right-hand user mode, the controller 402 switches the operation mode of the tablet 100 to the right-hand user mode and displays the user interface 104 on the left of the display area of the display 102 (refer to FIG. 5) (806). If the user selects the left-hand user mode, the controller 402 switches the operation mode of the tablet 100 to the left-hand user mode and displays the user interface 104 on the right of the display area of the display 102 (refer to FIG. 6) (808). An operation mode directly set by the user through manual switching is maintained until the user switches to the right-hand user mode or left-hand user mode through the environment setting menu or activates the proximity sensors 112a and 112b such that automatic mode switching is performed.

Figure 9:
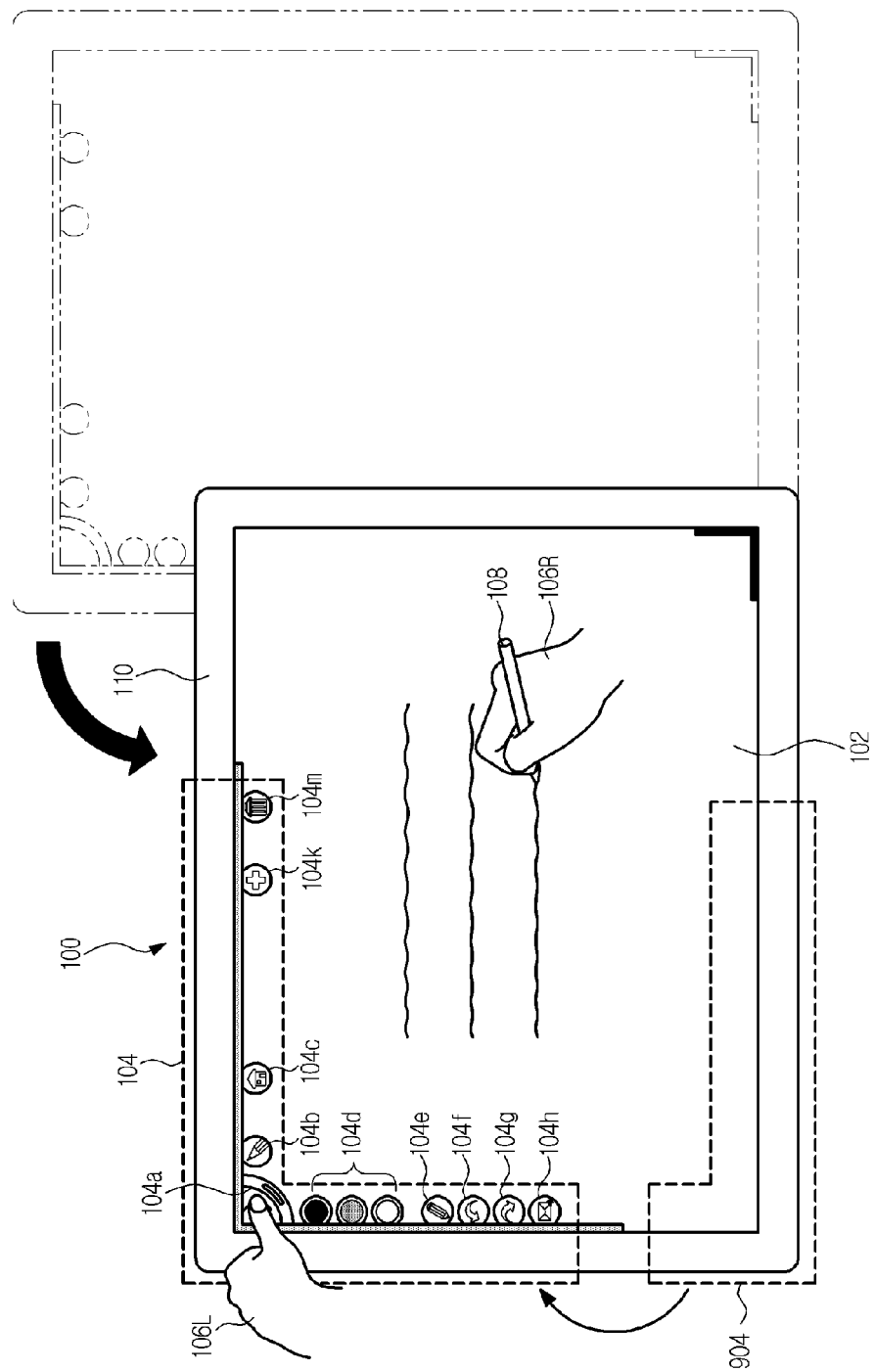
FIG. 9 illustrates automatic position change of the user interface according to rotation of the tablet.

FIG. 9 illustrates automatic position change of the user interface 104 according to rotation of the tablet 100. When the tablet 100 arranged in the portrait form having a shorter width and a longer height as shown in FIG. 5 is rotated by 90° to be positioned in the landscape form having a longer width and a shorter height as shown in FIG. 9, the position of the user interface 104 is automatically moved by 90° on the display 102 in a direction opposite to the rotating direction of the tablet 100 to be positioned in the same location necessary for the right-hand user mode or the left-hand user mode as that before the tablet 100 is rotated. Rotation of the tablet 100 is sensed by the acceleration sensor 406b (or gyroscope sensor). In FIG. 9, reference numeral 904 represents the position of the user interface before the tablet 100 is rotated. It can be seen that the user interface 104 is automatically displayed in a changed location according to rotation of the tablet 100.

FIG. 10 shows examples of various interactions in the tablet 100 according to an embodiment. Referring to FIG. 10, 'tap' is an action of touching a point on the display 102 with a hand and then immediately releasing the hand. 'Drag' is an action of touching a point on the display 102 and dragging the touch to another point. 'Flicking' is an action of flicking the surface of the display 102 at a predetermined velocity or higher like turning the pages of a book. Through this flicking action, a screen or a page can be turned. 'Zoom-in' is an action of touching a point on the display 102 with closely spaced two fingers (e.g. thumb and middle finger or thumb and ring finger) and spreading the two fingers away from each other. Through 'zoom-in' action, a screen displayed on the display 102 can be enlarged and the number of objects (e.g. notes or pages) displayed on the display 102 can be reduced while the size of each object is increased. 'Zoom-out' is an action of touching a point on the display 102 with widely spaced two fingers (e.g. thumb and middle finger or thumb and ring finger) and putting the two fingers together. It is possible to reduce a screen displayed on the display 102 and increase the number of objects (e.g. notes or pages) displayed on the display 102 while decreasing the size of each object through 'zoom-out' action. 'Press' is an action of touching a point on the display 102 with a finger and maintaining the touch. One finger can be used for a press action. 'Writing/drawing' is an action of writing letters or drawing a picture using a pen. The interactions shown in FIG. 10 may be performed by changing a hand gripping a pen and a hand gripping no pen with each other. A description will be given of other characteristics of the tablet 100 according to an embodiment using the various interactions shown in FIG. 10. T, P, D, F, ZI and ZO indicated on hand-shaped icons respectively denote 'tap', 'press', 'drag', 'flicking', 'zoom-in' and 'zoom-out' actions.

FIG. 11 illustrates an expansion characteristic of the expandable menu button 104a of the user interface 104 of the tablet 100 according to an embodiment. When the expandable menu button 104a is tapped, as shown in FIG. 11(a), the expandable menu button 104a is expanded such that lower menu buttons 1104a, 1104b, 1104c, 1104d, 1104e, 1104f, 1104g and 1104h are displayed in an expanded area 1102. In the following description, the lower menu buttons 1104a, 1104b, 1104c, 1104d, 1104e, 1104f, 1104g and 1104h are collectively indicated by 1104. When the expanded menu button 104a in the expanded state is tapped, the expanded menu button 104a in the expanded state, shown in FIG. 11(B), is returned to the state before being expanded as shown in FIG. 11(A).

The lower menu buttons 1104 may include a color setting menu button 1104e, a pen setting menu button 1104f, a tool setting menu button 1104g and a line thickness setting menu button 1104h. The color setting menu button 1104e is a first lower menu button by which various colors are selected and set. The pen setting menu button 1104f is a second lower menu button by which various types of pens are selected and set. The tool setting menu button 1104g is a third lower menu button by which various tools are selected and set. The line thickness setting menu button 1104h is a fourth lower menu button by which a line thickness is selected and set.

A default mode of the expanded expandable menu button 104a is a pen setting mode corresponding to the pen setting menu button 1104f. In the default mode, pen (e.g. pencil), ink pen, brush and highlighter menus 1104a, 1104b, 1104c and 1104d are displayed, and thus the user can select a desired pen from among the pen, ink pen, brush and highlighter menus 1104a, 1104b, 1104c and 1104d. The color setting menu button 1104e is used to call various menus for setting colors to the expanded area 1102. When the color setting menu button 1104*e* is tapped, the menus for setting colors are displayed in the expanded area 1102 and the user can select a desired color from the menus (refer to FIG. 12). The tool setting menu button 1104*g* is used to call various tool menus to the expanded area 1102. When the tool setting menu button 1104*g* is tapped, various tool menus, such as 'cut', 'paste', 'open', etc., are displayed in the expanded area 1102 and the user can select a desired tool from the tool menus (refer to FIGS. 13 to 17). When the pen setting menu button 1104*f* is tapped, the mode of the expanded menu button 104*a* is returned to the default mode, that is, the pen setting mode. The line thickness setting menu button 1104*h* is configured in the form of a slide bar such that a line thickness decreases or increases depending on a slide direction. The user can adjust and select a line thickness by manipulating the line thickness setting menu button 1104*h* in a sliding manner.

Figure 12:
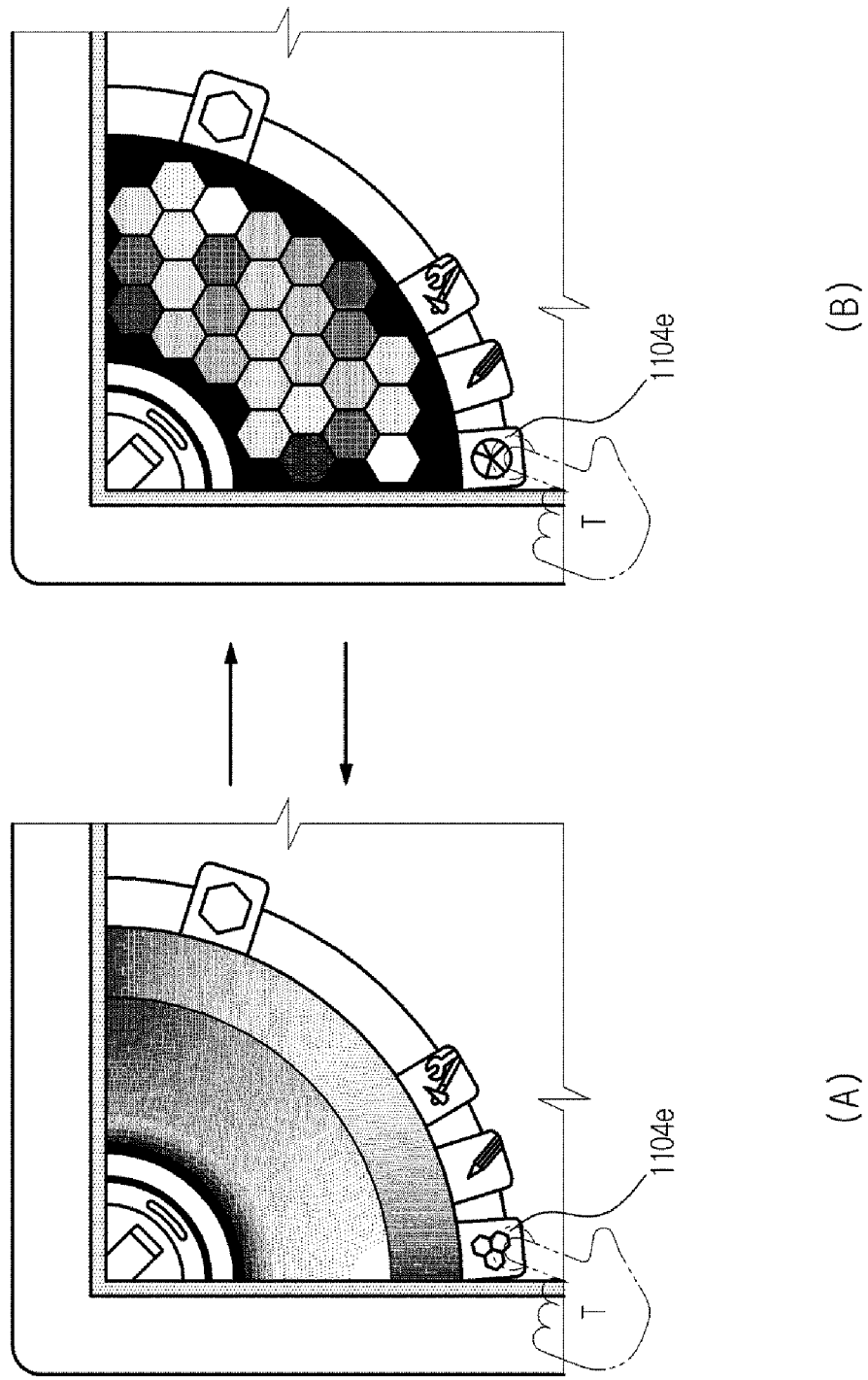
FIG. 12 illustrates a color setting procedure through a color setting menu button.

FIG. 12 illustrates a color setting procedure through the color setting menu button 1104*e*. A sample color display scheme for setting colors includes a color wheel display scheme (FIG. 12(A)) and a honeycomb display scheme (FIG. 12(B)). The color wheel display scheme displays various colors in the form of contiguous strips, as shown in FIG. 12(A), enabling detailed color selection. The honeycomb display scheme displays predetermined standard colors in the form of a honeycomb composed of cells in a predetermined size, as shown in FIG. 12(B), such that the user can conveniently select a desired color. It is possible to display colors in cells having a shape (e.g. square or circle) other than the honeycomb shape. When the color wheel display scheme as shown in FIG. 12(A) is used, the color setting menu button 1104*e* is displayed in a honeycomb shape. When the color setting menu button 1104*e* in the honeycomb shape is touched, the color wheel display scheme is switched to the honeycomb display scheme as shown in FIG. 12(B). On the contrary, when the honeycomb display scheme as shown in FIG. 12(B) is currently used, the color setting menu button 1104*e* is displayed in a color wheel shape. When the color setting menu button 1104*e* in the color wheel shape is touched, the honeycomb display scheme is switched to the color wheel display scheme as shown in FIG. 12(A). While the color wheel display scheme shown in FIG. 12(A) enables detailed color selection, the color wheel display scheme is inconvenient for the user to repeatedly select the same color because a selected color may be changed due to subtle position change on the color wheel. According to the honeycomb display scheme shown in FIG. 12(B), a degree of freedom in color selection is low because only predetermined colors can be selected. However, the honeycomb display scheme is much more convenient for the user to repeatedly set the same color than the color wheel display scheme because different fixed colors are displayed in different cells having a predetermined size in the honeycomb so that a color can be correctly selected only by selecting a cell corresponding to the color.

FIG. 13 illustrates a tool setting procedure through the tool setting menu button 1104*g*. As shown in FIG. 13(A), the tool setting menu button 1104*g* includes a rectangular area selection tool 1302*a*, a free area selection tool 1302*b*, a paste tool 1302*c*, and an image retrieval tool 1302*d*. The rectangular area selection tool 1302*a* is a first tool by which a rectangular cut/copy/delete area is selected. The free area selection tool 1302*b* is a second tool by which the user freely selects a desired cut/copy/delete area. The paste tool 1302*c* is a third tool by which an object selected through cut/copy is pasted into a desired position. The image retrieval tool 1302*d* is a fourth tool by which an image (photo or picture) stored in a storage unit is retrieved.

Figure 14:
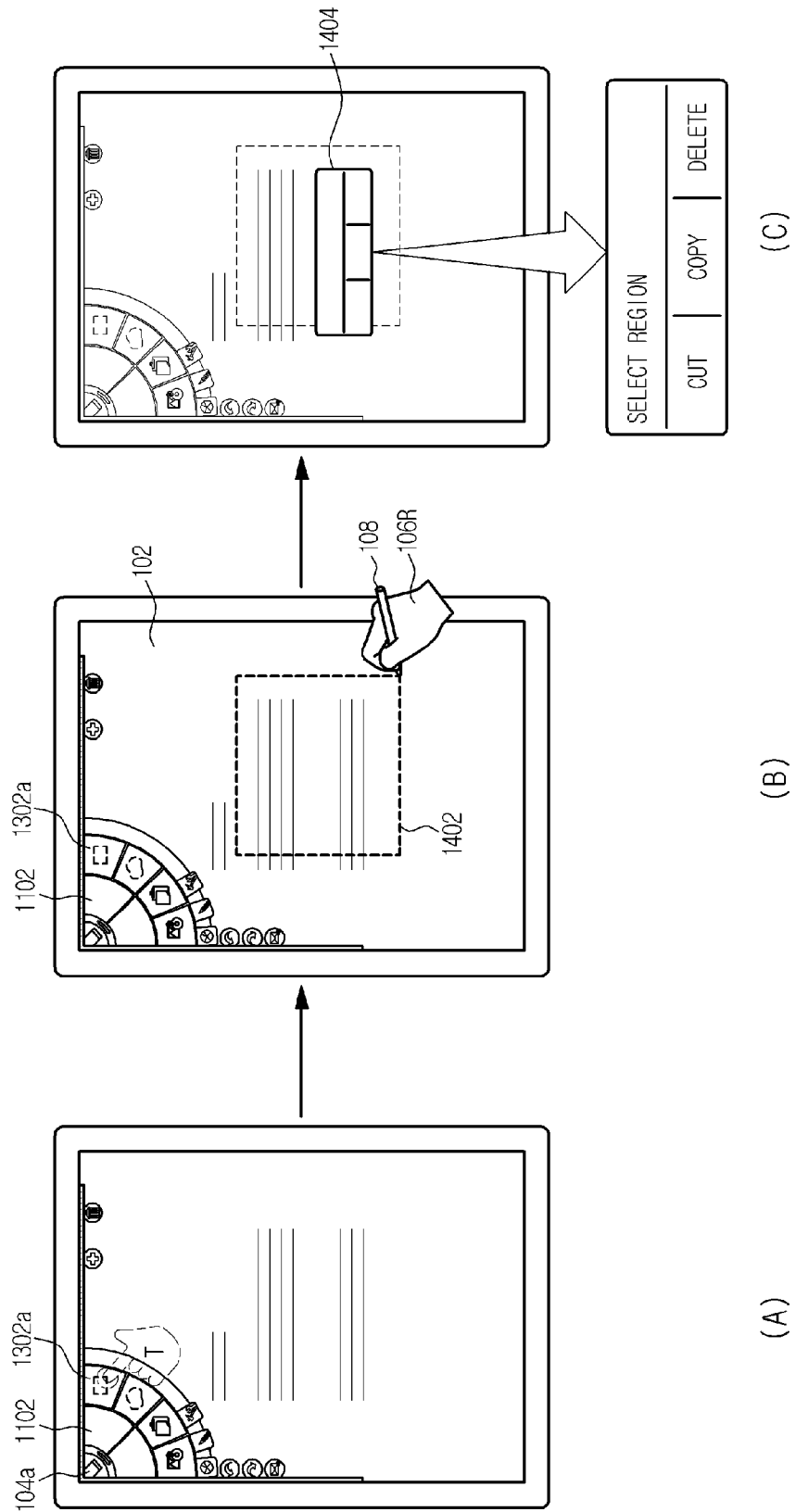
FIG. 14 illustrates a rectangular area selection procedure using a rectangular area selection tool of the tool setting menu button.

FIG. 14 illustrates a rectangular area selection procedure using the rectangular area selection tool 1302*a* of the tool setting menu button 1104*a*. As shown in FIG. 14, when the rectangular area selection tool 1302*a* displayed in the expanded area 1102 is tapped (FIG. 14(A)) and the pen 108 is dragged from a point on the display 102 to another point, a rectangle 1402 having a line connecting the one point and the other point as a diagonal line is displayed on the display 102 (FIG. 14(B)). The inside of the rectangle 1402 becomes a target of cut/copy/delete. When the pen 108 is removed from the display 102 after the rectangle 1402 is set, a pop-up 1404 that inquires whether to cut/copy/delete the target defined by the rectangle 1402 is generated (FIG. 14(C)) such that the user can cut, copy or delete the target by selecting a menu through the pop-up 1404.

Figure 15:
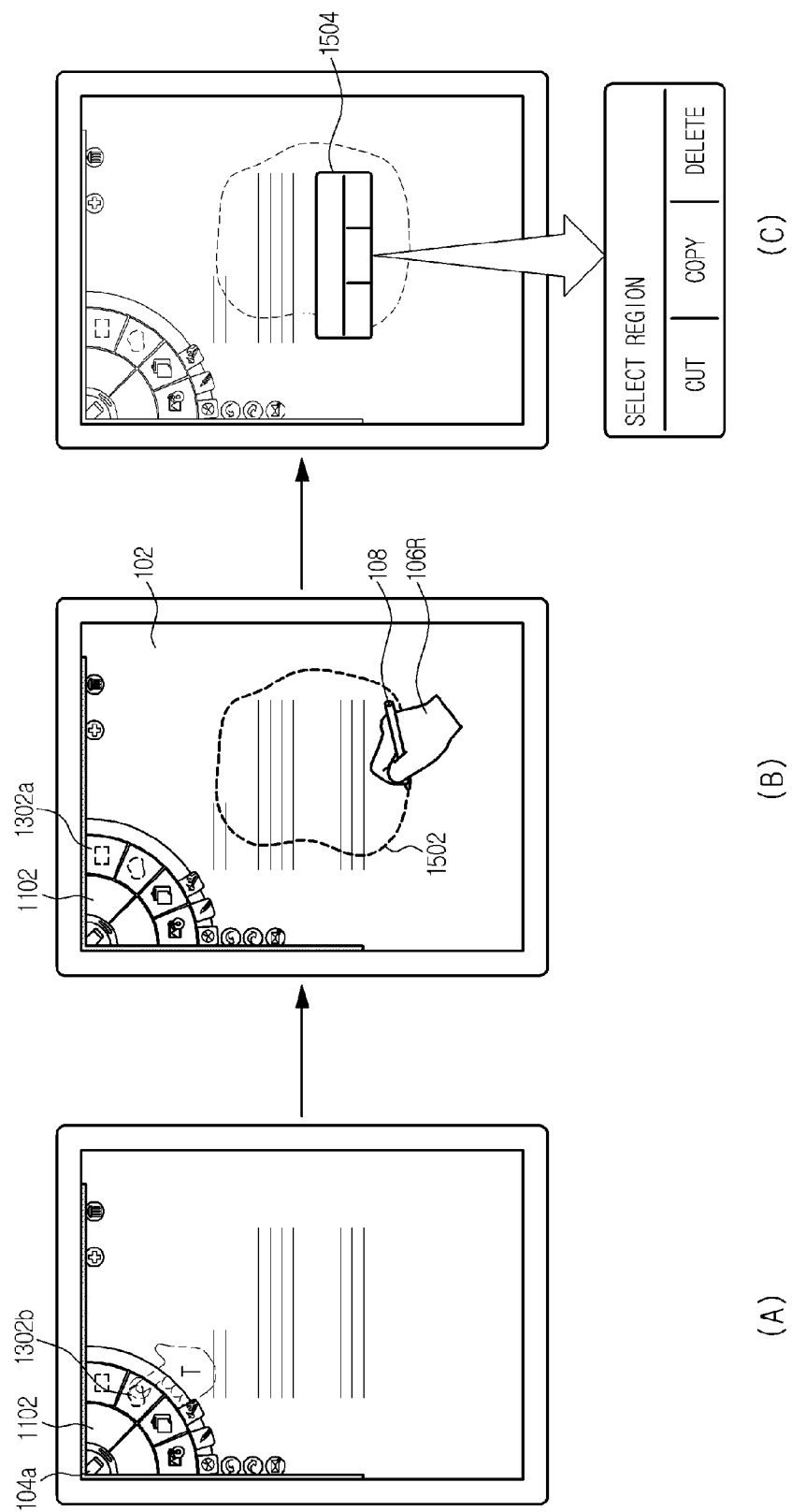
FIG. 15 illustrates a free area selection procedure using a free area selection tool of the tool setting menu button.

FIG. 15 illustrates a free area selection procedure using the free area selection tool 1302*b* of the tool setting menu button 1104*g*. As shown in FIG. 15, when the free area selection tool 1302*b* displayed in the expanded area 1102 is tapped (FIG. 15(A)) and the pen 108 is moved on the surface of the display 102 in a shape the user desires, a FIG. 1502 corresponding to the moving trajectory of the pen 108 is displayed on the display 102 (FIG. 15(B)). The inside of the FIG. 1502 becomes a target of cut/copy/delete. When the pen 108 is removed from the display 102 after the FIG. 1502 is set, a pop-up 1504 that inquires whether to cut/copy/delete the target corresponding the inside of the FIG. 1502 is generated (FIG. 15(C)) such that the user can cut, copy or delete the target by selecting a menu through the pop-up 1504.

Figure 16:
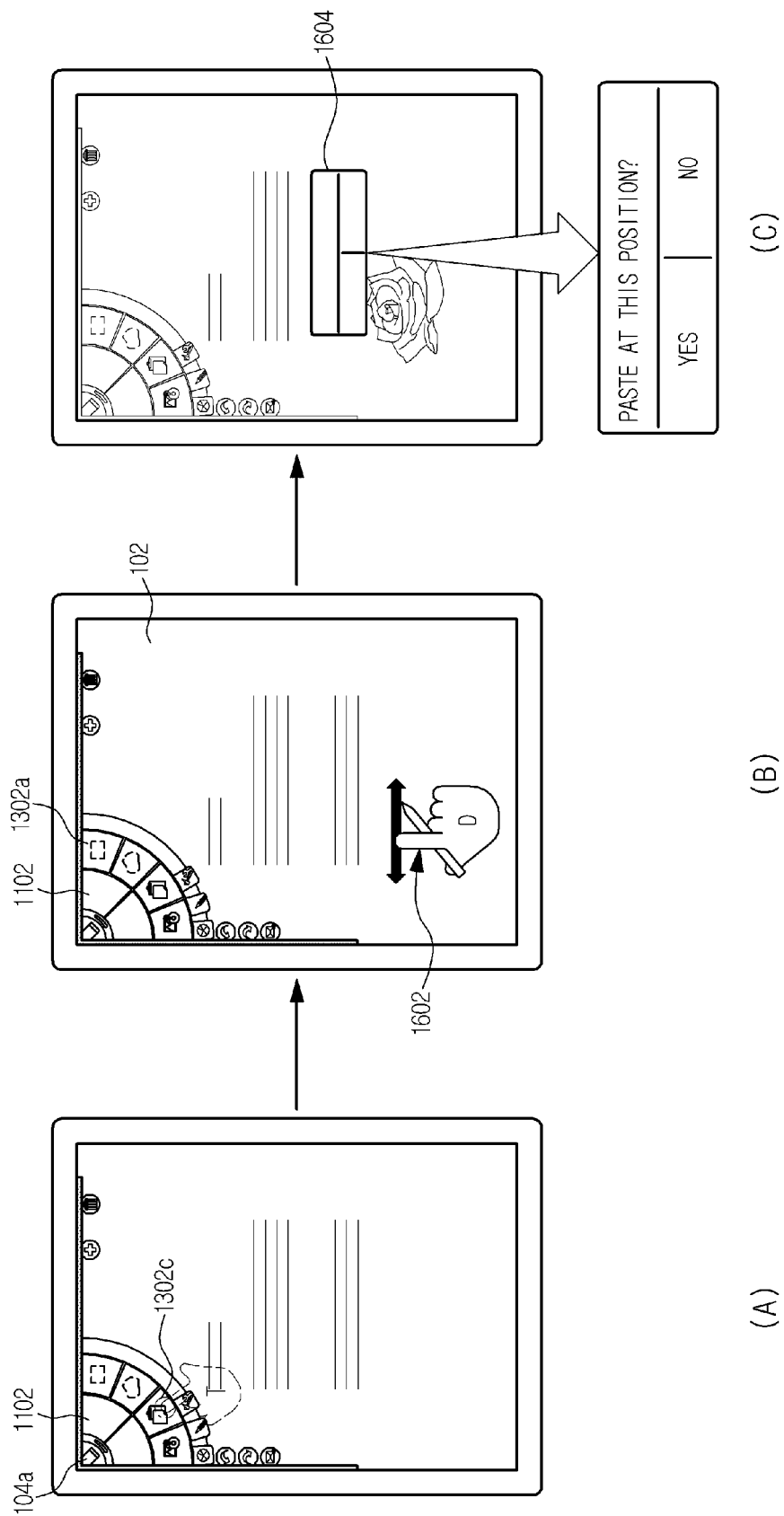
FIG. 16 illustrates a paste procedure using a paste tool of the tool setting menu button.

FIG. 16 illustrates a paste procedure using the paste tool 1302*c* of the tool setting menu button 1104*g*. When the paste tool 1302*c* is tapped (FIG. 16(A)), a paste position 1602 on the display 102 is dragged (tapped) with part of the body of the user (e.g. a finger), and then the display 102 is tapped with the pen 108 (FIG. 16(B)) while data cut or copied through the procedure illustrated in FIG. 14 and data cut or copied through the procedure illustrated in FIG. 15 are temporarily stored in a clipboard, a pop-up 1604 that confirms whether the paste position 1602 is correct is generated (FIG. 16(C)) such that the user can confirm the paste position by selecting a menu through the pop-up 1604 to paste the data at the position 1602.

Figure 17:
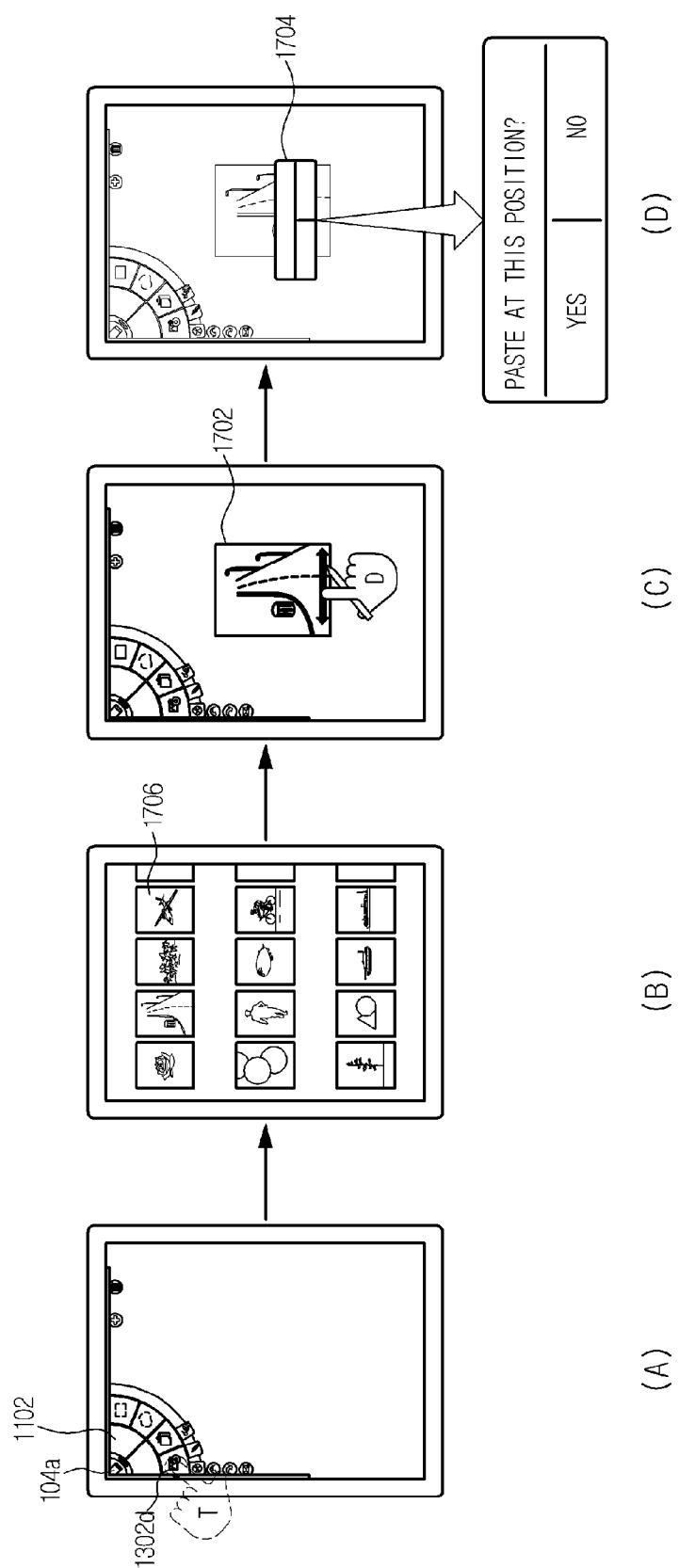
FIG. 17 illustrates an image retrieval procedure using an image retrieval tool of the tool setting menu button.

FIG. 17 illustrates an image retrieval procedure using the image retrieval tool 1302*d* of the tool setting menu button 1104*g*. As shown in FIG. 17, when the image retrieval tool 1302*d* displayed in the expanded area 1102 is tapped (FIG. 17(A)), thumbnails 1706 of stored images are displayed on the display 102 (FIG. 17(B)). When the user selects a desired image by tapping or dragging a thumbnail corresponding to the image, drags (or taps) a paste position 1702 on the display 102, and then taps the display 102 with the pen 108 (FIG. 17(B)), a pop-up 1704 that inquires whether to paste the image at the position 1702 is generated (FIG. 17(C)). The user can paste the image at the position 1702 through the pop-up 1704.

Figure 18:
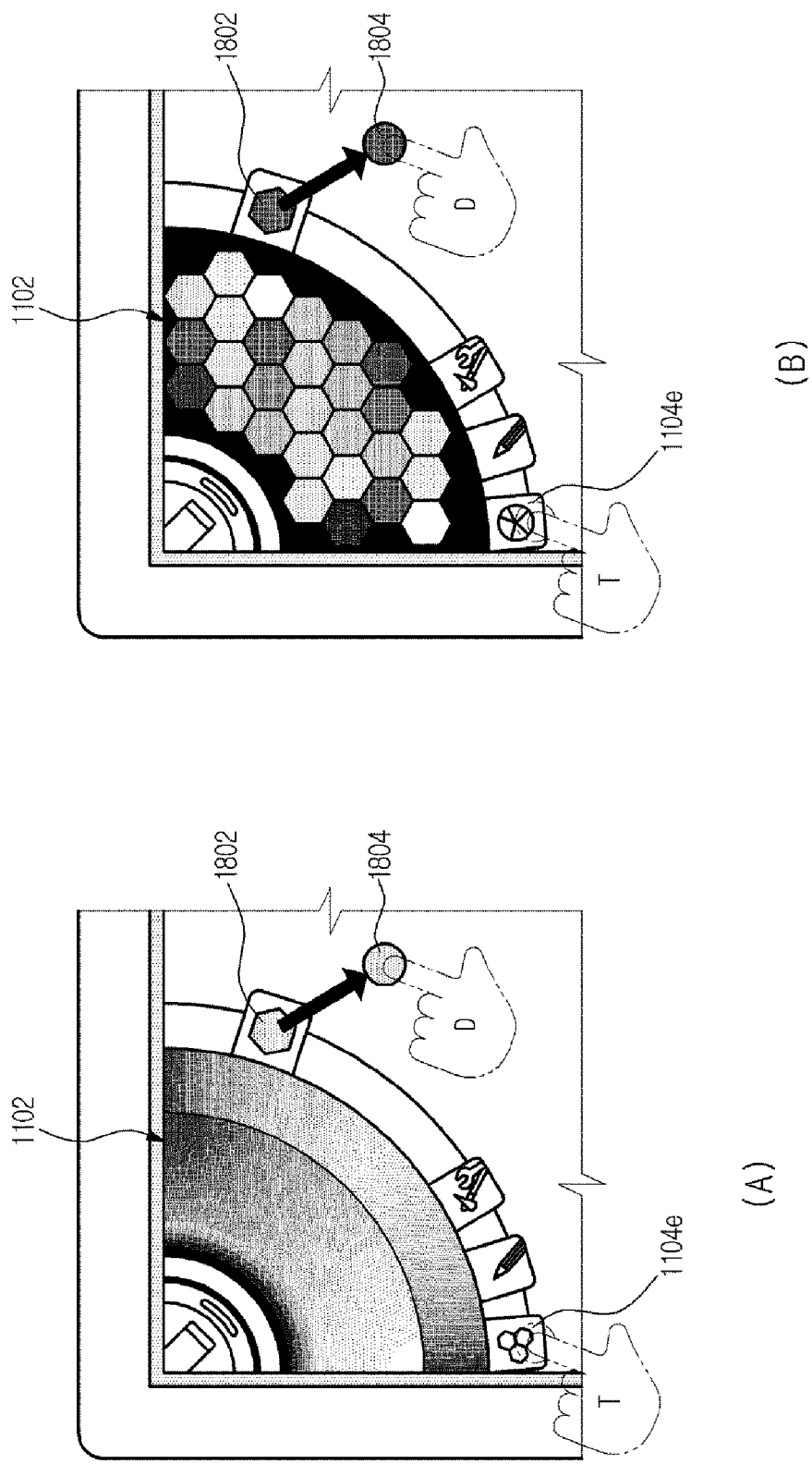
FIG. 18 illustrates a procedure of moving lower menu buttons included in an expanded area of the expandable menu button out of the expanded area to generate independent menu buttons.

FIG. 18 illustrates a procedure of moving lower menu buttons included in the expanded area 1102 of the expandable menu button 104*a* out of the expanded area 1102 to generate independent menu buttons. When the lower menu buttons, which are displayed in the expanded area 1102 when the expandable menu button 104*a* is expanded, are moved out of the expanded area 1102 through drag & drop, independent menu buttons corresponding to the lower menu buttons are generated outside the expanded area 1102. For example, when a color display menu button 1802 corresponding to a lower menu button is dragged and dropped to the outside of the expanded area 112, an independent menu button 1804 in a currently selected color, by which the currently selected color can be selected, is generated, as shown in FIGS. 18(A) and 18(B). The corresponding color can be rapidly selected by tapping the independent menu button 1804. Provided that the user frequently uses a red color, the user selects the red color from the color wheel of FIG. 18(A) or the honeycomb of FIG. 18(B) to display the color display menu button 1802 in red, and then drags and drops the color display menu button 802 in red to the outside of the expanded area 1102. Then, the independent menu button 1804 by which red can be selected is generated outside the expanded area 1102. In this manner, the user can immediately select the red color only by tapping the independent menu button 1804 when the user wants to use the red color. The position of the independent menu button 1804 generated as above can be freely changed within the display area of the display 102.

Figure 19:
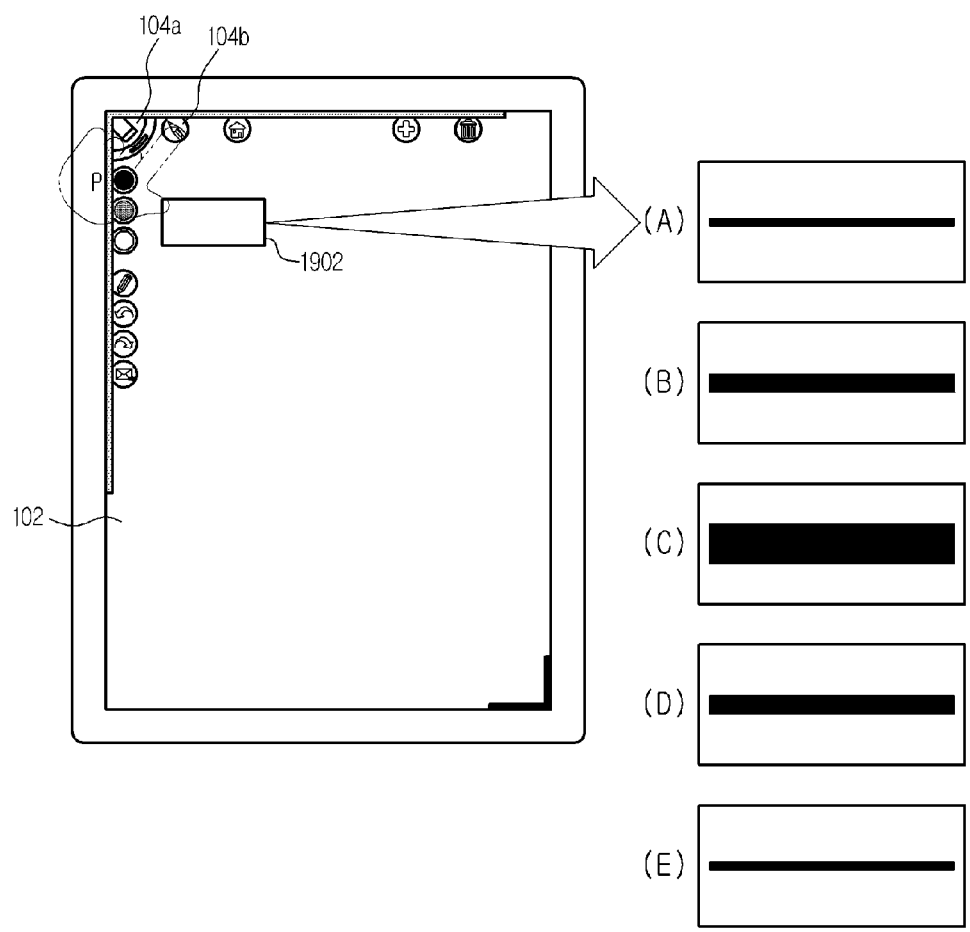
FIG. 19 illustrates a fast line thickness change procedure of the tablet according to an embodiment.

FIG. 19 illustrates a fast line thickness change procedure of the tablet 100 according to an embodiment. Upon pressing the 'adjust pen thickness/select pen' menu button 104b for a predetermined time or longer, a plurality of predetermined line thicknesses is displayed in order in a line thickness display window 1902. That is, line thicknesses are displayed in the order of (A), (B) and (C) of FIG. 19 from a predetermined minimum thickness to a predetermined maximum thickness. After display of the maximum thickness, the line thicknesses are displayed in the order of (C), (D) and (E) of FIG. 19 from the maximum thickness to the minimum thickness. When the pressed state is ended by removing the hand from the 'adjust pen thickness/select pen' menu button 104b, writing/drawing is performed in a line thickness displayed when the pressed state is ended. In this manner, it is possible to easily and rapidly adjust and select a line thickness by pressing the 'adjust pen thickness/select pen' menu button 104b.

Figure 20:
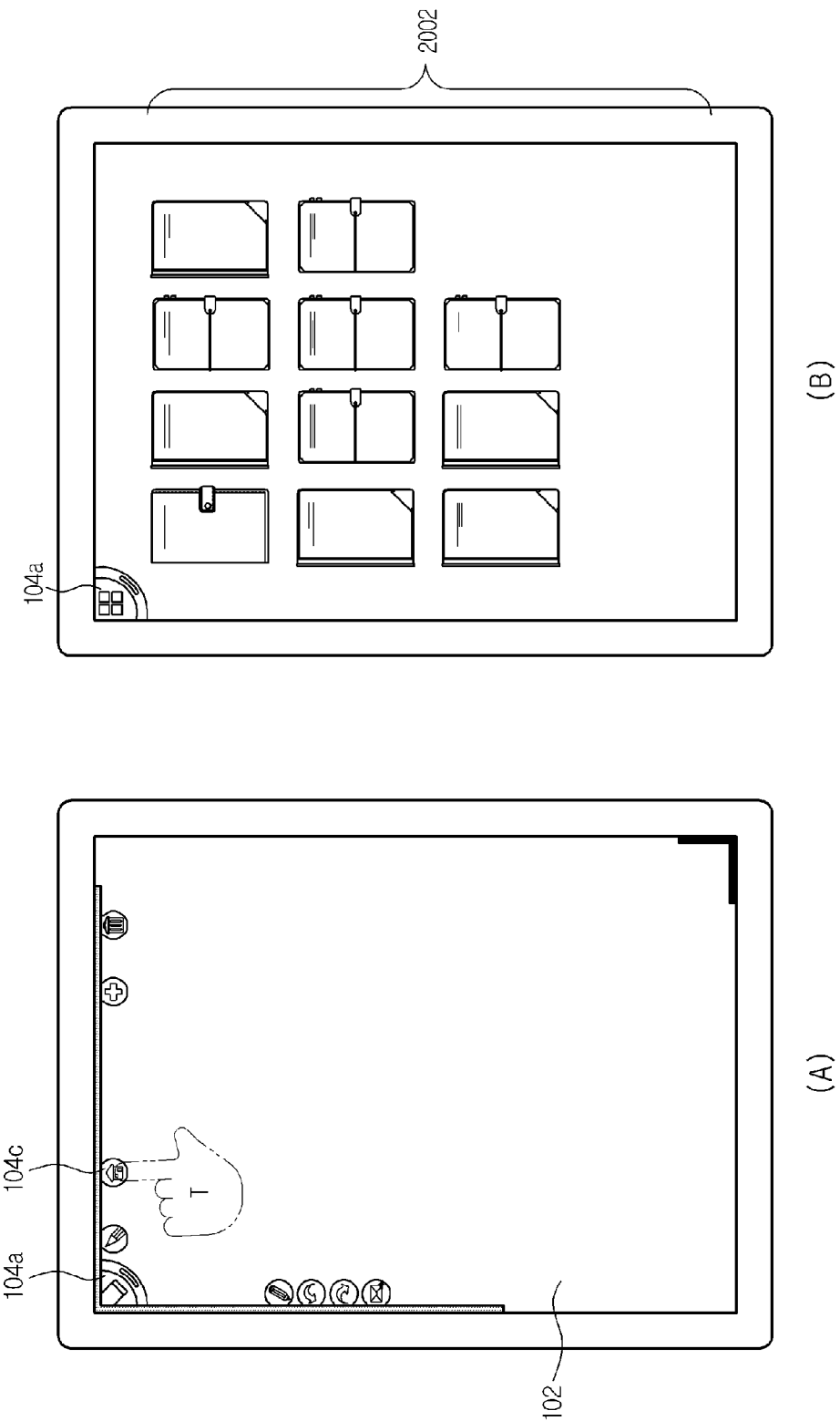
FIG. 20 illustrates a procedure of switching a page level and a note level by tapping a 'Home' menu button.

FIG. 20 illustrates a procedure of switching a page level and a note level by tapping the 'home' menu button 104c. Upon tapping the 'home' menu button 104c at the page level shown in FIG. 20(A), the page level is immediately switched to the note level of FIG. 20(B) such that note level work can be performed. At the note level, operations of selecting, deleting and copying a note 2002 and generating a new note can be performed. FIG. 20(B) shows 11 notes. When the expandable menu button 104 is tapped at the note level, the note level is switched to the page level. At the page level, writing, drawing, deleting, copy and new page generation operations can be performed.

Figure 21:
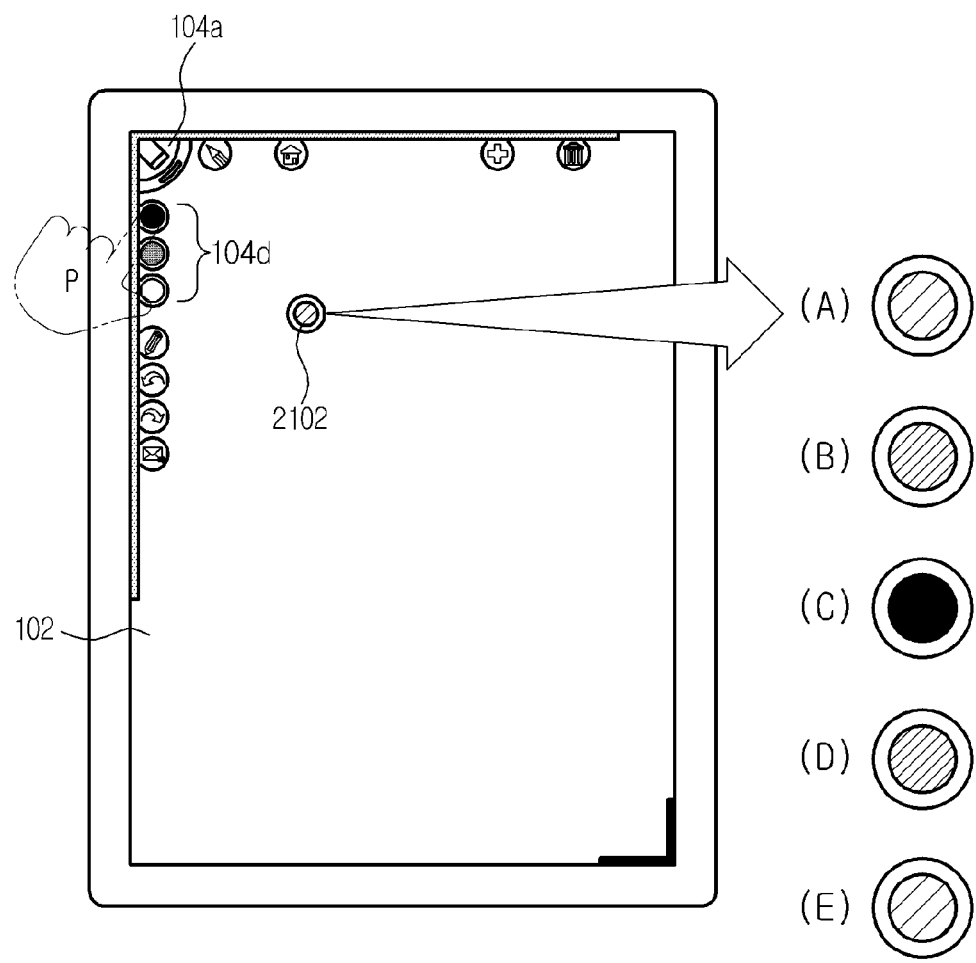
FIG. 21 illustrates a fast saturation/brightness change procedure of the tablet according to an embodiment.

FIG. 21 illustrates a fast saturation/brightness change procedure of the tablet 100 according to an embodiment. Upon pressing the 'select color/adjust saturation' menu button 104d for a predetermined time or longer, saturations of a corresponding color are sequentially displayed through a saturation display window 2102 from a predetermined minimum value to a predetermined maximum value. That is, saturations are sequentially displayed in the order of (A), (B) and (C) of FIG. 21 from a predetermined minimum value to a predetermined maximum value. After display of the maximum saturation, the saturations are sequentially displayed in the order of (C), (D) and (E) of FIG. 21 from the maximum value to the minimum value. The pressed state is ended by removing the hand from the 'select color/adjust saturation' menu button 104d, the saturation of a chromatic color, displayed when the pressed state is ended, is selected and writing/drawing is performed in the saturation. In the case of an achromatic color, brightness instead of saturation can be displayed and selected. In this manner, it is possible to adjust and select a saturation or brightness easily and rapidly by pressing the 'select color/adjust saturation' menu button 104d.

Figure 22:
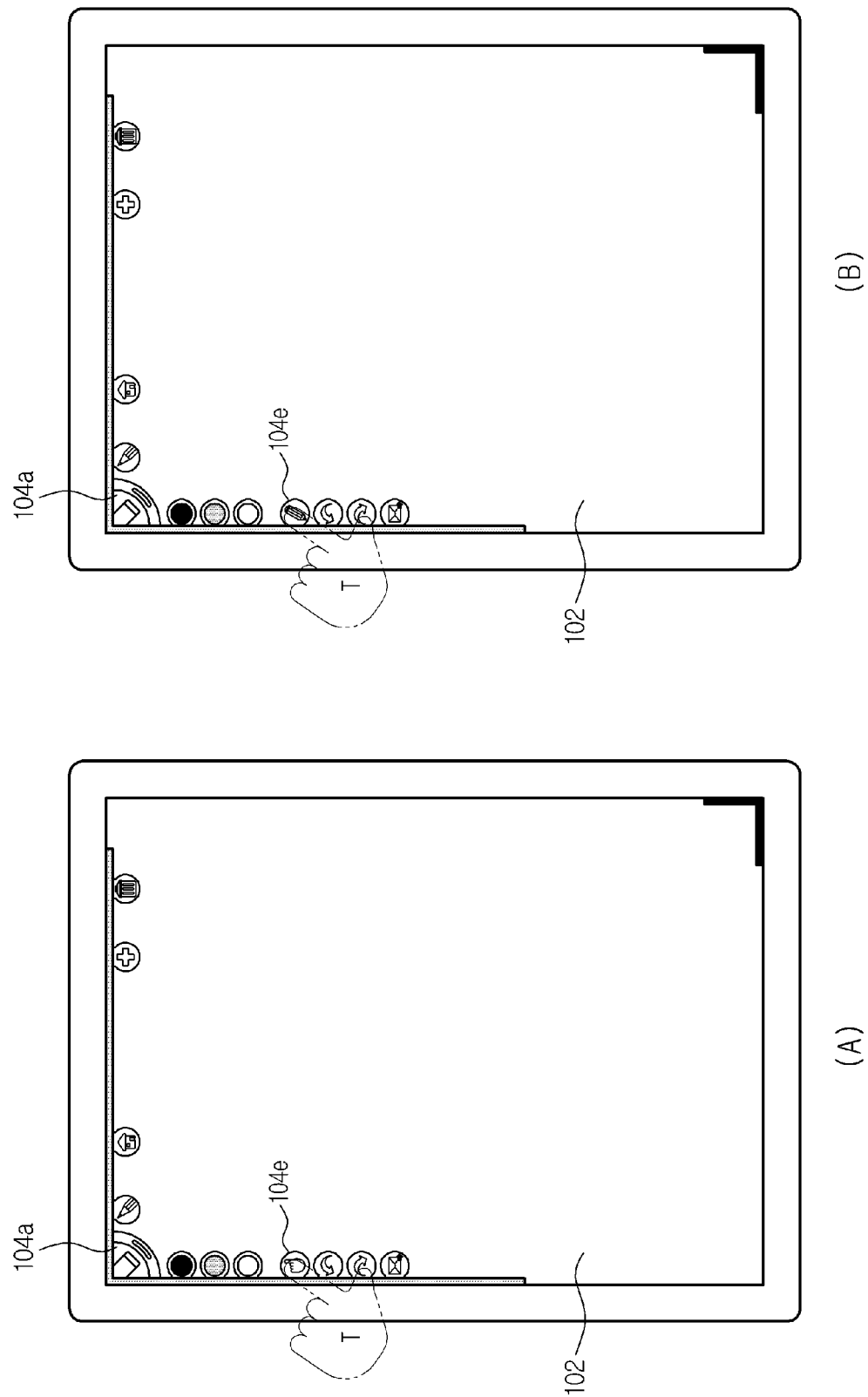
FIG. 22 illustrates a procedure of selecting a pen-based input mode and a touch-based input mode in the tablet according to an embodiment.

FIG. 22 illustrates a procedure of selecting a pen-based input mode and a touch-based input mode in the tablet 100 according to an embodiment. The 'toggle pen/touch' menu button 104e is used to select one of the pen-based input mode and the touch-based input mode. Whenever the user taps the 'toggle pen/touch' menu button 104e, the input mode is toggled between the pen-based input mode and the touch-based input mode. When the user taps the 'toggle pen/touch' menu button 104e in the touch-based input mode shown in FIG. 22(A), the touch-based input mode is switched to the pen-based input mode as shown in FIG. 22(B) (the shape of the menu button 104e is changed to a pen shape). When the user taps the 'toggle pen/touch' menu button 104e in the pen-based input mode shown in FIG. 22(B), the pen-based input mode is switched to the touch-based input mode as shown in FIG. 22(A) (the shape of the menu button 104e is changed to a hand shape).

Figure 23:
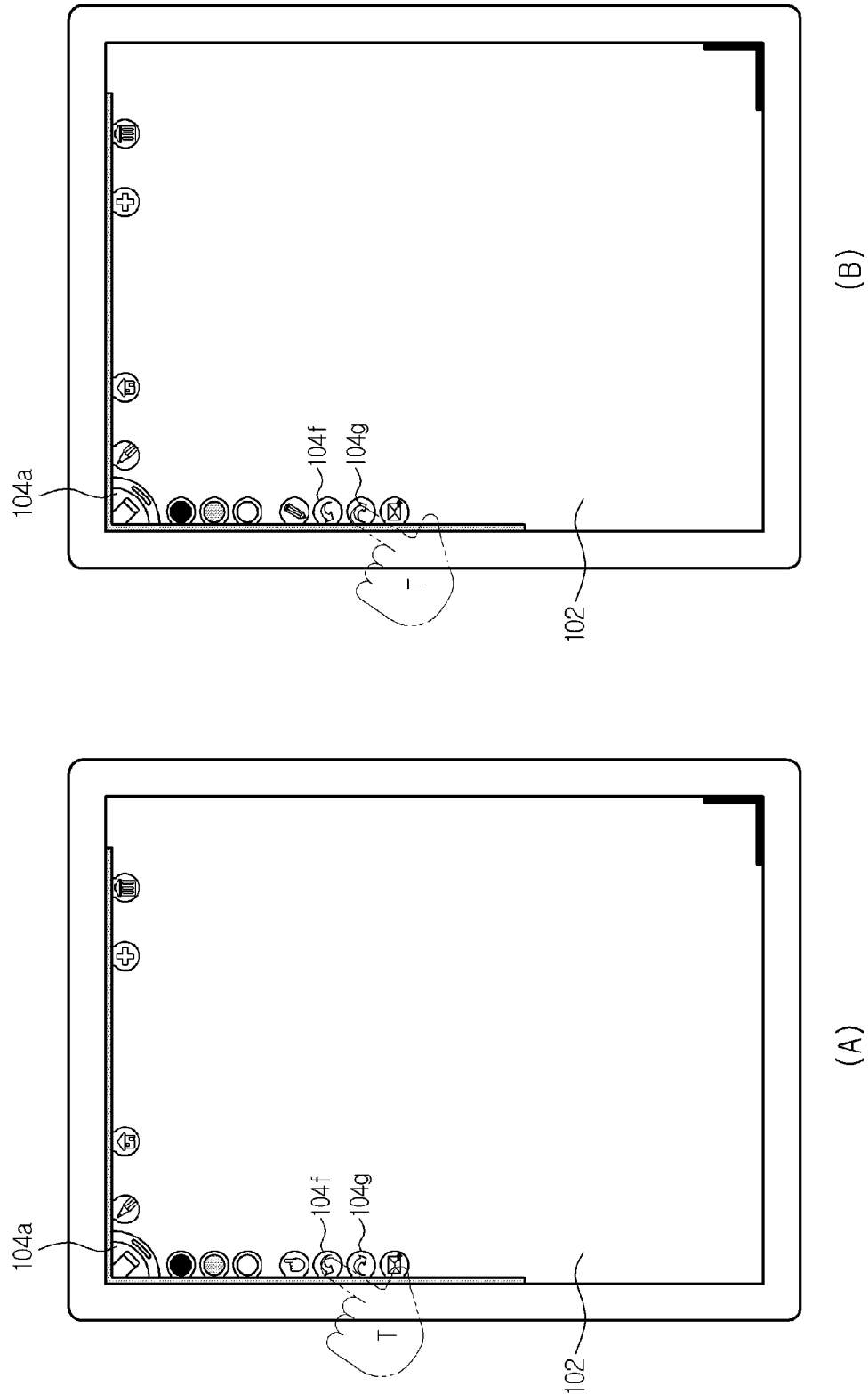
FIG. 23 illustrates undo and redo procedures.

FIG. 23 illustrates undo and redo procedures. The 'undo' menu button 104f is used to sequentially cancel previous operations one by one from the latest operation to return to a previous state, as shown in FIG. 23(A). For example, if recent operations have been performed in the order of 'writing 1→writing 2→deleting 1→writing 3', execution of the operations is cancelled in the order of 'writing 3→deleting 1→writing 2→writing 1' whenever the 'undo' menu button 104f is tapped. The 'redo' menu button 104g is used to cancel restoration of unit operations, performed through the 'undo' menu button 104f, one by one, as shown in FIG. 23(B). For example, when execution of the operations is cancelled in the order of 'writing 3→deleting 1→writing 2→writing 1' as described above, the operations are executed in the order of 'writing 1→writing 2→deleting 1→writing 3' whenever the 'redo' menu button 104g is tapped.

FIG. 24 illustrates a procedure of transmitting a current page through e-mail or social network service (SNS). The SNS menu button 104h is used to transmit a page through at least one of e-mail and SNS. When the SNS menu button 104h shown in FIG. 24(A) is tapped, a pop-up 2402 is generated, as shown in FIG. 24(B). The pop-up 2401 displays menus such as Bluetooth, Social Hub, E-mail, Photo Editor, Allshare, Dropbox, G-mail, Picasa, Wi-Fi Direct, etc. The user can select a desired menu from these menus to use a service corresponding to the selected menu. For example, the user can upload content to SNS through Social Hub, attach content to E-mail and send the e-mail, or execute Photo Editor to edit image content. Social Hub is an integrated manager that simultaneously displays texts and messages uploaded to various SNSs such as Twitter, Facebook, etc. in real time. Allshare is used to easily connect a computer, a digital camera, a smartphone, etc. through a wireless network. A wireless router can be used to construct the wireless network. Dropbox is a cloud hosting service. G-mail is an e-mail service provided by Google. Picasa is a photo management application provided by Google. Other photo applications may be used. In addition to Bluetooth, Social Hub, e-mail, Photo Editor, Allshare, Dropbox, G-mail, Picasa and Wi-Fi Direct, systems having identical or similar functions can be used.

Figure 25:
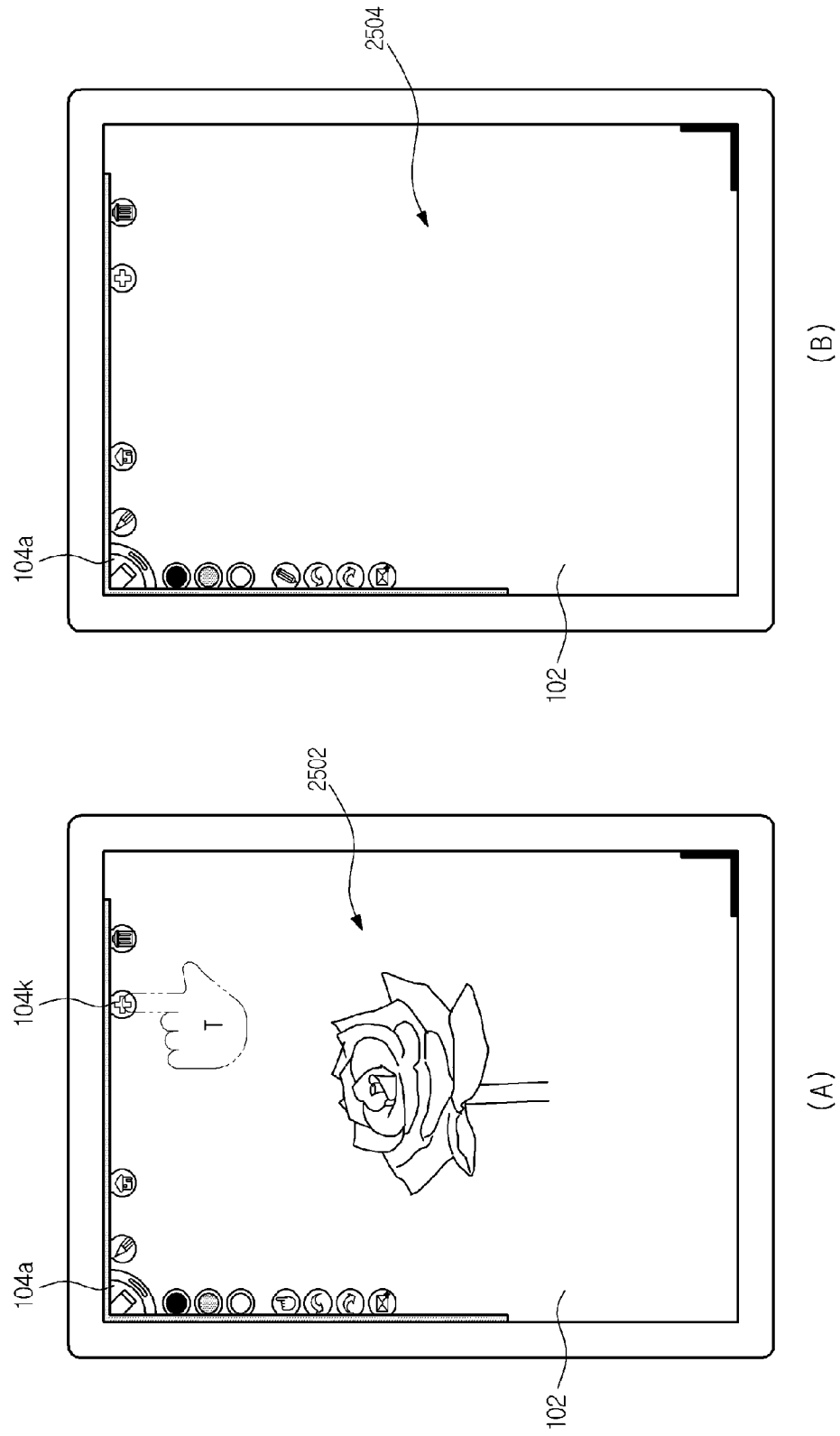
FIG. 25 illustrates a procedure of generating a new page.

FIG. 25 illustrates a procedure of generating a new page. Upon tapping the 'generate page' menu button 104k while a previous page 2502 is displayed, a new page 2504 is generated (added), as shown in FIG. 25. If no page has been generated, a first new page having no content is generated. If at least one page has been generated, a new page having no content is added after the current page.

Figure 26:
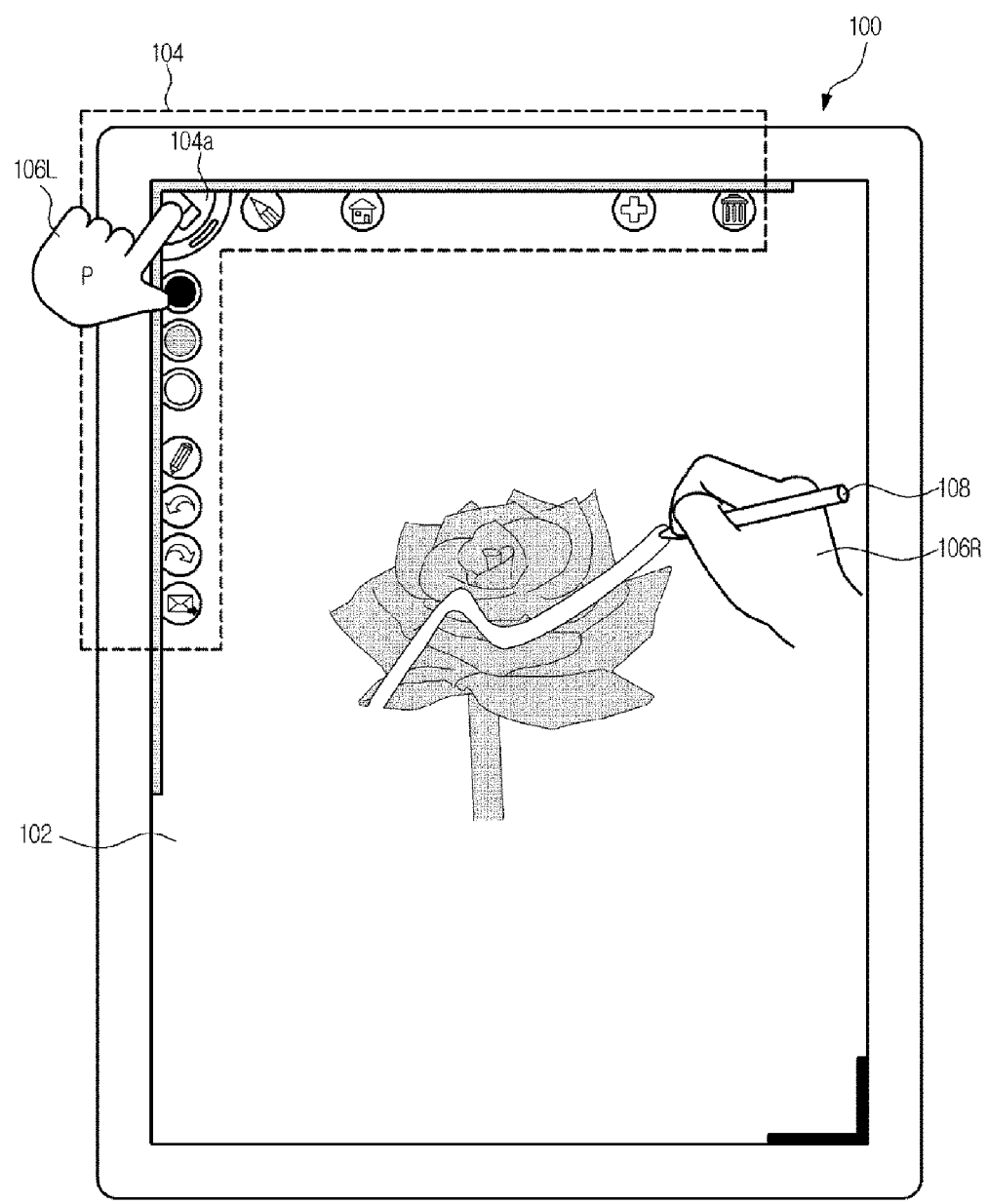
FIG. 26 illustrates a fast eraser mode of the tablet according to an embodiment of an embodiment.

FIG. 26 illustrates a fast eraser mode of the tablet 100 according to an embodiment. As shown in FIG. 26, when the expandable menu button 104a is pressed while the expandable menu button 104a is not expanded, content of a current page can be erased using the pen 108. Specifically, in the right-hand user mode, the user can perform erasing and recording (writing/drawing) using the pen 108 gripped by the right hand 106R, rapidly switching between erasing and recording, while pressing the integrated menu button 104a with the left hand 106L. In this case, continuity of the right-hand work can be secured, remarkably improving work efficiency.

Figure 27:
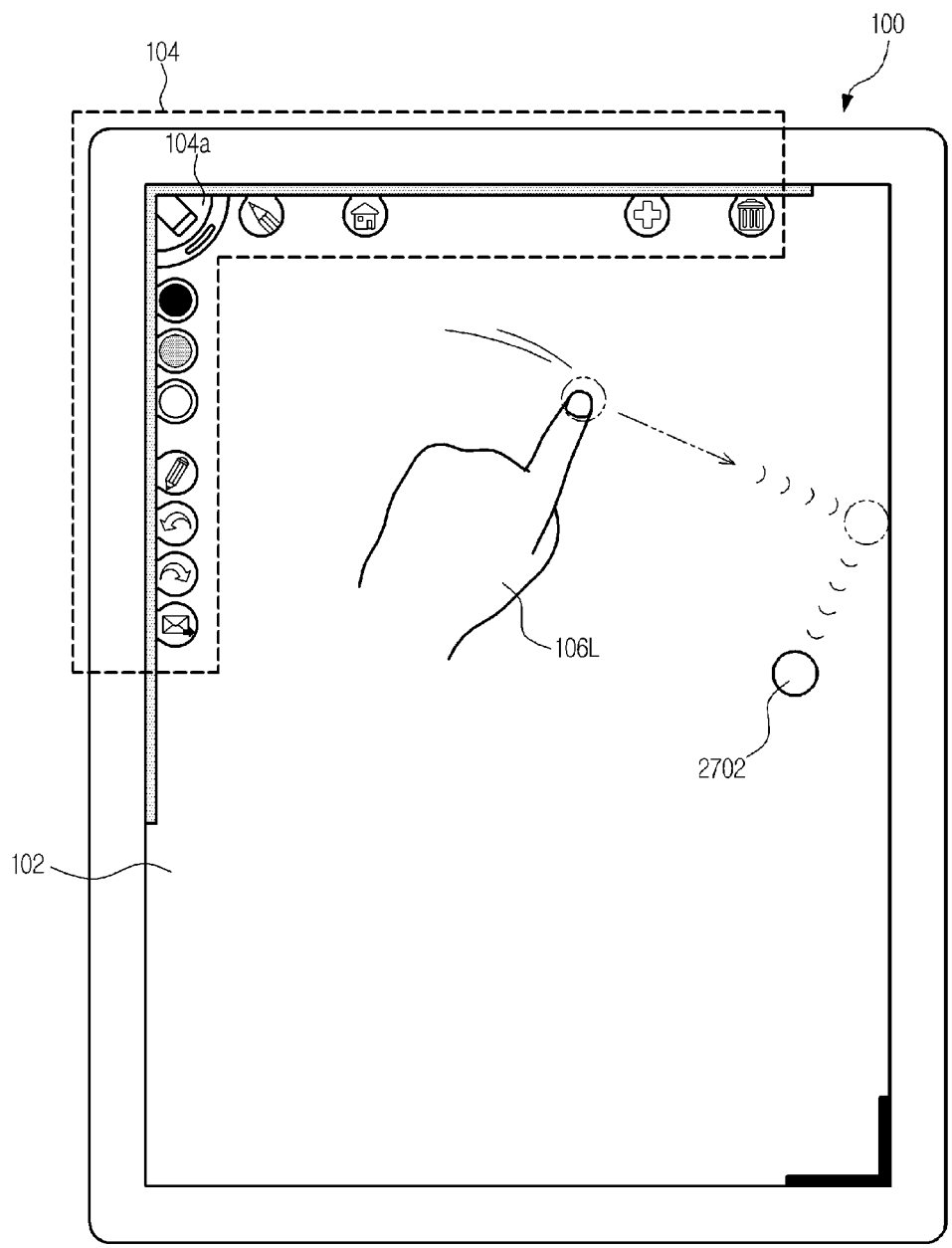
FIG. 27 illustrates a first characteristic of independent menu buttons of the tablet according to an embodiment.

FIG. 27 illustrates a first characteristic of an independent menu button 2702 of the tablet 100 according to an embodiment. The first characteristic is elasticity. That is, according to the first characteristic, the independent menu button 2702 moves as if it has elasticity through graphical representation on the display 102. When the user flicks the independent menu button 2702, as shown in FIG. 27, motion of the independent menu button 2702 is represented in such a manner that the independent menu button 2702 moves, changes moving direction according to elasticity thereof when colliding with an object (e.g. the boundary of the display area or another independent menu button), and then the moving velocity of the independent menu button 2702 decreases and gradually stops (as would a pool ball on a pool table). The moving velocity and distance of the independent menu button 2702 are determined by the intensity of flicking applied to the independent menu button 2702. The moving velocity and distance of the independent menu button 2702 increase when the independent menu button 2702 is strongly flicked and decrease when the independent menu button 2702 is weakly flicked. In this manner, the independent menu button 2702 is represented as if it has elasticity such that the independent menu button 2702 moves like a pool ball on a pool table through graphical representation. Accordingly, it is possible to provide a casual game element or visual entertainment through the independent menu button 2702. The same casual game element or visual entertainment can be provided by representing an icon of content (e.g. an icon of a note or a page or a thumbnail of an image) instead of the independent menu button 2702 as if the icon has elasticity. The first characteristic, elasticity, of the independent menu button 2702 can be selectively activated or deactivated through the environment setting menu of the tablet 100.

Figure 28:
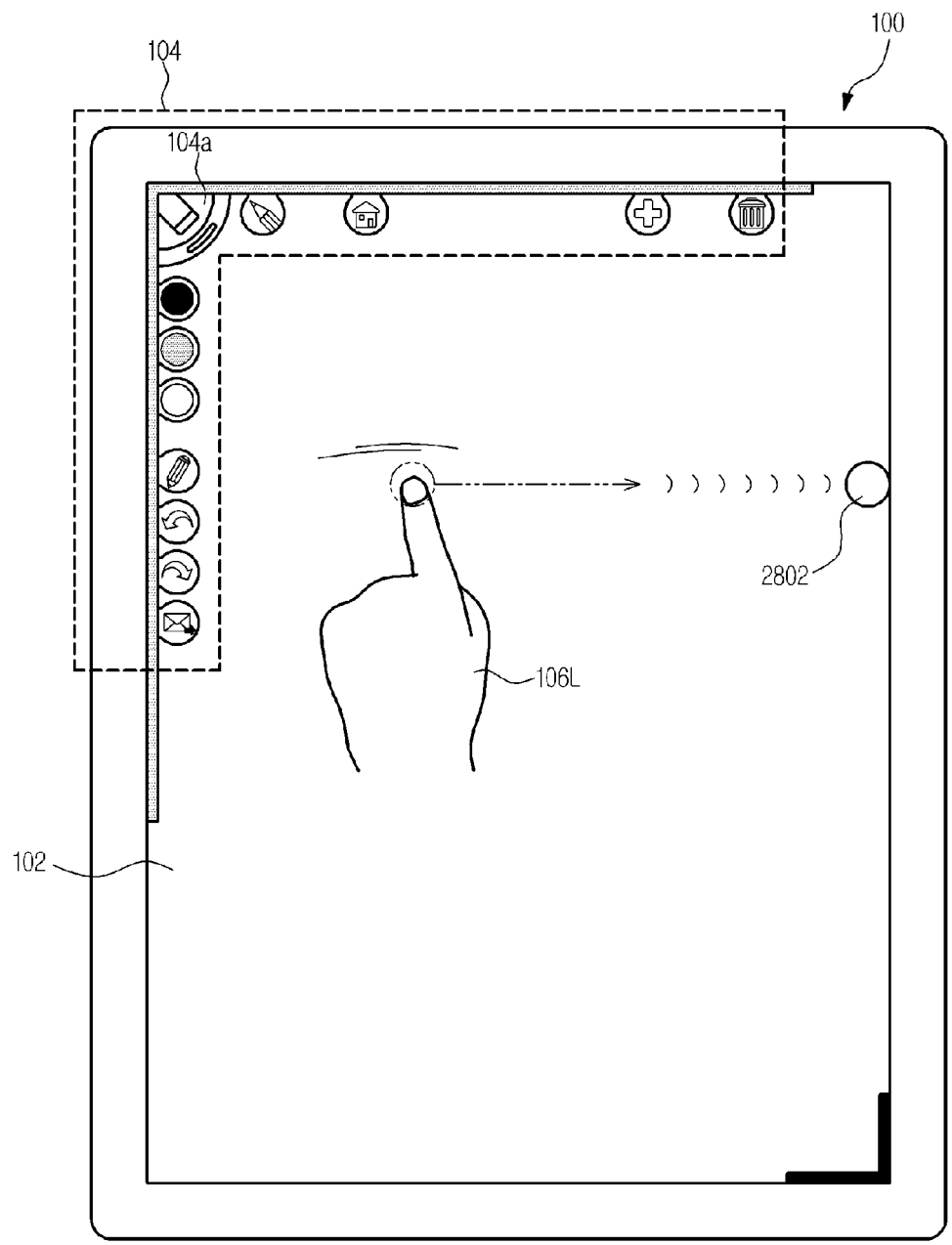
FIG. 28 illustrates a second characteristic of the independent menu buttons of the tablet according to an embodiment.

FIG. 28 illustrates a second characteristic of an independent menu button 2802 of the tablet 100 according to an embodiment. The second characteristic is magnetism. According to the second characteristic, the independent menu button 2802 moves as if it has magnetism through graphical representation on the display 102. When the user flicks the independent menu button 2802, as shown in FIG. 28, a motion of the independent menu button 2802 is represented in such a manner that the independent menu button 2802 moves and sticks to an object (e.g. the boundary of the display area or another independent menu button) when coming into contact with the object (as if a magnet and metal stick to each other). The moving velocity and distance of the independent menu button 2802 are determined by the intensity of flicking applied to the independent menu button 2802. The moving velocity and distance of the independent menu button 2802 increase when the independent menu button 2802 is strongly flicked and decrease when the independent menu button 2802 is weakly flicked. In this manner, the independent menu button 2802 is represented as if it has magnetism to move like a magnet through graphical representation. Accordingly, it is possible to provide a casual game element or visual entertainment through the independent menu button 2802. The same casual game element or visual entertainment can be provided by representing an icon of content (e.g. an icon of a note or a page or a thumbnail of an image) instead of the independent menu button 2802 as if the icon has magnetism. The second characteristic, magnetism, of the independent menu button 2802 can be selectively activated or deactivated through the environment setting menu of the tablet 100.

Figure 29:
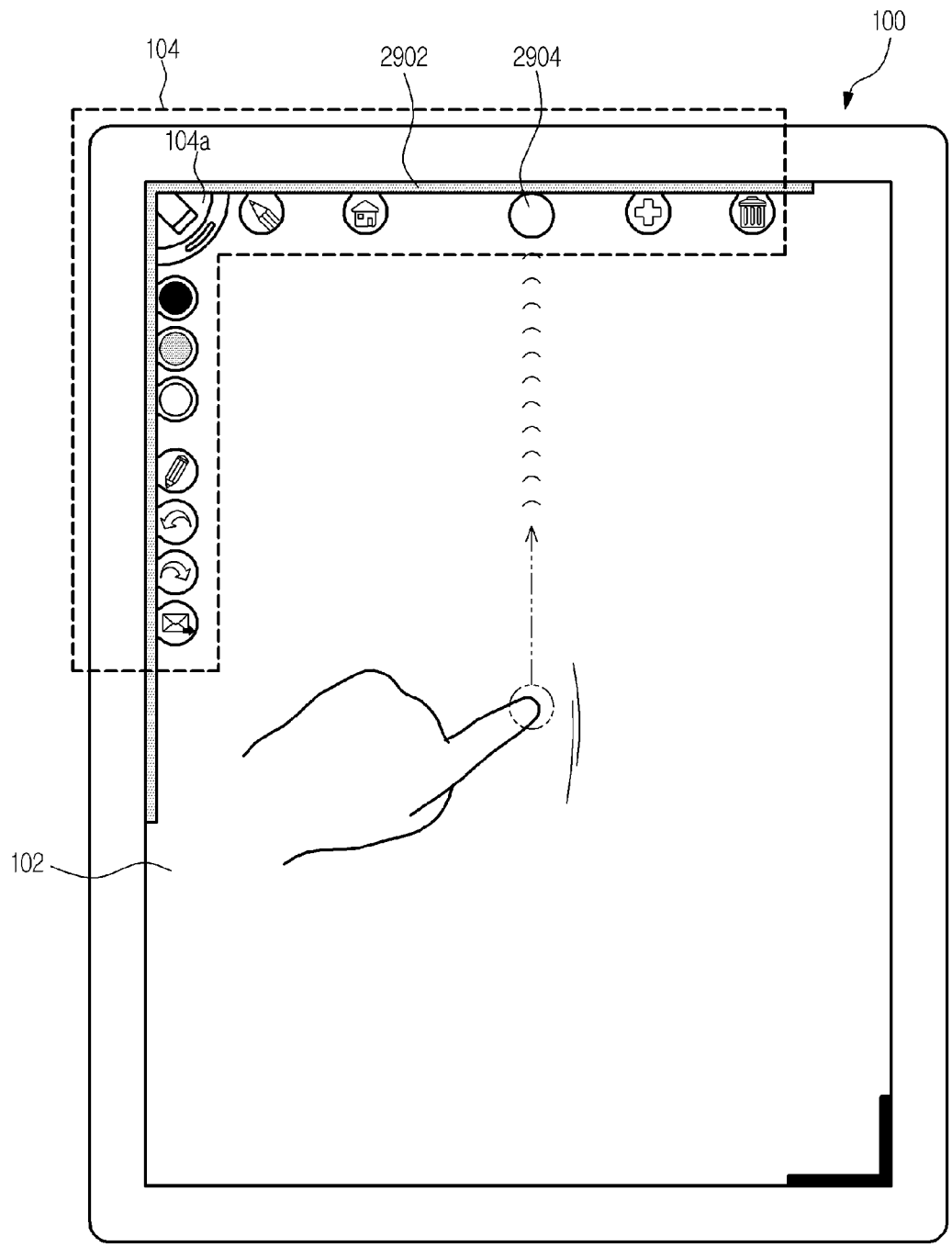
FIG. 29 illustrates a characteristic of a boundary of a display area of a display of the tablet according to an embodiment.

FIG. 29 illustrates a characteristic given to the boundary of the display area of the display 102 of the tablet 100 according to an embodiment. As shown in FIG. 29, part of the boundary of the display area of the display 102 is represented as if it has magnetism through graphical representation on the display 102. This part is called a first boundary region 2902. An independent menu button 2904 can stick to the first boundary region 2902 because the first boundary region 2902 has adhesive properties. Using this characteristic, the plurality of independent menu buttons 104b to 104m can be easily aligned as shown in FIG. 5. For example, when the independent menu button 2904 having no magnetism, which is located remotely from the first boundary region 2902, is moved toward the first boundary region 2902, the independent menu button 2904 moves near the first boundary region 2902 and sticks to the first boundary region 2902. Using this method, a large number of independent menu buttons can be easily and rapidly aligned near the first boundary region 2902. In addition to the independent menu button 2904, icons of content (e.g. thumbnails or icons of notes, pages or images) can be easily and rapidly aligned by being represented as if they have magnetism. When the position of the first boundary region 2902 is changed corresponding to the position of the user interface 104 in both the left-hand user mode and the right-hand user mode, a hand gripping no pen can easily access independent menu buttons sticking to the first boundary region 2902.

Figure 30:
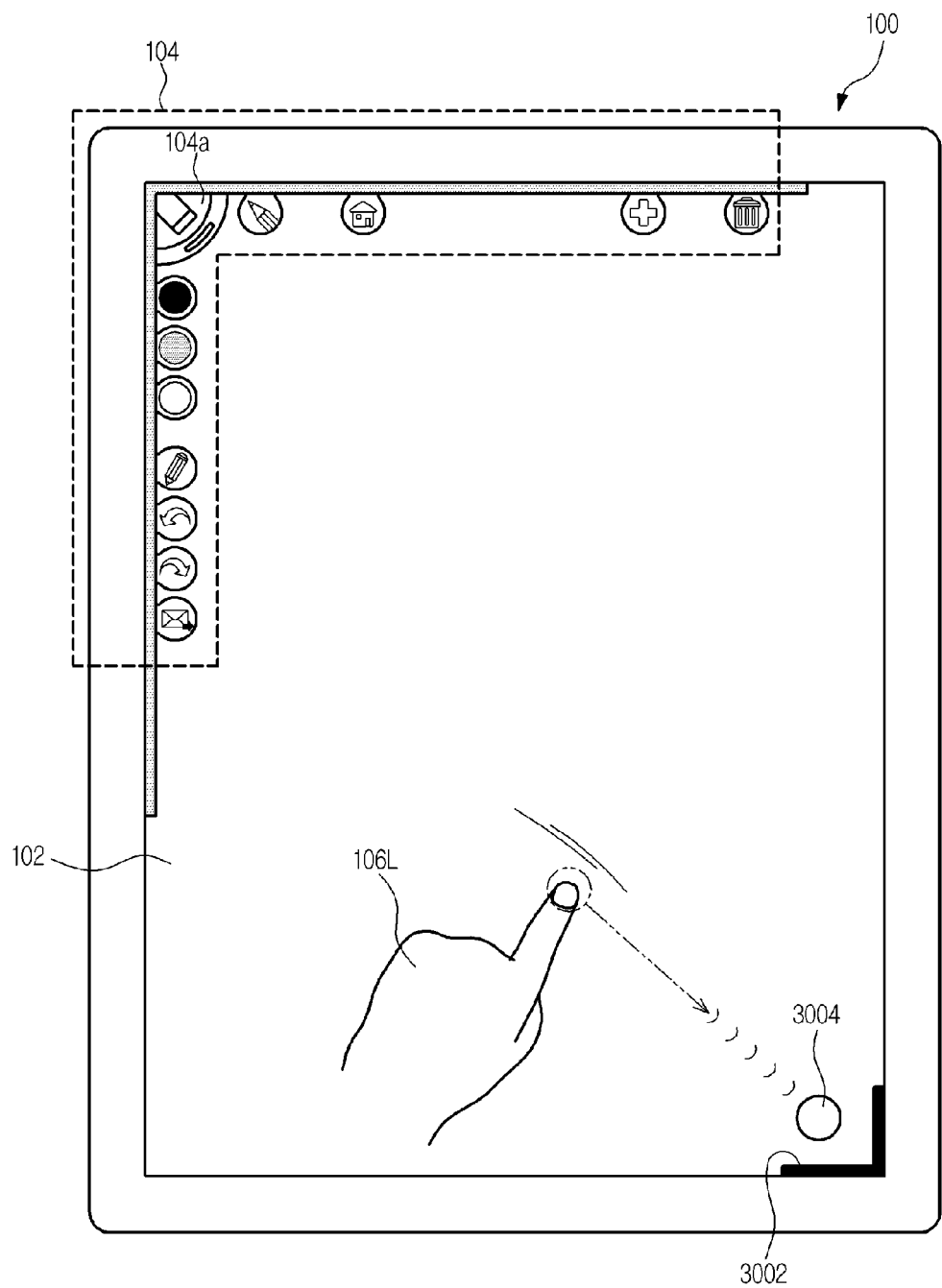
FIG. 30 illustrates another characteristic of the boundary of the display area of the display of the tablet according to an embodiment.

FIG. 30 illustrates another characteristic given to the boundary of the display area of the display 102 of the tablet 100 according to an embodiment. As shown in FIG. 30, part of the boundary of the display area of the display 102 is represented as a region for deleting an item through graphical representation on the display 102. This region is called a second boundary region 3002. The second boundary region 3002 is for deleting an icon of a menu or content and operates as the trash box of Window. That is, when an icon 3004 displayed in the display area of the display 102 passes through the second boundary region 3002, the icon 3004 is deleted. However, the menu or content corresponding to the icon 3004 is not completely deleted from the tablet 100 even if the icon 3004 passes through the second boundary region 3002 and to be deleted. The menu can be restored (re-generated) through the expandable menu button 104a any time and the content can be restored through a restoration command.

The remaining region of the boundary of the display area of the display 102 other than the first boundary region 2902 shown in FIG. 29 and the second boundary region 3002 shown in FIG. 30 is a third boundary region having a characteristic different from the characteristics of the first ands second boundary regions or no characteristic.

Figure 31:
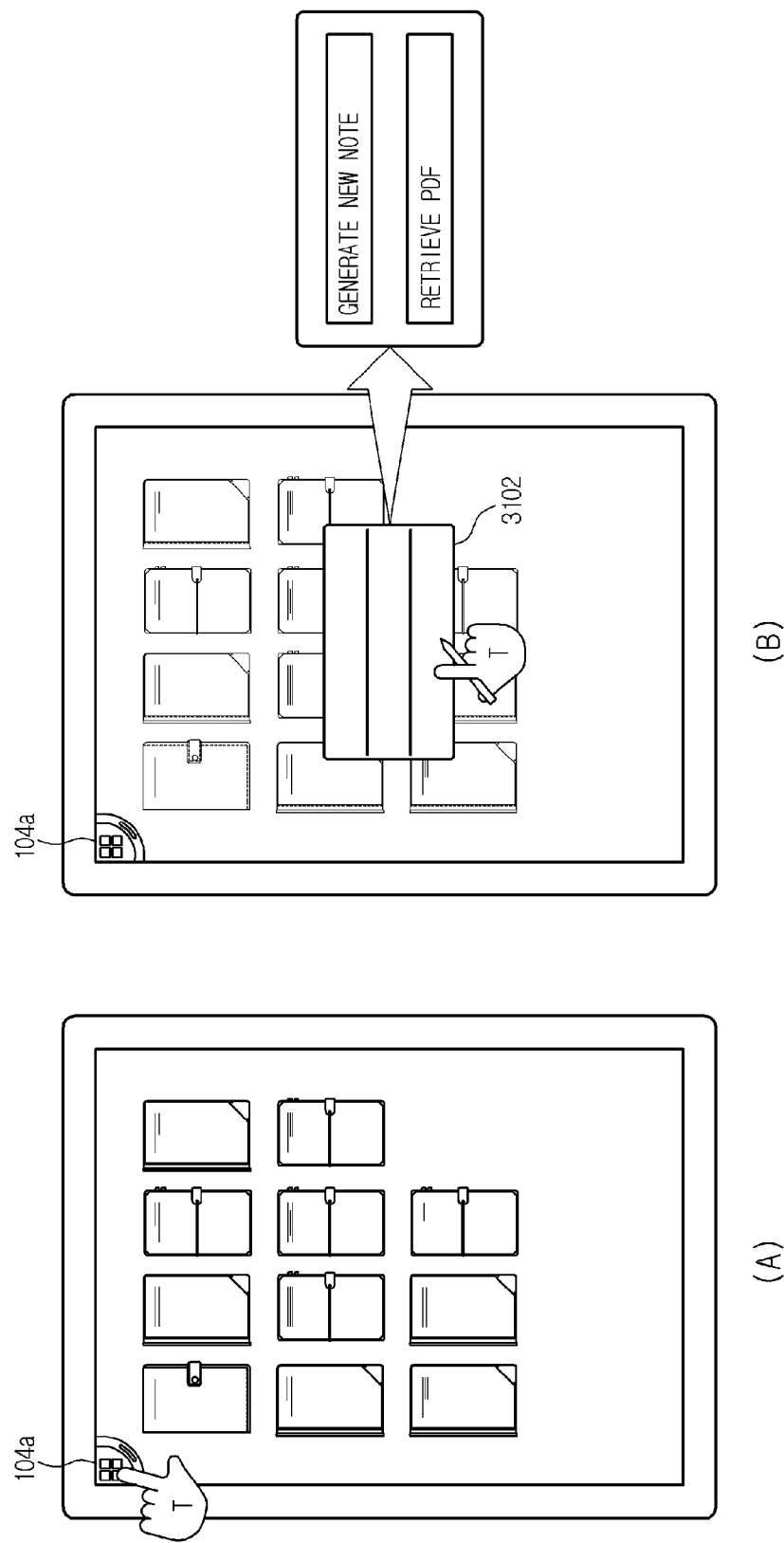
FIG. 31 illustrates a menu call procedure through manipulation of tapping an expandable menu button at the note level of the tablet according to an embodiment.
Figure 32:
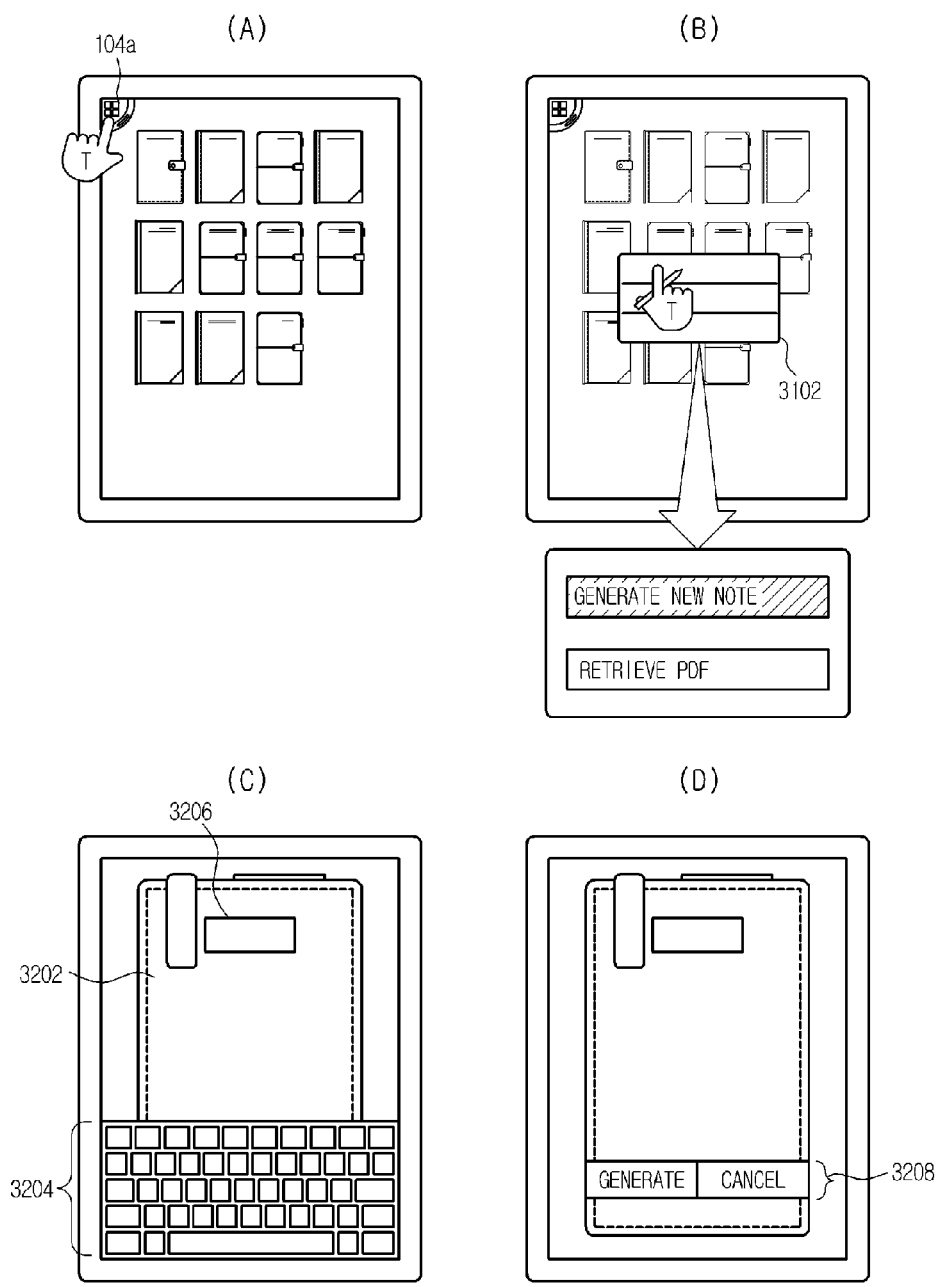
FIG. 32 illustrates a procedure of generating a new note at the note level when a 'generate new note' menu is selected from a pop-up shown in FIG. 31.
Figure 33:
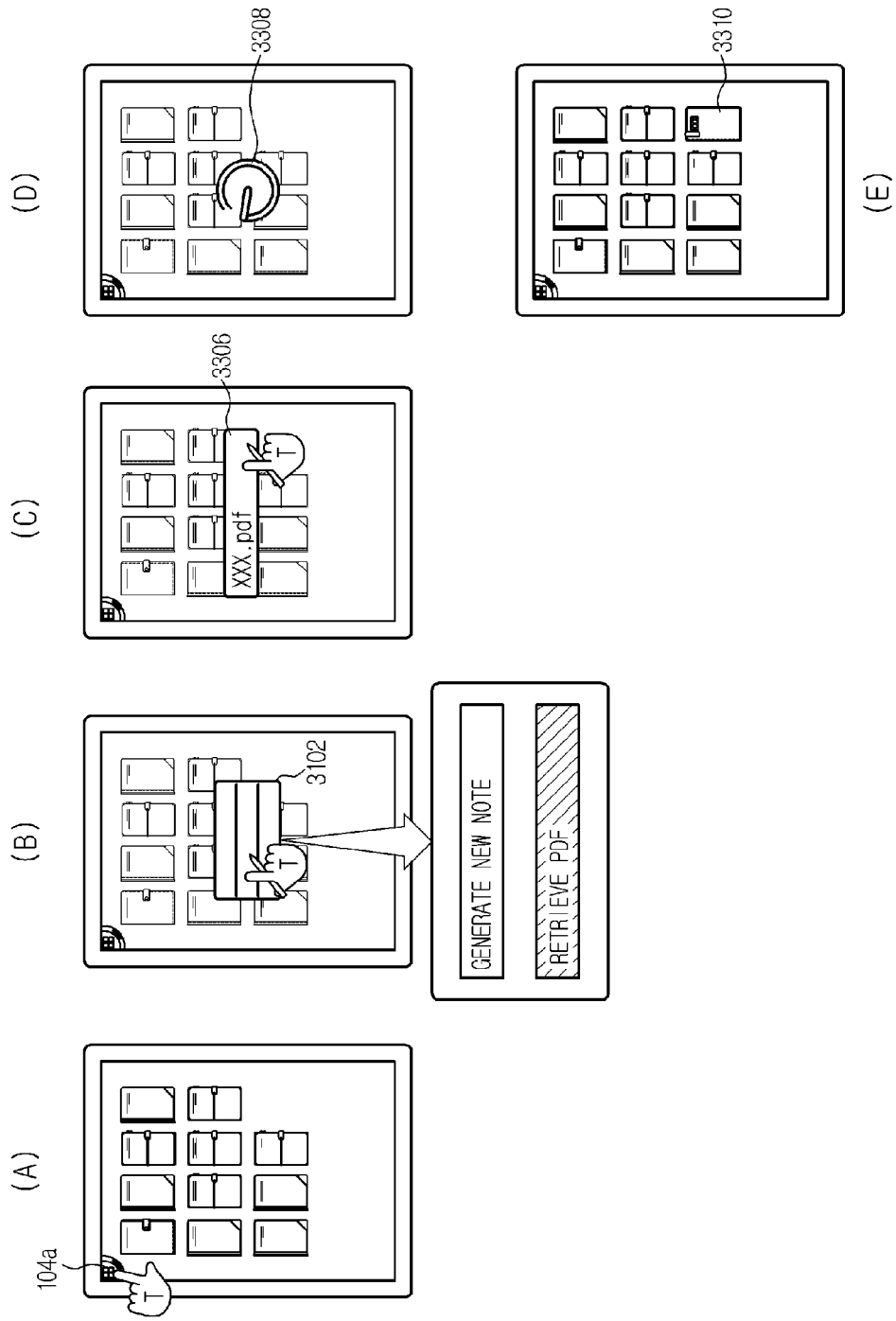
FIG. 33 illustrates a procedure of retrieving a PDF (portable document format) file at the note level when a 'retrieve PDF' menu is selected from the pop-up shown in FIG. 31.
Figure 41:
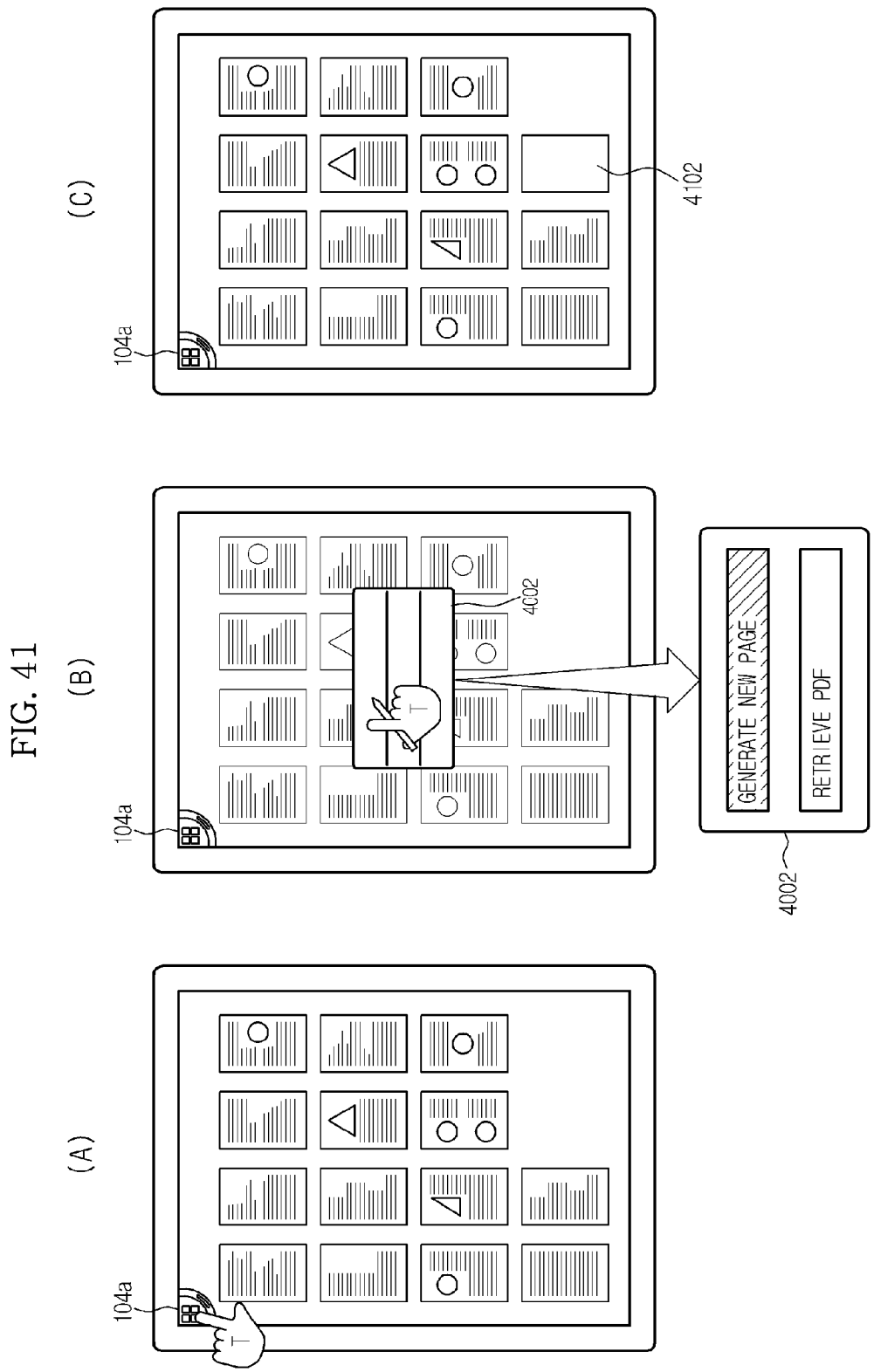
FIG. 41 illustrates a procedure of generating a new page at the page level when a 'generate new page' menu is selected from a pop-up shown in FIG. 40.
Figure 42:
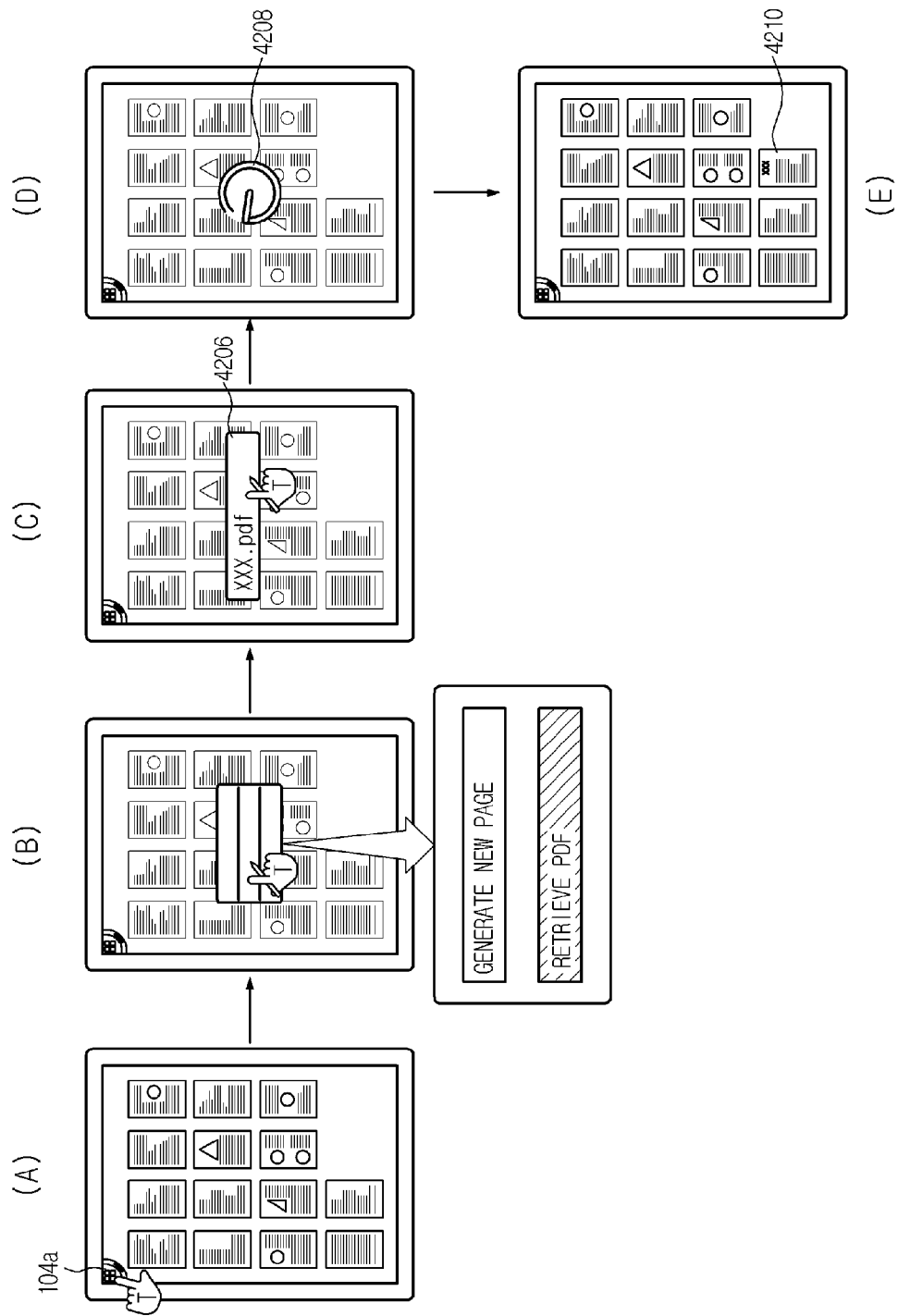
FIG. 42 illustrates a procedure of retrieving a PDF file at the page level when a 'retrieve PDF file' menu is selected from the pop-up shown in FIG. 40.

The expandable menu button 104a of the tablet 100 according an embodiment can be used to call a pop-up at the note level and the page level. At the note level and the page level, different pop-ups can be called by tapping and pressing the expandable menu button 104a. That is, two different pop-ups can be called at the note level according to tapping and pressing operations and two different pop-ups can be called at the page level according to tapping and pressing operations. FIGS. 31 to 33 show pop-ups called according to a tapping operation at the note level and FIGS. 34 to 39 show pop-ups called according to a pressing operation at the note level. FIGS. 40 to 42 show pop-ups called according to a tapping operation at the page level and FIGS. 43 to 48 show pop-ups called according to a pressing operation at the page level.

FIG. 31 illustrates a menu call procedure through a manipulation of tapping the expandable menu button 104a at the note level of the tablet 100 according to an embodiment. As shown in FIG. 31, when the user taps the expandable menu button 104a at the note level shown in FIG. 31(A), a pop-up 3102 (first note level pop-up) as shown in FIG. 31(B) is generated. The pop-up 3102 includes 'generate new note' and 'retrieve PDF' menus. The user can generate a new note through the 'generate new note' menu or retrieve a previously generated PDF file through the 'retrieve PDF' menu. When the user taps a vacant region of the pop-up 3102, operation is performed as if a cancel menu is selected such that the state (B) is returned to the note level of FIG. 31(A)

FIG. 32 illustrates a procedure of generating a new note at the note level when the 'generate new note' menu is selected from the pop-up 3102 shown in FIG. 31. As shown in FIG. 32, when the user taps the expandable menu button 104a at the note level shown in FIG. 32(A), the pop-up 3102 is generated as described above. When the user selects the 'generate new note' menu from the pop-up 3102, as shown in FIG. 32(B), a note cover image 3202 and a virtual keyboard 3204 are displayed as shown in FIG. 32(C). An input box 3206 into which a title of a note can be input is provided to the top of the note cover image 3203. The title of the note can be input using the virtual keyboard 3204. Upon input of the title of the note, a pop-up 3208 for confirming whether to generate the note or cancel generation of the note is generated, as shown in FIG. 32(D). When the user selects a 'generate note' menu, the note in the input title is generated. When the user taps a vacant region of the pop-up 3208, operation is performed as if a cancel menu is selected to cancel the note generation task, and the state is returned to the initial note level as shown in FIG. 32(A).

FIG. 33 illustrates a procedure of retrieving a PDF file at the note level when the 'retrieve PDF' menu is selected from the pop-up 3102 shown in FIG. 31. As shown in FIG. 33, when the user taps the expandable menu button 104a at the note level shown in FIG. 33(A), the pop-up 3102 described above with reference to FIG. 31 is generated. When the user selects the 'retrieve PDF' menu from the pop-up 3102, as shown in FIG. 33(B), a list 3306 of previously stored PDF files is displayed as shown in FIG. 33(C). When the user selects a desired PDF file from the PDF file list 3306 displayed on the display 102, a retrieving state of the selected PDF file is displayed through a state display window 3308 that indicates a retrieval state, as shown in FIG. 33(D). Upon completion of retrieval of the selected PDF file, a new note 3310 composed of the retrieved PFD file is generated.

Figure 34:
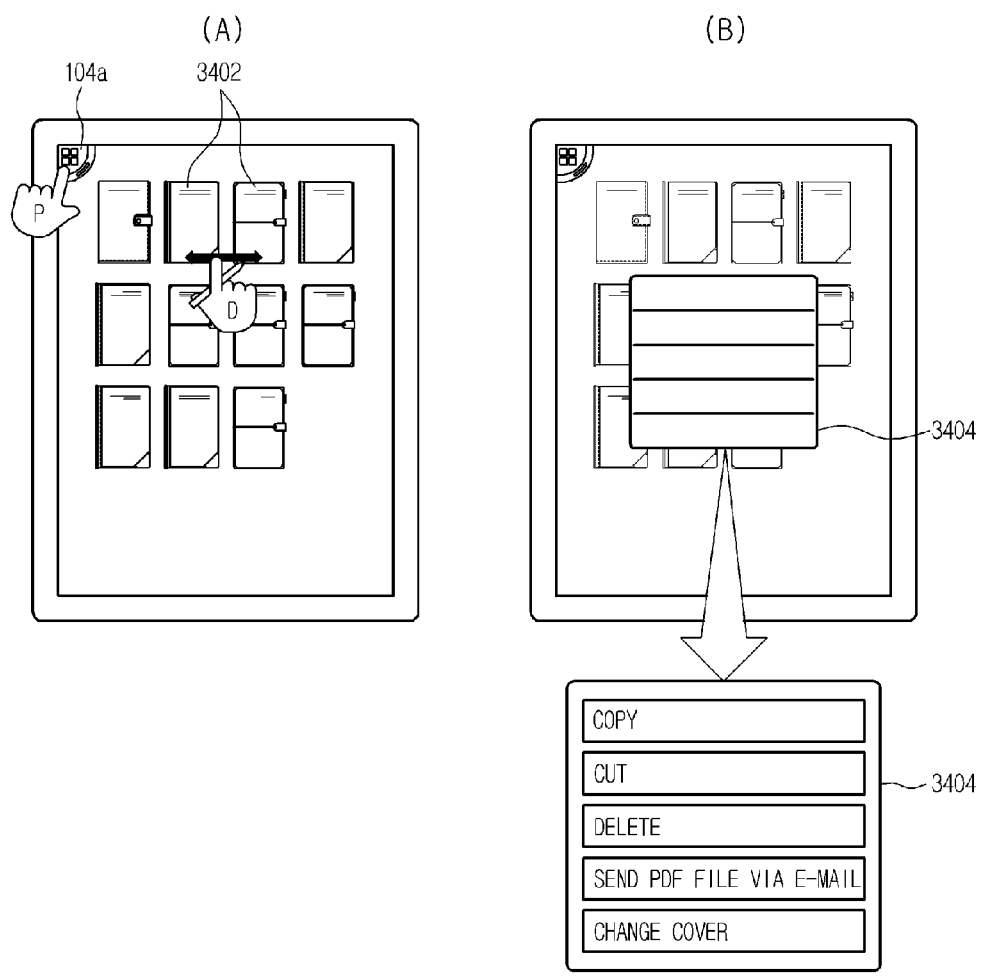
FIG. 34 illustrates a menu call procedure through manipulation of pressing the expandable menu button at the note level of the tablet according to an embodiment.

FIG. 34 illustrates a menu call procedure through a manipulation of pressing the expandable menu button 104a at the note level of the tablet 100 according to an embodiment. As shown in FIG. 34, when the user selects at least one note 3402 while pressing the expandable menu button 104a at the note level shown in FIG. 34(A), a pop-up 3404 (second note level pop-up) is generated as shown in FIG. 34(B). The pop-up 3404 includes 'copy', 'cut', 'delete', 'send PDF file via mail' and 'change cover' menus. The user can perform 'copy', 'cut', 'delete', 'send PDF file via mail' and 'change cover' works for the selected note 3402 by selecting the menus of the pop-up 3404.

Figure 35:
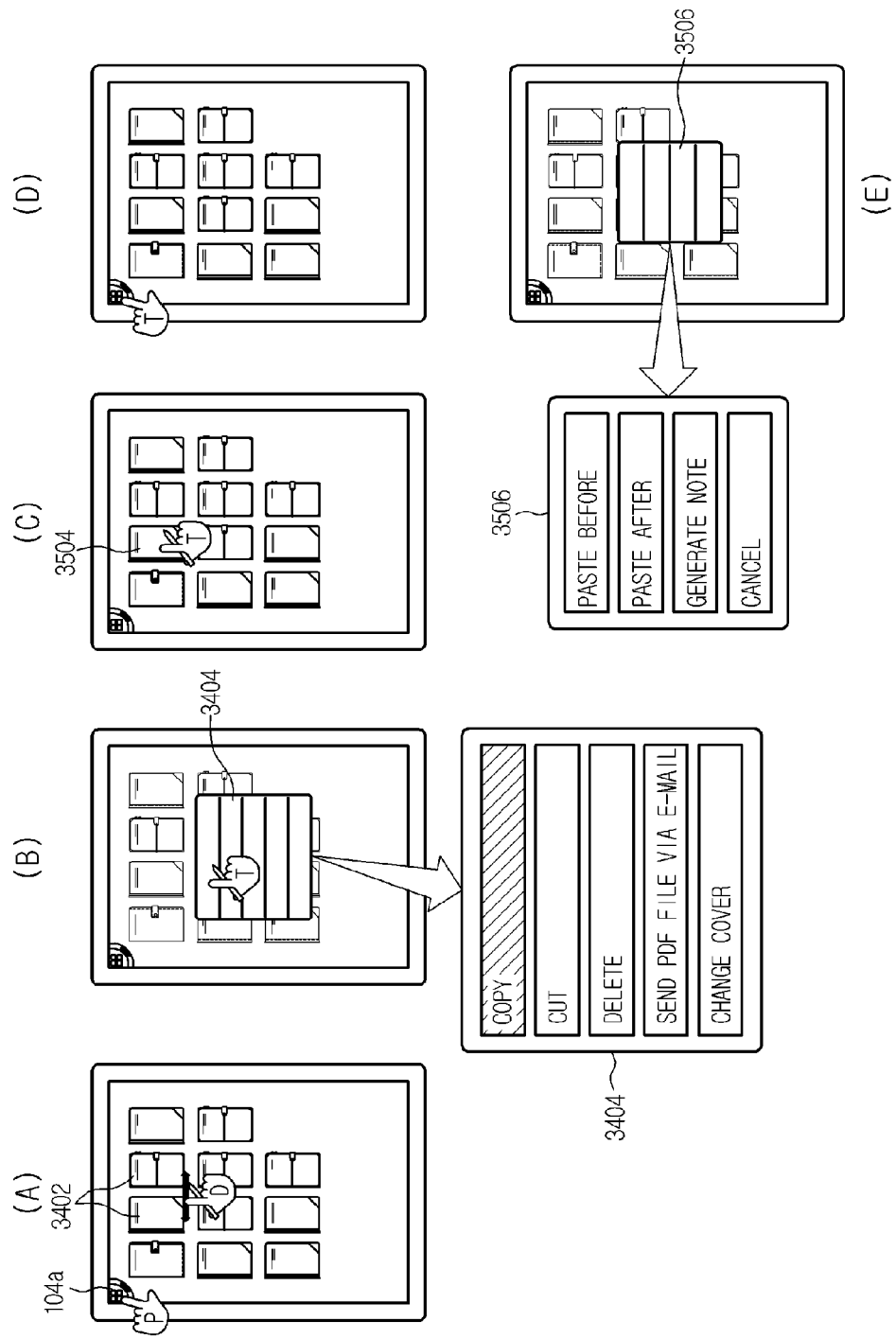
FIG. 35 illustrates a procedure of copying a previously generated note at the note level when a 'copy' menu is selected from a pop-up shown in FIG. 34.

FIG. 35 illustrates a procedure of copying a previously generated note at the note level when the 'copy' menu is selected from the pop-up 3404 shown in FIG. 34. As shown in FIG. 35, when the user selects at least one note 3402 to be copied while pressing the expandable menu button 104a shown in FIG. 35(A), the pop-up 3404 described above with reference to FIG. 34 is generated as shown in FIG. 35(B). When the user selects the 'copy' menu from the pop-up 3404, selects (taps) a previous note 3504 corresponding to a position (in terms of order of notes) into which the selected note 3402 will be pasted, as shown in FIG. 35(C), and taps the expandable menu button 104a as shown in FIG. 35(D), a new pop-up 3506 (copy menu pop-up) is generated, as shown in FIG. 35(E). The pop-up 3506 includes 'paste before', 'paste after' and 'generate note' menus. The copied note 3402 is pasted before the note 3504 selected in FIG. 35(C) when the 'paste before' menu is selected. The copied note 3402 is pasted after the note 3504 selected in FIG. 35(C) when the 'paste after' menu is selected. Upon selection of the 'generate note' menu, a new note including the content of the copied note 3502 is generated. When the user taps a vacant region of the pop-up 3506, the same result as that obtained when the cancel menu is selected can be acquired.

Figure 36:
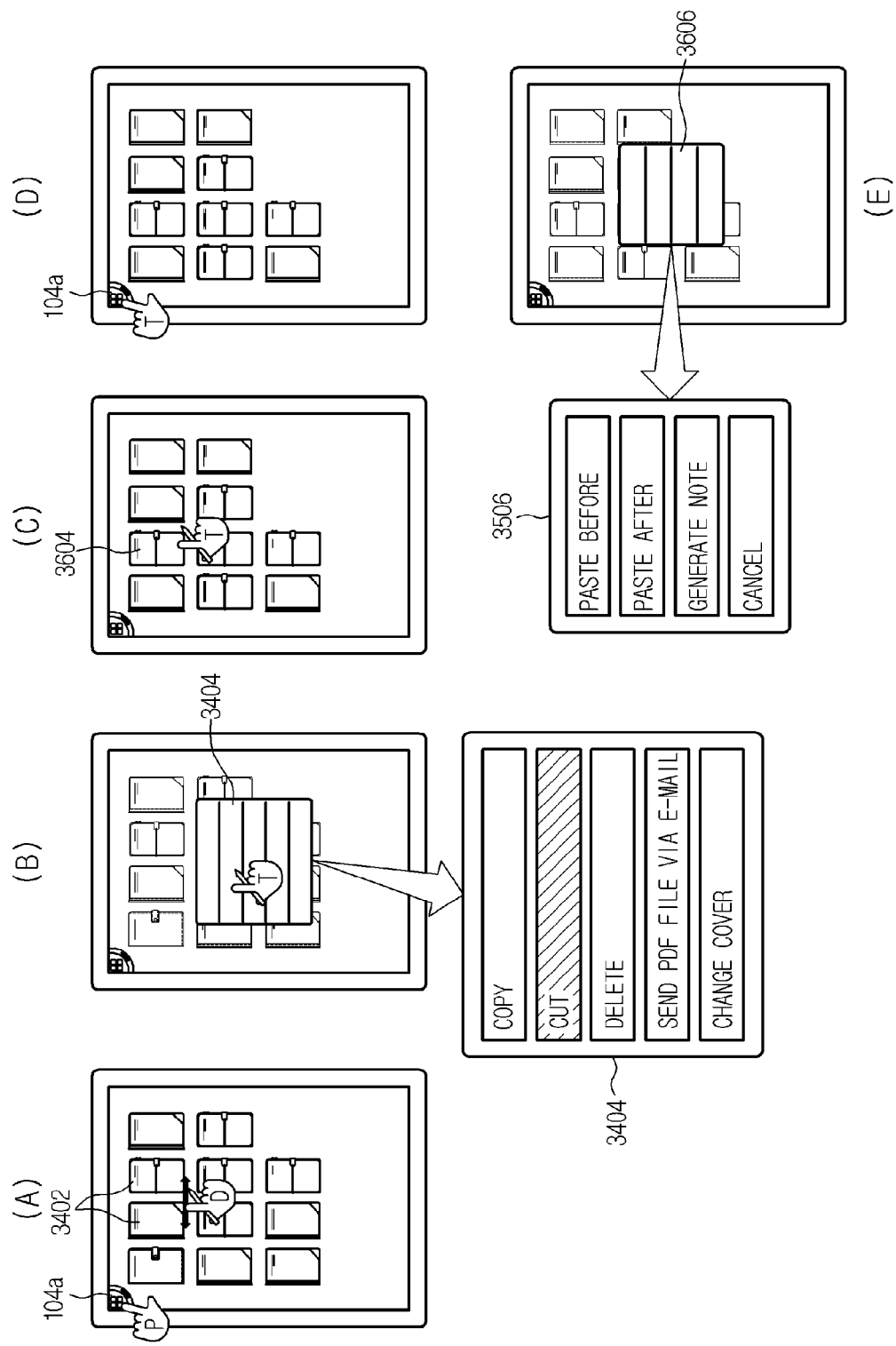
FIG. 36 illustrates a procedure of cutting a previously generated note at the note level when a 'cut' menu is selected from the pop-up shown in FIG. 34.

FIG. 36 illustrates a procedure of cutting out a previously generated note at the note level when the 'cut' menu is selected from the pop-up 3404 shown in FIG. 34. As shown in FIG. 36, when the user selects at least one note 3402 to be cut while pressing the expandable menu button 104a at the note level shown in FIG. 36(A), the pop-up 3404 described above with reference to FIG. 34 is generated, as shown in FIG. 36(B). When the user selects the 'cut' menu from the pop-up 3404, selects (taps) a previous note 3604 corresponding to a position (in terms of order of notes) into which the selected note 3402 will be pasted, as shown in FIG. 36(C), and taps the expandable menu button 104a as shown in FIG. 36(D), a new pop-up 3606 is generated, as shown in FIG. 36(E). The pop-up 3606 includes a 'paste before' menu, a 'paste after' menu and a 'generate note' menu. The cut note 3402 is pasted before the note 3604 selected in FIG. 36(C) when the 'paste before' menu is selected. The cut note 3402 is pasted after the note 3604 selected in FIG. 36(C) when the 'paste after' menu is selected. Upon selection of the 'generate note' menu, a new note including the content of the cut note 3602 is generated. When the user taps a vacant region of the pop-up 3606, operation is performed as if a cancel menu is selected to remove the pop-up 3606 so as to return to the initial state of the note level.

Figure 37:
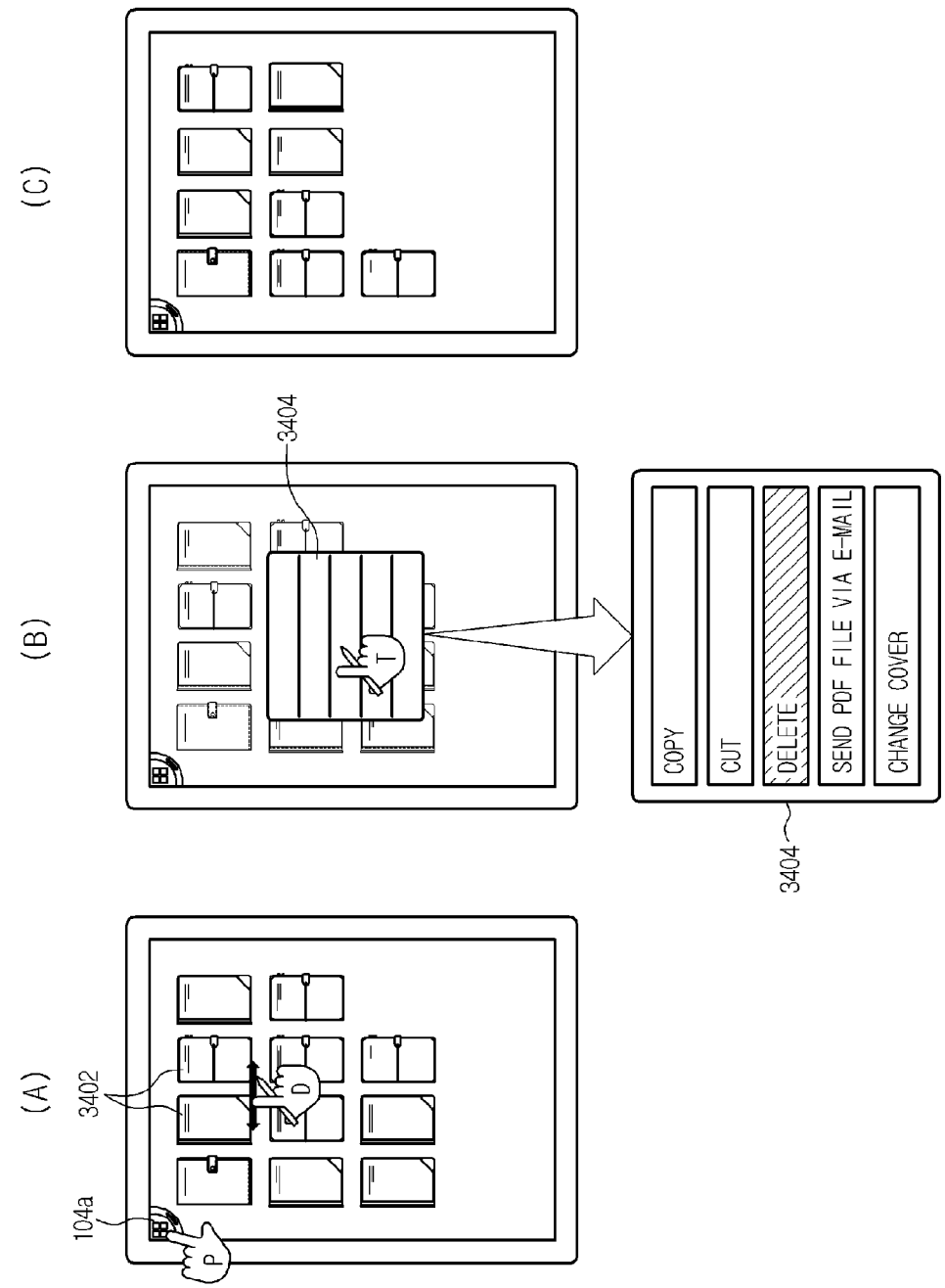
FIG. 37 illustrates a procedure of deleting a previously generated note at the note level when a 'delete' menu is selected from the pop-up shown in FIG. 34.

FIG. 37 illustrates a procedure of deleting a previously generated note at the note level when the 'delete' menu is selected from the pop-up 3404 shown in FIG. 34. As shown in FIG. 37, when the user selects at least one note 3402 to be deleted while pressing the expandable menu button 104a at the note level shown in FIG. 37(A), the pop-up 3404 described above with reference to FIG. 34 is generated, as shown in FIG. 37(B). When the user selects the 'delete' menu from the pop-up 3404, the note 3402 selected in FIG. 37(A) is deleted. That is, the selected note 3402 is deleted and other notes are aligned, as shown in FIG. 37(C).

Figure 38:
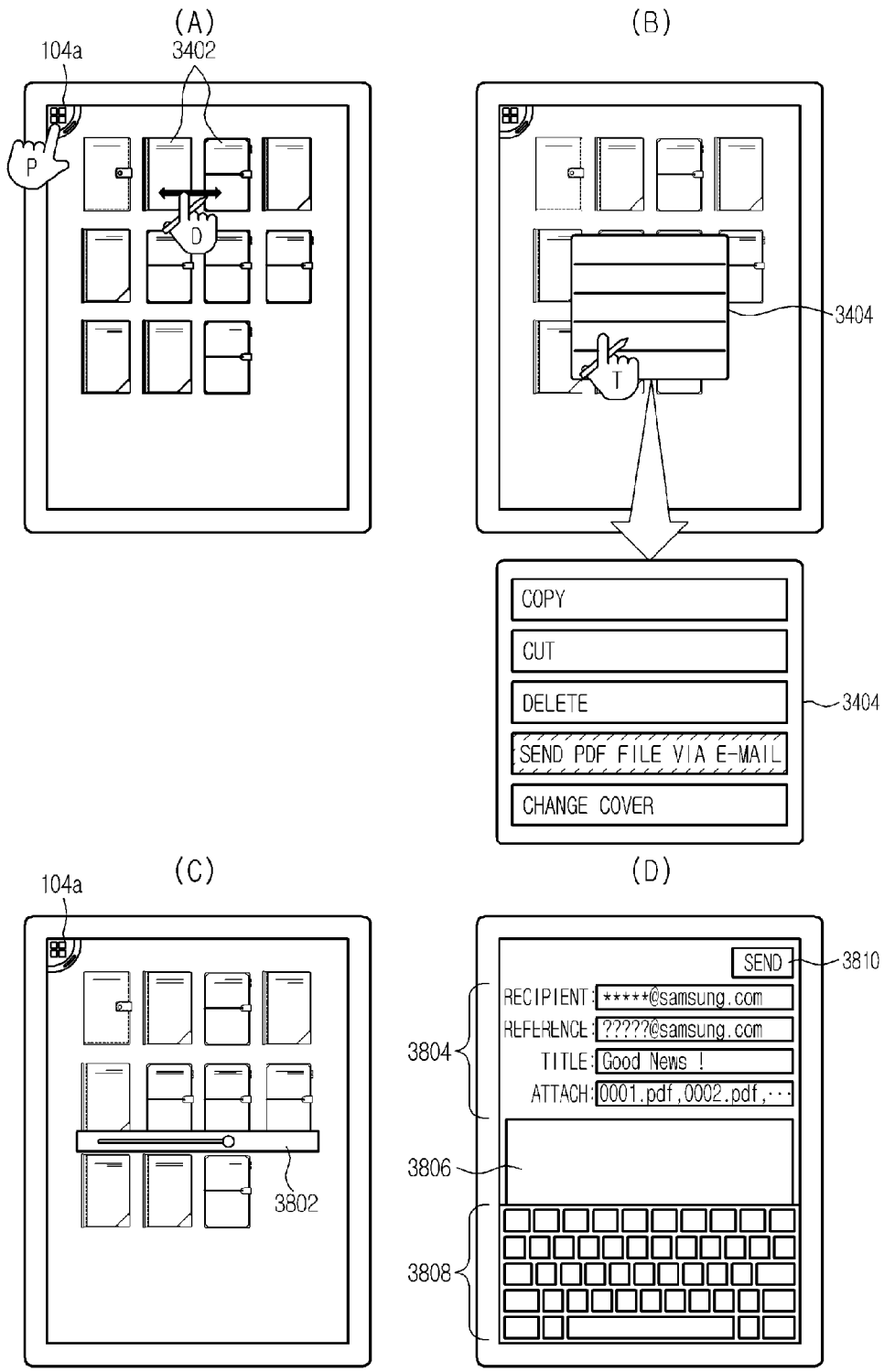
FIG. 38 illustrates a procedure of converting a previously generated note into a PDF file, attaching the PDF file to an e-mail and transmitting the e-mail at the note level when a 'send PDF file via e-mail' menu is selected from the pop-up shown in FIG. 34.

FIG. 38 illustrates a procedure of converting a previously generated note into a PDF file, attaching the PDF file to an e-mail and transmitting the e-mail at the note level when 'send PDF file via e-mail' menu is selected from the pop-up 3404 shown in FIG. 34. In this case, the procedure of converting a selected note into a PDF file and attaching the PDF file to an e-mail can be performed through a simple operation. The tablet 100 according to an embodiment can access wired/wireless Internet through the communication unit 410. Accordingly, the user can send e-mail using the tablet 100 by registering an e-mail account in the tablet 100.

When the user wants to attach a note currently being generated or previously generated to an e-mail and transmit the e-mail, the user selects a note 3402 to be attached to an e-mail while pressing the expandable menu button 104*a* at the note level shown in FIG. 38(A). Then, the pop-up 3404 as described above with reference to FIG. 34 is generated, as shown in FIG. 38(B). Upon selection of the 'send PDF file via e-mail' menu from the pop-up 3404, a process of converting the selected note 3402 into a PDF file is displayed, as shown in FIG. 38(C). When conversion of the selected note 3402 into the PDF file is completed, an e-mail creation screen is automatically displayed, as shown in FIG. 38(D). The e-mail creation screen displays an e-mail account of a recipient, a reference e-mail account, a title, an input box 3804 for file attachment, a text input window 3806, and a virtual keyboard 3808. Upon completion of input of the recipient e-mail account, reference e-mail account, title and text and file attachment, the user can transmit the e-mail by tapping a send button 3810. It can be seen from the input box 3804 that PDF files under the titles of 00001.PDF and 00002.PDF are attached to the e-mail. The PDF file titles correspond to the file name of the note 3402 selected by the user for sending e-mail. That is, the note 3402 in the file names of 0001 and 0002 is converted into a PDF file and automatically attached to e-mail. As shown in FIG. 38, when the user wants to attach content to an e-mail and send the e-mail, the user only selects the content and the 'send PDF file via e-mail' menu. Then, conversion of the content into a PDF file and attachment of the PDF file to the e-mail can be automatically performed, and thus e-mail sending operation can be completed rapidly and conveniently. Content is converted into a PDF file in order to allow the user to use a PDF viewer that is easily acquired through the Internet without using an additional execution application. Content can be converted into a file in a different format such as a JPG file instead of a PDF file and transmitted as necessary.

Figure 39:
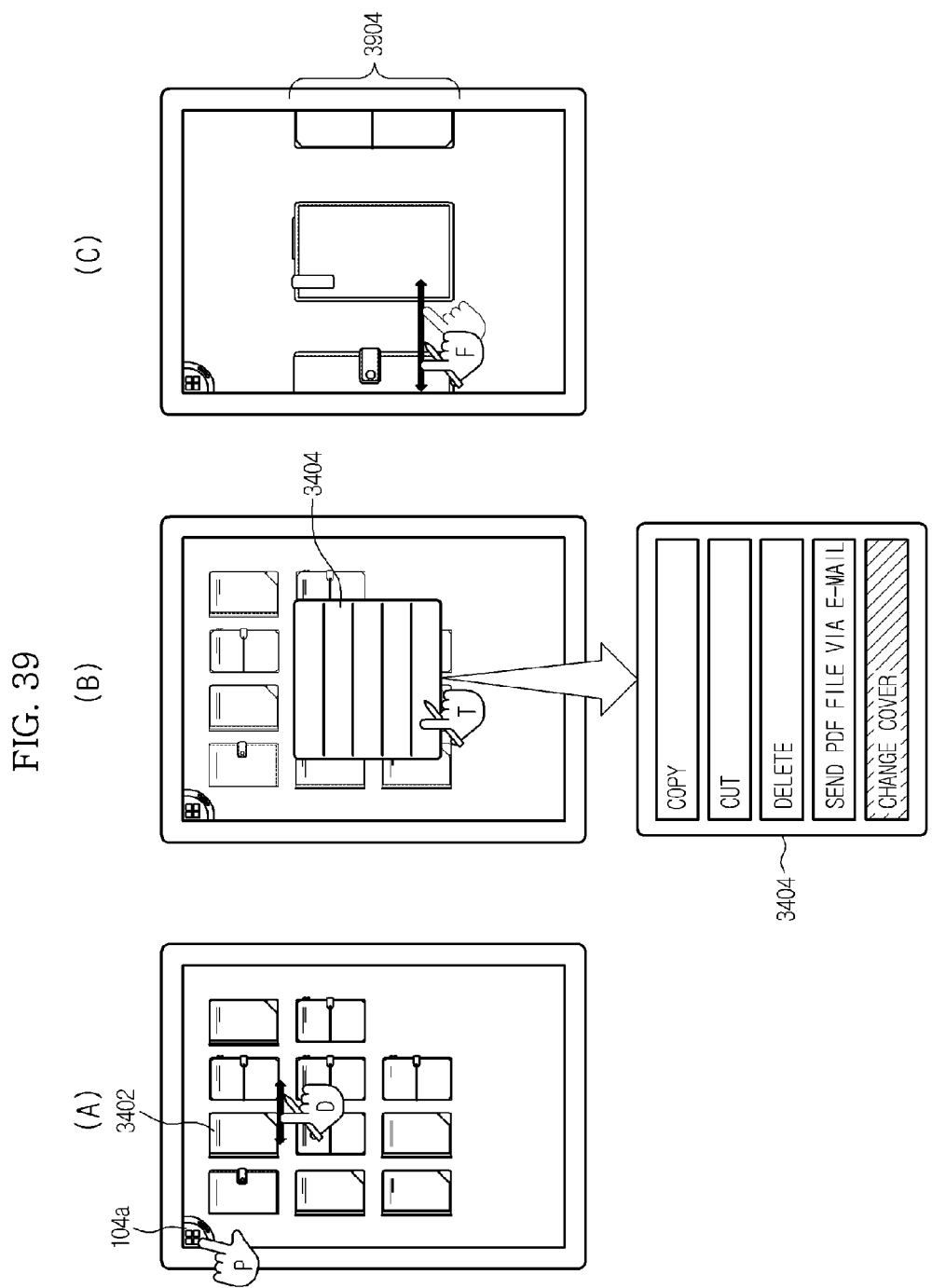
FIG. 39 illustrates a procedure of changing the cover of a previously generated note at the note level when a 'change cover' menu is selected from the pop-up shown in FIG. 34.

FIG. 39 illustrates a procedure of changing a cover of a previously generated note at the note level when the 'change cover' menu is selected from the pop-up 3404 shown in FIG. 34. As shown in FIG. 39, when the user selects a note 3402 whose cover will be changed while pressing the expandable menu button 104*a* at the note level shown in FIG. 39(A), the pop-up 3404 as described above with reference to FIG. 34 is generated. Upon selection of the 'change cover' menu from the pop-up 3404, as shown in FIG. 39(B), at least one cover 3904 (e.g., covers in various designs) provided by the tablet 100 is displayed, as shown in FIG. 39(C). The user can check the design of the at least one cover 3904 while flicking the screen as if the user turns the pages of a book and select the desired cover 3904. The controller 402 changes the cover of the selected note 3402 to the cover 3904 newly selected by the user. Examples of types of the at least one cover 3402 may include a leather cover, a spring note, a ring binder, etc. In addition, a large amount of covers in a variety of designs can be provided. The at least one cover 3904 may be basically provided by the tablet 100 or purchased in an online market. Otherwise, the cover 3904 may be a custom-made cover customized by another user and distributed free/for a charge. When all covers cannot be displayed in one screen since there are too many types of covers, the user can check the covers by flicking the screen to the left or right as if the user turns the pages of a book.

FIG. 40 illustrates a menu call procedure through a manipulation of tapping the expandable menu button 104*a* at the page level of the tablet 100 according to an embodiment. As shown in FIG. 40, when the user taps the expandable menu button 104*a* at the page level shown in FIG. 40(A), a pop-up 4002 as shown in FIG. 40(B) is generated. The pop-up 4002 includes a 'generate new page' menu and a 'retrieve PDF' menu. The user can generate a new page through the 'generate new page' menu or retrieve a previously generated PDF file through the 'retrieve PDF' menu. When the user taps a vacant region of the pop-up 4002, operation is performed as if a cancel menu is selected such that the state (B) can be returned to the page level of FIG. 40(A).

FIG. 41 illustrates a procedure of generating a new page at the page level when the 'generate new page' menu is selected from the pop-up 4002 shown in FIG. 40. As shown in FIG. 41, when the user taps the expandable menu button 104*a* at the page level shown in FIG. 41(A), the pop-up 4002 as described above with reference to FIG. 40 is generated. When the user selects the 'generate new page' menu from the pop-up 4002, as shown in FIG. 41(B), a new page 4102 is generated as shown in FIG. 41(C). When the user taps a vacant region of the pop-up 4002, operation is performed as if a cancel menu is selected to cancel the page generation task, and the state is returned to the initial page level as shown in FIG. 41(A).

FIG. 42 illustrates a procedure of retrieving a PDF file at the page level when the 'retrieve PDF' menu is selected from the pop-up 4002 shown in FIG. 40. As shown in FIG. 42, when the user taps the expandable menu button 104*a* at the page level shown in FIG. 42(A), the pop-up 4002 described above with reference to FIG. 40 is generated. When the user selects the 'retrieve PDF' menu from the pop-up 4002, as shown in FIG. 42(B), a list 4206 of previously stored PDF files is displayed as shown in FIG. 42(C). When the user selects a desired PDF file from the PDF file list 4206 displayed on the display 102, a retrieving state of the selected PDF file is displayed through a state display window 3308 that indicates a retrieval state, as shown in FIG. 42(D). Upon completion of retrieval of the selected PDF file, a new page 4210 composed of the retrieved PFD file is generated.

Figure 43:
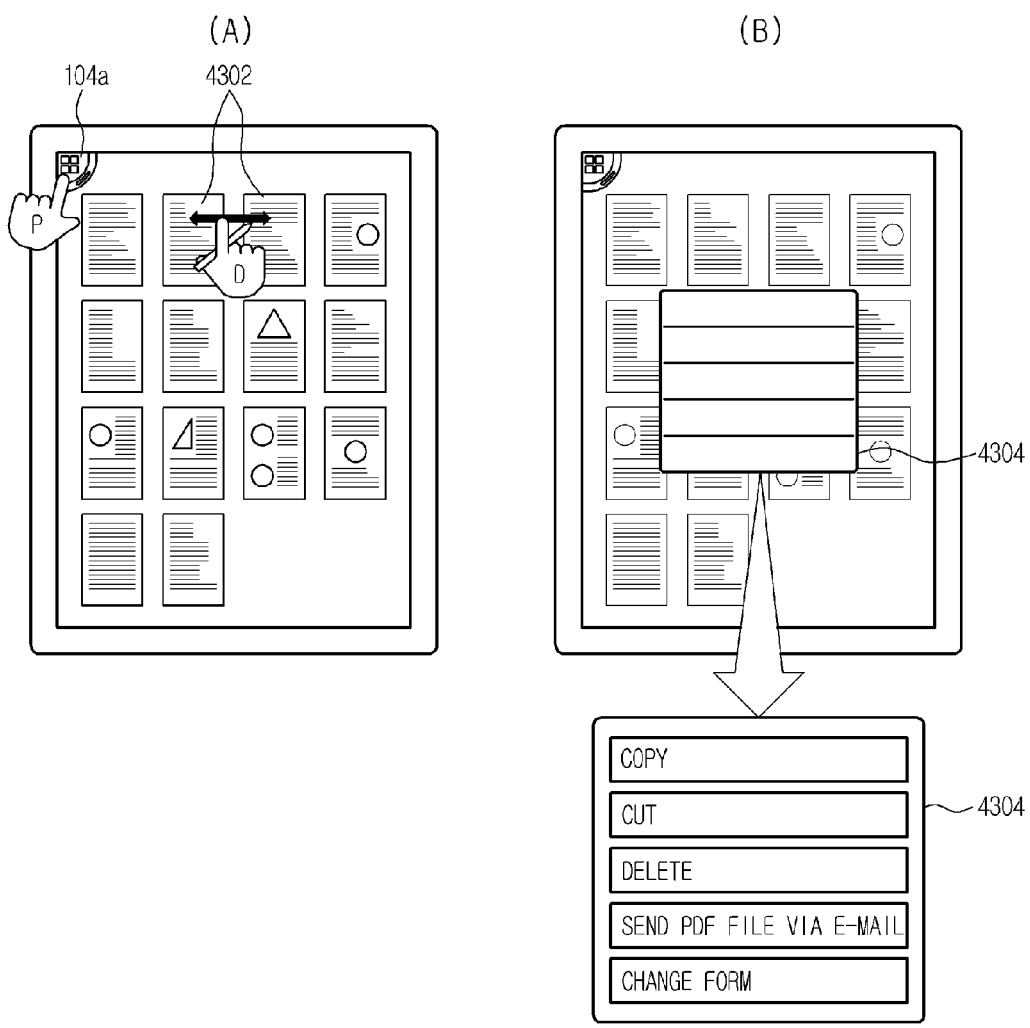
FIG. 43 illustrates a menu call procedure through manipulation of pressing the expandable menu button at the page level of the tablet according to an embodiment.

FIG. 43 illustrates a menu call procedure through manipulation of pressing the expandable menu button 104*a* at the page level of the tablet 100 according to an embodiment. As shown in FIG. 43, when the user selects at least one page 4302 while pressing the expandable menu button 104*a* at the page level shown in FIG. 43(A), a pop-up 4304 is generated as shown in FIG. 43(B). The pop-up 4304 includes 'copy', 'cut', 'delete', 'send PDF file via e-mail' and 'change form' menus. The user can perform 'copy', 'cut', 'delete', 'send PDF file via e-mail' and 'change form' operations for the selected page 4302 by selecting the menus of the pop-up 4304.

Figure 44:
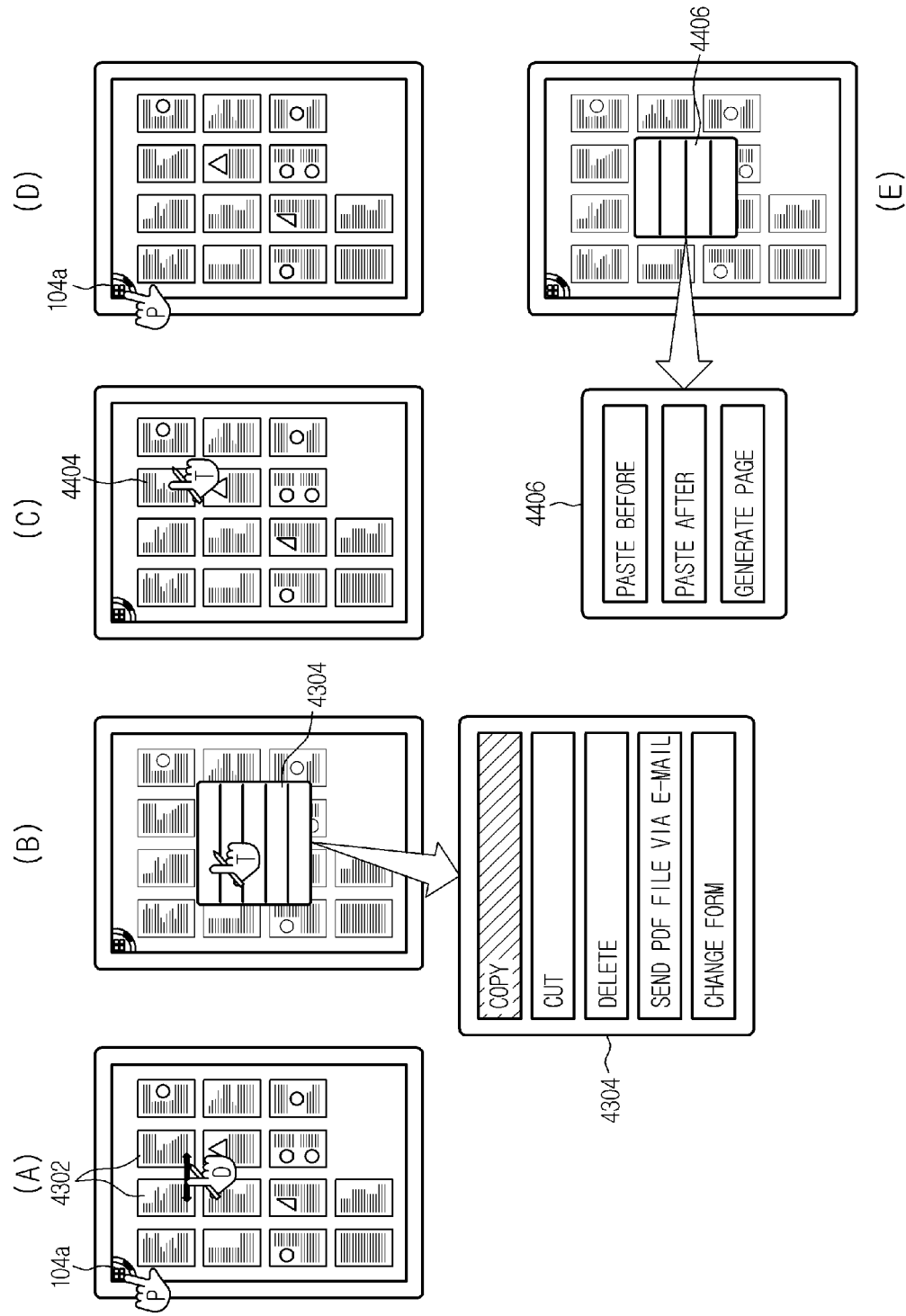
FIG. 44 illustrates a procedure of copying a previously generated page at the page level when a 'copy' menu is selected from a pop-up shown in FIG. 43.

FIG. 44 illustrates a procedure of copying a previously generated page at the page level when the 'copy' menu is selected from the pop-up 4304 shown in FIG. 43. As shown in FIG. 44, when the user selects at least one page 4302 to be copied while pressing the expandable menu button 104*a* at the page level shown in FIG. 44(A), the pop-up 4304 described above with reference to FIG. 43 is generated as shown in FIG. 44(B). When the user selects the 'copy' menu from the pop-up 4304, selects (taps) a previous page 4404 corresponding to a position (in terms of order of pages) into which the selected page 3402 will be pasted, as shown in FIG. 44(C), and taps the expandable menu button 104*a* as shown in FIG. 44(D), a new pop-up 4406 is generated, as shown in FIG. 44(E). The pop-up 4406 includes 'paste before', 'paste after' and 'generate page' menus. The copied page 4302 is pasted before the page 4404 selected in FIG. 44(C) when the 'paste before' menu is selected. The copied page 4302 is pasted after the page 4404 selected in FIG. 44(C) when the 'paste after' menu is selected. Upon selection of the 'generate page' menu, a new page including the content of the copied page 4302 is generated. When the user taps a vacant region of the pop-up 4406, the pop-up 4406 is removed and returns to the initial page level. Operation can be returned o the initial page level.

Figure 45:
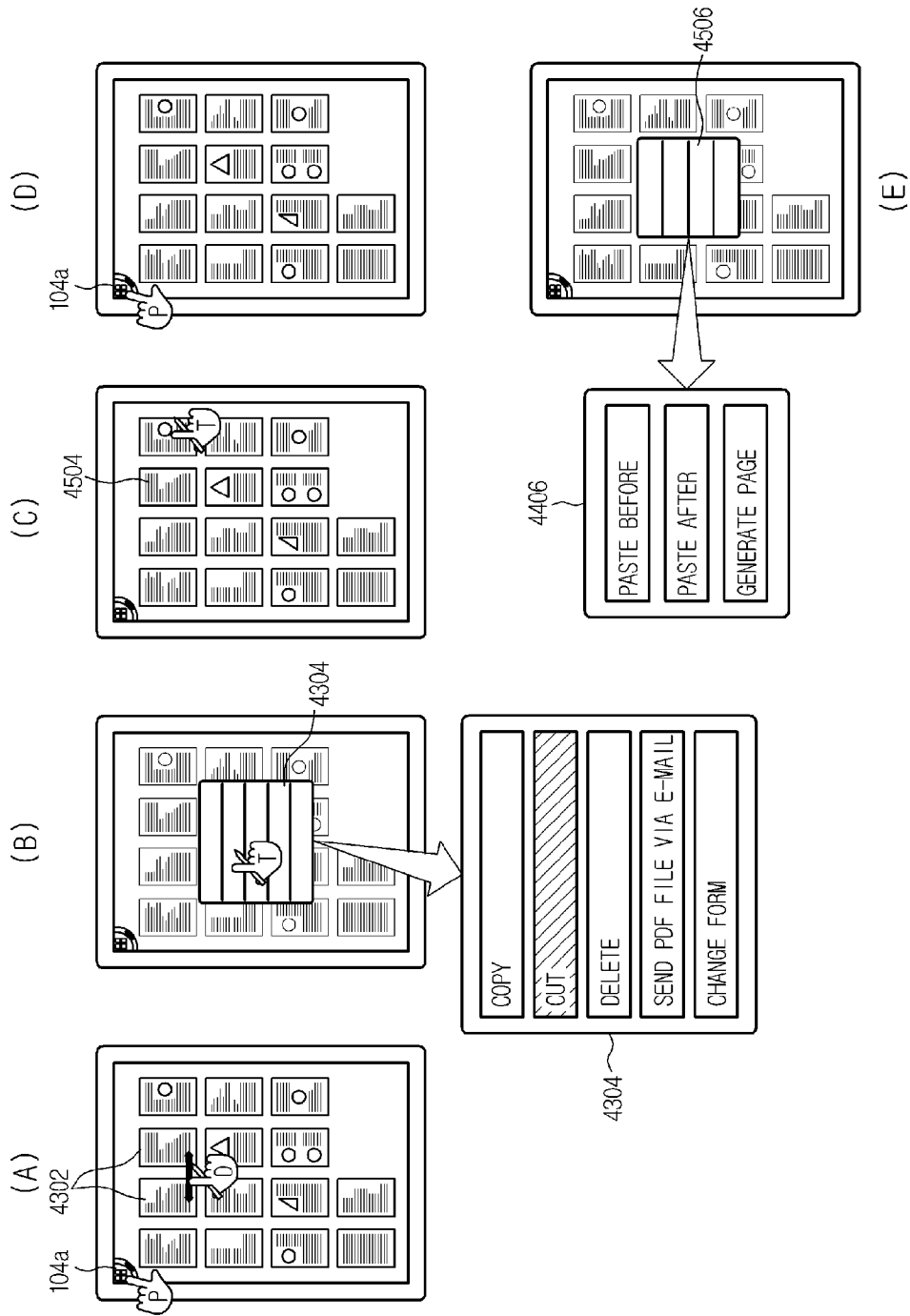
FIG. 45 illustrates a procedure of cutting a previously generated page at the page level when a 'cut' menu is selected from the pop-up shown in FIG. 43.

FIG. 45 illustrates a procedure of cutting a previously generated page at the page level when the 'cut' menu is selected from the pop-up 4304 shown in FIG. 43. As shown in FIG. 45, when the user selects at least one page 4302 to be cut while pressing the expandable menu button 104a at the page level shown in FIG. 45(A), the pop-up 4304 described above with reference to FIG. 43 is generated, as shown in FIG. 45(B). When the user selects the 'cut' menu from the pop-up 4304, selects (taps) a previous page 4504 corresponding to a position (in terms of order of pages) into which the selected page 4502 will be pasted, as shown in FIG. 45(C), and taps the expandable menu button 104a as shown in FIG. 45(D), a new pop-up 4506 is generated, as shown in FIG. 45(E). The pop-up 4506 includes a 'paste before' menu, a 'paste after' menu and a 'generate page' menu. The cut page 4302 is pasted before the page 4504 selected in FIG. 45(C) when the 'paste before' menu is selected. The cut page 4302 is pasted after the note 4504 selected in FIG. 45(C) when the 'paste after' menu is selected. Upon selection of the 'generate page' menu, a new page including the content of the cut page 4302 is generated. When the user taps a vacant region of the pop-up 4506, operation is performed as if a cancel menu is selected to remove the pop-up 4506 so as to return to the initial state of the page level.

Figure 46:
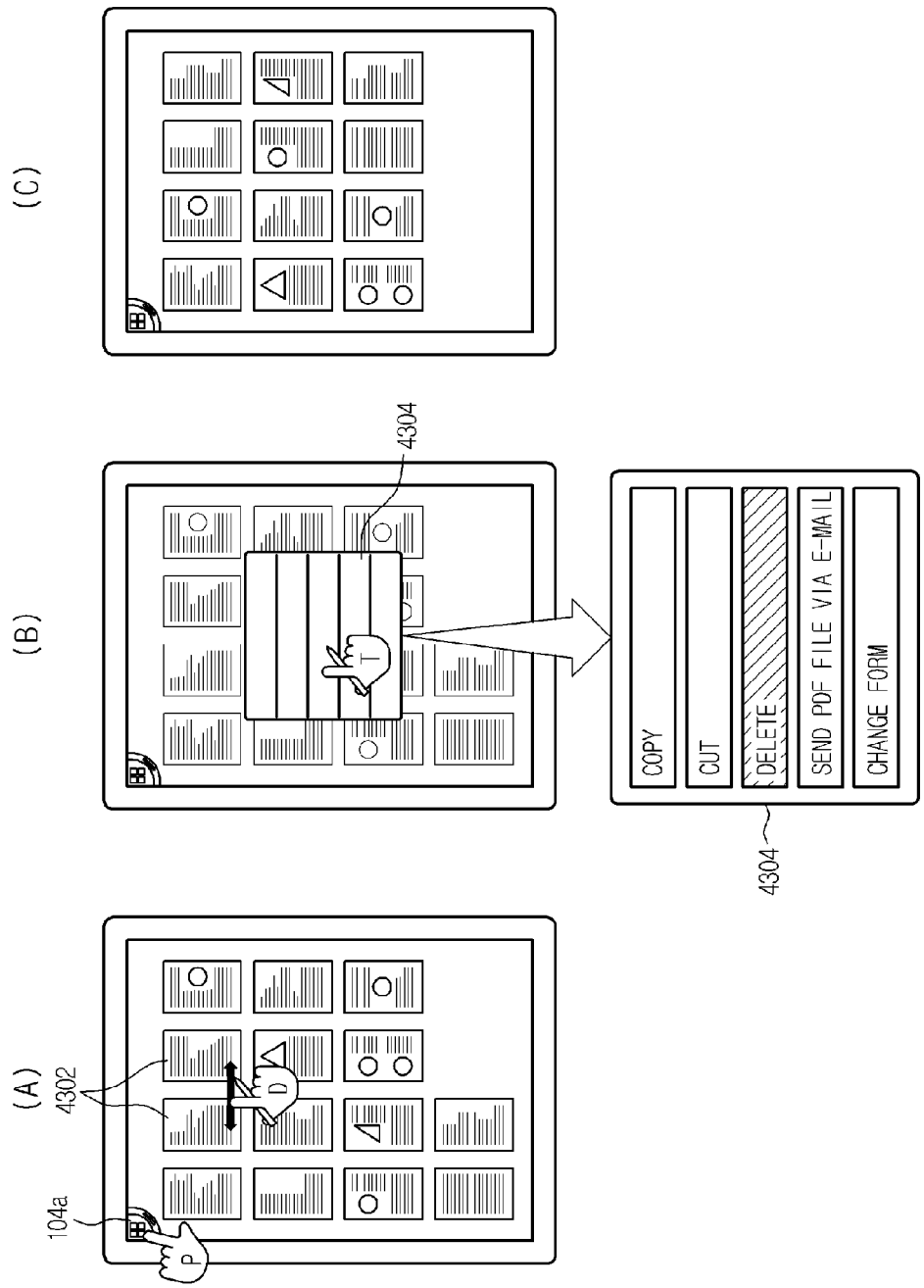
FIG. 46 illustrates a procedure of deleting a previously generated page at the page level when a 'delete' menu is selected from the pop-up shown in FIG. 43.

FIG. 46 illustrates a procedure of deleting a previously generated page at the page level when the 'delete' menu is selected from the pop-up 4304 shown in FIG. 32. As shown in FIG. 46, when the user selects at least one page 4302 to be deleted while pressing the expandable menu button 104a at the page level shown in FIG. 46(A), the pop-up 4304 described above with reference to FIG. 43 is generated, as shown in FIG. 46(B). When the user selects the 'delete' menu from the pop-up 4304, the page 4302 selected in FIG. 46(A) is deleted. That is, the selected page 4302 is deleted and other pages are aligned, as shown in FIG. 46(C).

Figure 47:
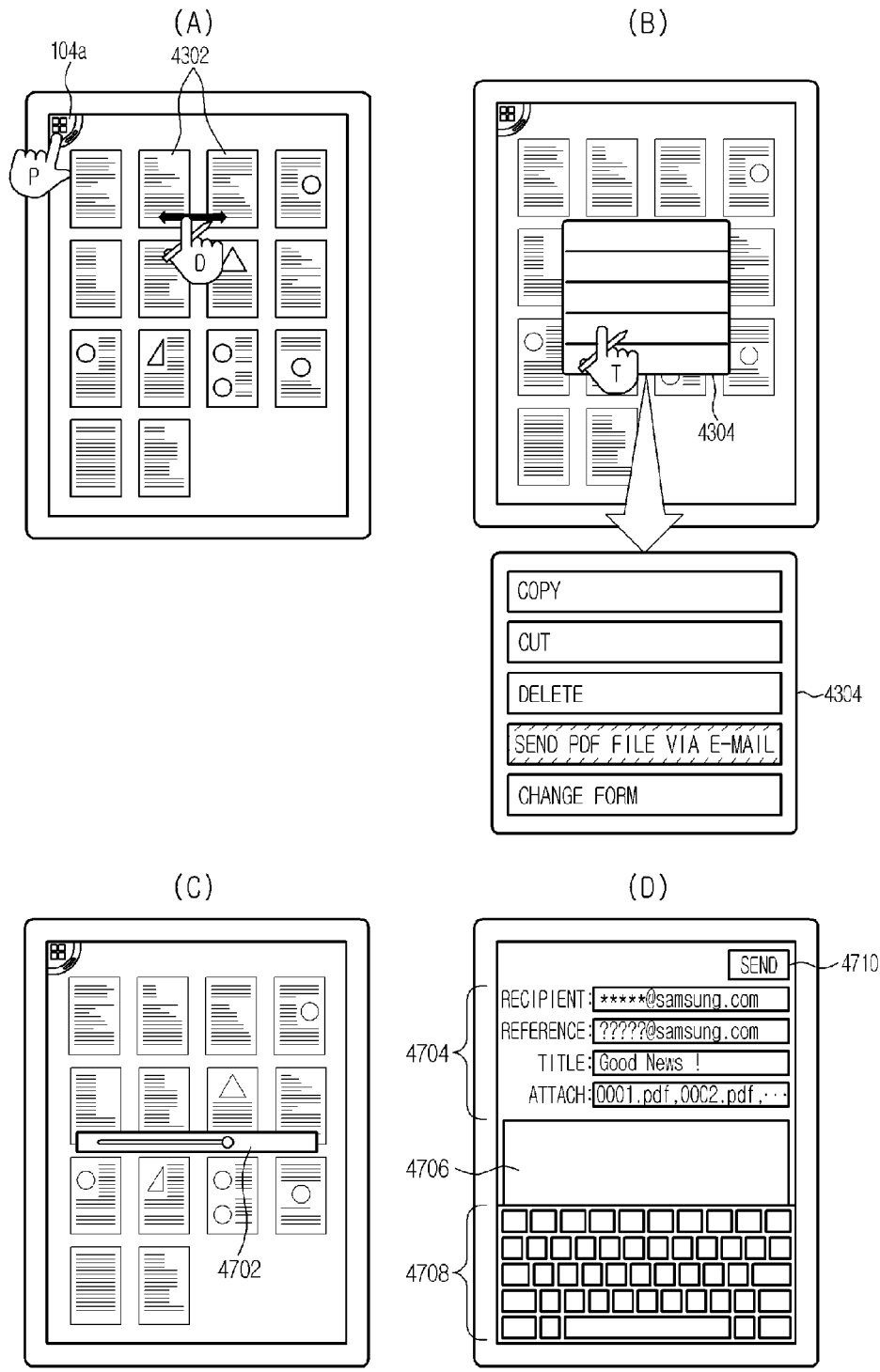
FIG. 47 illustrates a procedure of converting a previously generated page into a PDF file, attaching the PDF file to an e-mail and transmitting the e-mail at the page level when a 'send PDF file via e-mail' menu is selected from the pop-up shown in FIG. 43.

FIG. 47 illustrates a procedure of converting a previously generated page into a PDF file, attaching the PDF file to an e-mail and transmitting the e-mail at the page level when the 'send PDF file via e-mail' menu is selected from the pop-up 4304 shown in FIG. 43. In this case, the procedure of converting a selected page into a PDF file and attaching the PDF file to an e-mail can be performed through a simple operation. The tablet 100 according to an embodiment can access wired/wireless Internet through the communication unit 410. Accordingly, the user can send e-mail using the tablet 100 by registering an e-mail account in the tablet 100.

When the user wants to attach a page currently being generated or previously generated to an e-mail and transmit the e-mail, the user selects a page 4302 to be attached to an e-mail while pressing the expandable menu button 104a at the page level shown in FIG. 47(A). Then, the pop-up 4304 as described above with reference to FIG. 43 is generated, as shown in FIG. 47(B). Upon selection of the 'send PDF file via e-mail' menu from the pop-up 4304, a process of converting the selected page 4302 into a PDF file is displayed, as shown in FIG. 47(C). When conversion of the selected page 4302 into the PDF file is completed, an e-mail creation screen is automatically displayed, as shown in FIG. 47(D). The e-mail creation screen displays an e-mail account of a recipient, a reference e-mail account, a title, an input box 4704 for file attachment, a text input window 4706, and a virtual keyboard 4708. Upon completion of input of the recipient e-mail account, reference e-mail account, title and text and file attachment, the user can transmit the e-mail by tapping a send button 4710. It can be seen from the input box 4704 that PDF files under the titles of 00001.PDF and 00002.PDF are attached to the e-mail. The PDF file titles correspond to the file name of the note 4302 selected by the user for sending e-mail. That is, the page 4302 in the file names of 0001 and 0002 is converted into a PDF file and automatically attached to an e-mail. As shown in FIG. 47, when the user wants to attach content to an e-mail and send the e-mail, the user only selects the content and the 'send PDF file via e-mail' menu. Then, conversion of the content into a PDF file and attachment of the PDF file to the e-mail can be automatically performed, and thus e-mail sending operation can be completed rapidly and conveniently. Content is converted into a PDF file in order to allow the user to use a PDF viewer that is easily acquired through the Internet without using an additional execution application. Content can be converted into a file in a different format such as a JPG file instead of a PDF file and transmitted as necessary.

Figure 48:
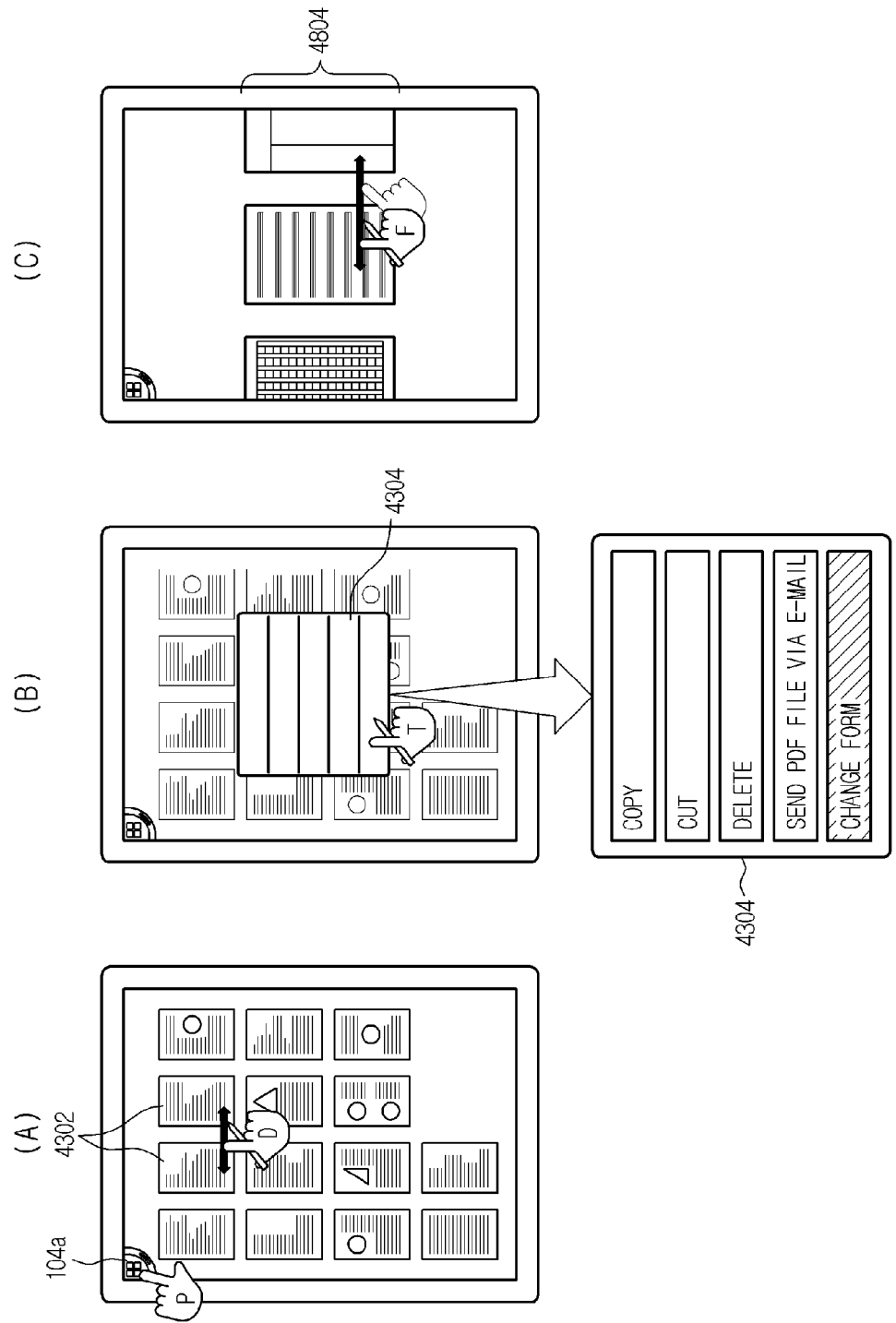
FIG. 48 illustrates a procedure of changing the form of a previously generated page at the page level when a 'change form' is selected from the pop-up shown in FIG. 43.

FIG. 48 illustrates a procedure of changing the form of a previously generated page at the page level when the 'change form' menu is selected from the pop-up 4304 shown in FIG. 43. As shown in FIG. 48, when the user selects a page 4802 whose form will be changed while pressing the expandable menu button 104a at the page level shown in FIG. 48(A), the pop-up 4304 as described above with reference to FIG. 43 is generated. Upon selection of the 'change form' menu from the pop-up 4304, as shown in FIG. 48(C), various forms 4804, provided by the tablet 100, are displayed as shown in FIG. 48(C). The user can check the designs of the forms 4804 while flicking the screen as if the user turns the pages of a book and select a desired form 4804. Examples of types of the forms 4804 may include a form in which a normal line is drawn, squared manuscript paper, manuscript paper for writing a music score, squared paper with a grid, paper for practicing writing, etc. In addition, many forms in a variety of designs can be provided. The forms 4804 may be provided as default by the tablet 100 or purchased in an online market. Otherwise, the forms 4804 may be custom-made forms customized by another user and distributed free/for a charge. When all forms cannot be displayed on one screen since there are too many types of forms, the user can check the forms by flicking the screen to the left or right as if turning the pages of a book.

Figure 49:
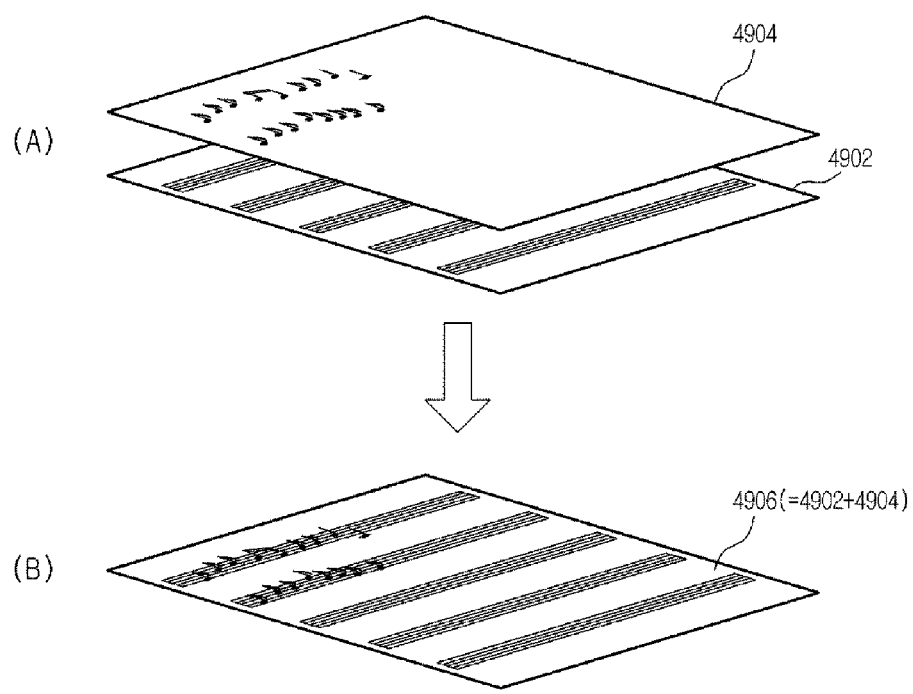
FIG. 49 shows a layer structure in the tablet according to an embodiment.

FIG. 49 shows a layer structure in the tablet 100 according to an embodiment. The layer structure of the tablet 100 according to an embodiment includes a first layer having content that is not added/corrected/deleted and a second layer having content that is added/corrected/deleted. As shown in FIG. 49, a page having a predetermined form (e.g. manuscript paper for writing a music score) is set as a background layer 4902 (first layer) and writing/drawing content of the user is set to a writing/drawing layer 4904 (second layer). While the background layer 4902 and the writing/drawing layer 4904 are displayed on the display 102 in a combined manner, addition/correction/deletion of content is performed only on the writing/drawing layer 4904. For example, if a score is written or corrected on the manuscript paper shown in FIG. 49, the score is drawn or corrected only on the writing/drawing layer 4904 while the form of the manuscript paper of the background layer 4902 is maintained. The background layer 4902 and the writing/drawing layer 4904 are integrated and handled as a single page unit although they are treated as different layers.

Figure 50:
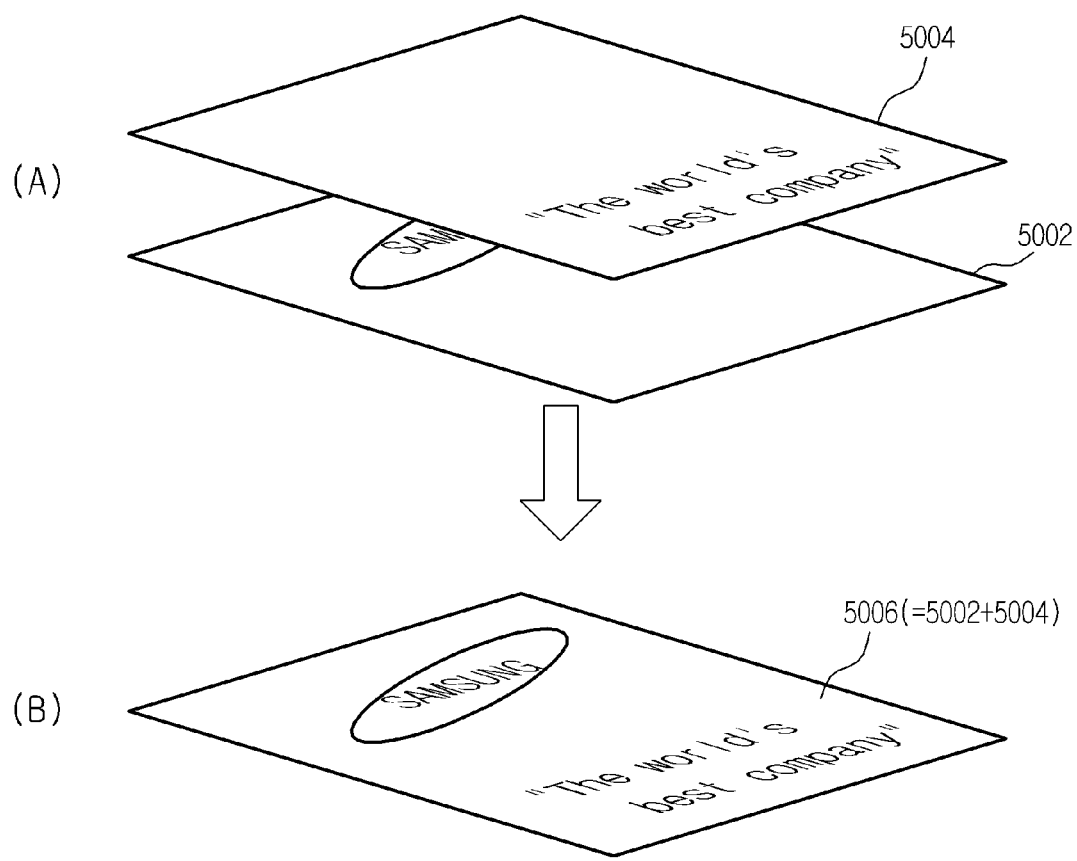
FIG. 50 shows a configuration of a writing/drawing layer having a previously generated text/image as a background layer.

FIG. 50 shows a configuration of a writing/drawing layer having a previously generated text/image as a background layer. In addition to the form shown in FIG. 49, a note may be added to a previously generated text/image or content may be added to the text/image. Referring to FIG. 50, a previously generated text/image is handled as a background layer 5002 and a note or content added to the text/image is handled as a writing/drawing layer 5004. The background layer 5002 and the writing/drawing layer 5004 are displayed in a combined state 5006 and integrated to be handled as a single page unit although they are treated as different layers.

Figure 51:
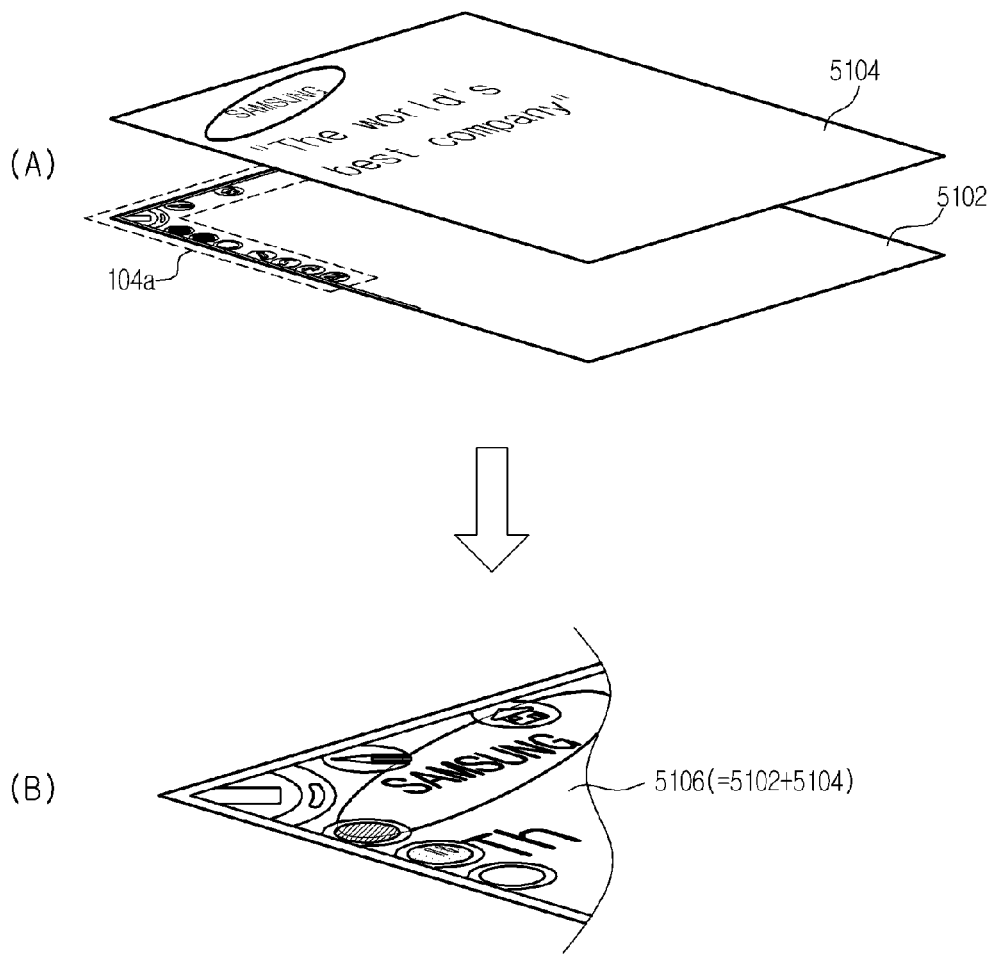
FIG. 51 shows an example of using the overall display area of the display as a writing/drawing area.

FIG. 51 shows an example of using the overall display area of the display 102 as a writing/drawing area. Referring to FIG. 51, a layer 5102 of the user interface 104*a* and a layer 5104 of a writing/drawing area are present on the display 102. In this manner, the layer 5102 for displaying the user interface 104*a* and the layer 5104 for writing/drawing are discriminated from each other such that the overall display area of the display 102 including the user interface 104*a* can be used as the writing/drawing area even though the user interface 104*a* is displayed on the display 102. In this case, the region in which the user interface 104*a* is displayed may respond only to touch-based input and the writing/drawing area may respond only to touch-based input. Accordingly, the overall screen of the display 102 can be used as the writing/drawing area, improving utilization of the display 102. In a region where the user interface 104*a* and writing/drawing content overlap, the user interface 104*a* may be displayed above the writing/drawing content. Otherwise, the user interface 104 may be displayed more distinctly and the writing/drawing content may be displayed less distinct (indistinctly). However, only the writing/drawing content are displayed in a region in which the user interface 104*a* is not displayed.

Figure 52:
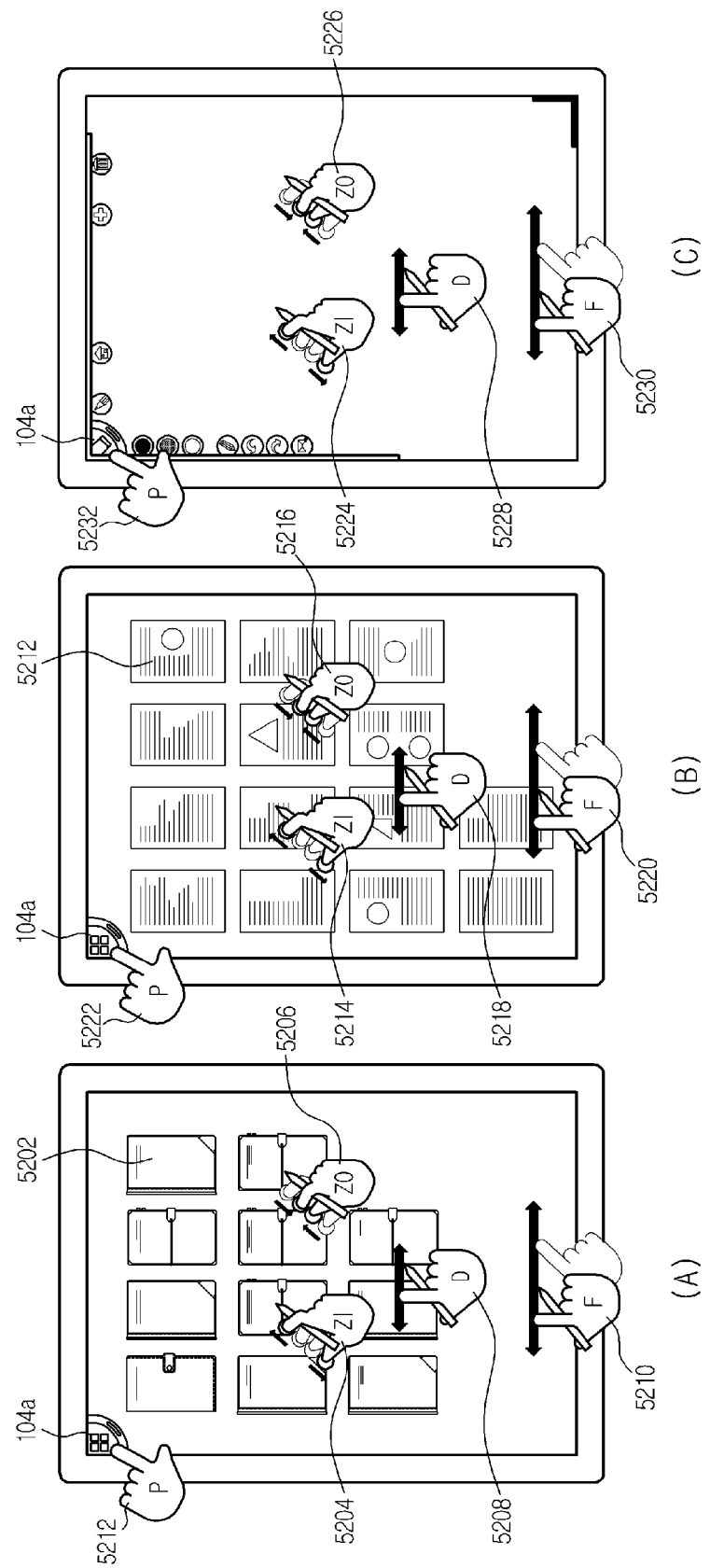
FIG. 52 shows operations in various forms according to combinations of the expandable menu button of the tablet touch operations.

FIG. 52 shows various interactions according to combinations of the expandable menu button 104*a* of the tablet 100 of an embodiment and touch operations. FIG. 52(A) shows interactions at the note level. Reference numerals 5204, 5206, 5208 and 5210 denote interactions using a hand gripping a pen (e.g. the right hand of a right-handed user) and 5212 represents an interaction using a hand not gripping a pen (e.g. the left hand of the right-handed user). The user can perform various operations through various interactions 5204, 5206, 5208 and 5210 using the right hand gripping the pen while pressing the expandable menu button 104*a* with the left hand not gripping a pen (5212). Reference numeral 5204 represents zoom-in operation performed by spreading closely spaced two fingers (e.g. thumb and middle finger or thumb and ring finger) of the hand gripping the pen away from each other. Reference numeral 5206 represents zoom-out operation performed by putting widely spaced two fingers (e.g. thumb and middle finger or thumb and ring finger) of the hand gripping the pen together. In this case, the number of notes displayed on the display 102 decreases in the order of 16, 4 and 1 according to zoom-in and increases in the order of 1, 4 and 16 according to zoom-out. Provided that 4 notes are displayed on the display 102, one note is displayed according to zoom-in and 16 notes are displayed according to zoom-out. Here, 1, 4 and 16 represent a maximum number of notes that can be displayed on one screen. If a total of the number of notes is smaller than the maximum number of notes that can be displayed in one screen, all notes are displayed on the display 102. Reference numeral 5208 represents a drag operation using one finger (e.g. index finger or middle finger) of the hand gripping a pen. In this case, while multi-selection is performed according to drag operation 5208 when the user presses the expandable menu button 104*a* with the hand not gripping a pen, an operation such as screen flicking according to flicking operation 5210 is performed when the user does not press the expandable menu button 104*a* with the hand not gripping a pen. However, a hand gripping the pen and a hand gripping no pen need not be discriminated from each other, and an interaction using a hand gripping the pen and an interaction using a hand gripping no pen may be distinguished from each other to provide a more convenient environment for using the tablet.

FIG. 52(B) shows interactions at the page level. Reference numerals 5214, 5216, 5218 and 5220 denote interactions using a hand gripping a pen (e.g. the right hand of a right-handed user) and 5222 represents an interaction using a hand not gripping a pen (e.g. the left hand of the right-handed user). The user can perform various operations through various interactions 5214, 5216, 5218 and 5220 using the right hand gripping the pen while pressing the expandable menu button 104*a* with the left hand not gripping a pen (5222). Reference numeral 5214 represents zoom-in operation performed by spreading closely spaced two fingers (e.g. thumb and middle finger or thumb and ring finger) of the hand gripping the pen away from each other. Reference numeral 5216 represents zoom-out operation performed by putting widely spaced two fingers (e.g. thumb and middle finger or thumb and ring finger) of the hand gripping the pen together. In this case, the number of pages displayed on the display 102 decreases in the order of 16, 4 and 1 according to zoom-in and increases in the order of 1, 4 and 16 according to zoom-out. Provided that 4 pages are displayed on the display 102, one page is displayed according to zoom-in and 16 pages are displayed according to zoom-out. Here, 1, 4 and 16 represent a maximum number of pages that can be displayed in one screen. If a total of the number of pages is smaller than the maximum number of pages that can be displayed in one screen, all pages are displayed on the display 102. Reference numeral 5218 represents a drag operation using one finger (e.g. index finger or middle finger) of the hand gripping the pen. In this case, while multi-selection is performed according to drag operation 5218 when the user presses the expandable menu button 104*a* with the hand not gripping a pen, an operation such as screen flicking according to flicking 5220 is performed when the user does not press the expandable menu button 104*a* with the hand not gripping a pen. However, a hand gripping the pen and a hand not gripping a pen need not be discriminated from each other, and an interaction using a hand gripping the pen and an interaction using a hand not gripping a pen may be distinguished from each other to provide a more convenient environment for using the tablet.

FIG. 52(C) shows interactions in a writing mode. Reference numerals 5224, 5226, 5228 and 5230 denote interactions using a hand gripping a pen (e.g. the right hand of a right-handed user) and 5232 represents an interaction using a hand not gripping a pen (e.g. the left hand of the right-handed user). The user can perform various operations through various interactions 5224, 5226 and 5228 using the right hand gripping the pen while pressing the expandable menu button 104*a* with the left hand not gripping a pen (5232). Reference numeral 5224 represents zoom-in operation performed by spreading closed spaced two fingers (e.g. thumb and middle finger or thumb and ring finger) of the hand gripping the pen away from each other. Reference numeral 5226 represents zoom-out operation performed by putting widely spaced two fingers (e.g. thumb and middle finger or thumb and ring finger) of the hand gripping the pen together. In this case, an input page displayed on the display 102 is enlarged according to zoom-in and reduced according to zoom-out. Reference numeral 5228 represents a drag operation using one finger (e.g. index finger or middle finger) of the hand gripping the pen. In this case, while multi-selection is performed according to drag-and-tap operation 5228 when the user presses the expandable menu button 104*a* with the hand not gripping a pen, an operation such as screen flicking according to flicking 5230 is performed when the user does not press the expandable menu button 104*a* with the hand not gripping a pen. However, a hand gripping the pen and a hand not gripping a pen need not be discriminated from each other, and an interaction using a hand gripping the pen and an interaction using a hand not gripping a pen may be distinguished from each other to provide a more convenient environment for using the tablet.

Figure 53:
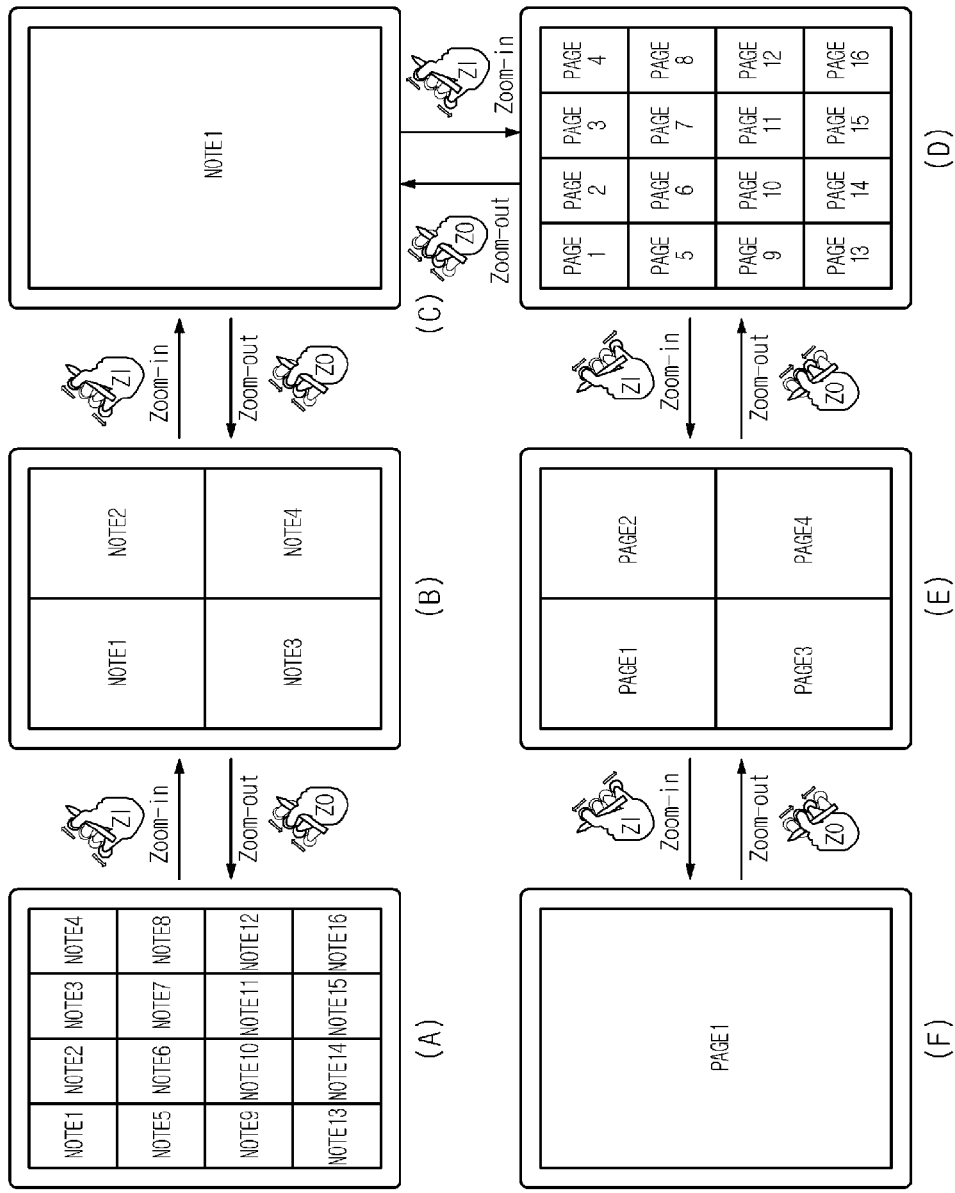
FIG. 53 shows screen display changes between the note level and the page level according to zoom-in and zoom-out.

FIG. 53 shows screen display changes between the note level and the page level according to zoom-in and zoom-out. As shown in FIGS. 53(A), 53(B) and 53(C), the number of notes displayed on the display 102 decreases in a predetermined order (16→4→1) according to zoom-in operation at the note level and increases in a predetermined order (1→4→16) according to zoom-out operation at the note level. When zoom-in operation is performed while one note is displayed on the display 102, a maximum of 16 pages corresponding to the note are displayed on the display 102, as shown in FIG. 53(D). If zoom-in is continuously performed in this state, the number of pages displayed on the display 102 gradually decreases from 16 to 4 and 1. That is, 16 notes, 4 notes, 1 note, 16 pages, 4 pages and 1 page are sequentially displayed according to continuous zoom-in operations. In the case of zoom-out, 1 page, 4 pages, 16 pages, 1 note, 4 notes and 16 notes are sequentially displayed according to continuous zoom-out operations. Here, 16, 4 and 1 represent a maximum number of notes/pages displayed on one screen, and currently present notes/pages are displayed on the display 102 if the number of stored notes/pages is smaller than the maximum number of notes/pages. For example, if 7 notes are currently present, the 7 notes are divided into two groups of 4 notes and 3 notes and the 4 notes and 3 notes are respectively displayed in two 4-note screens in the case of a 4-note screen, wherein all the 7 notes are displayed in one screen and a space corresponding to one note is vacant in the case of an 8-note screen.

Figure 54:
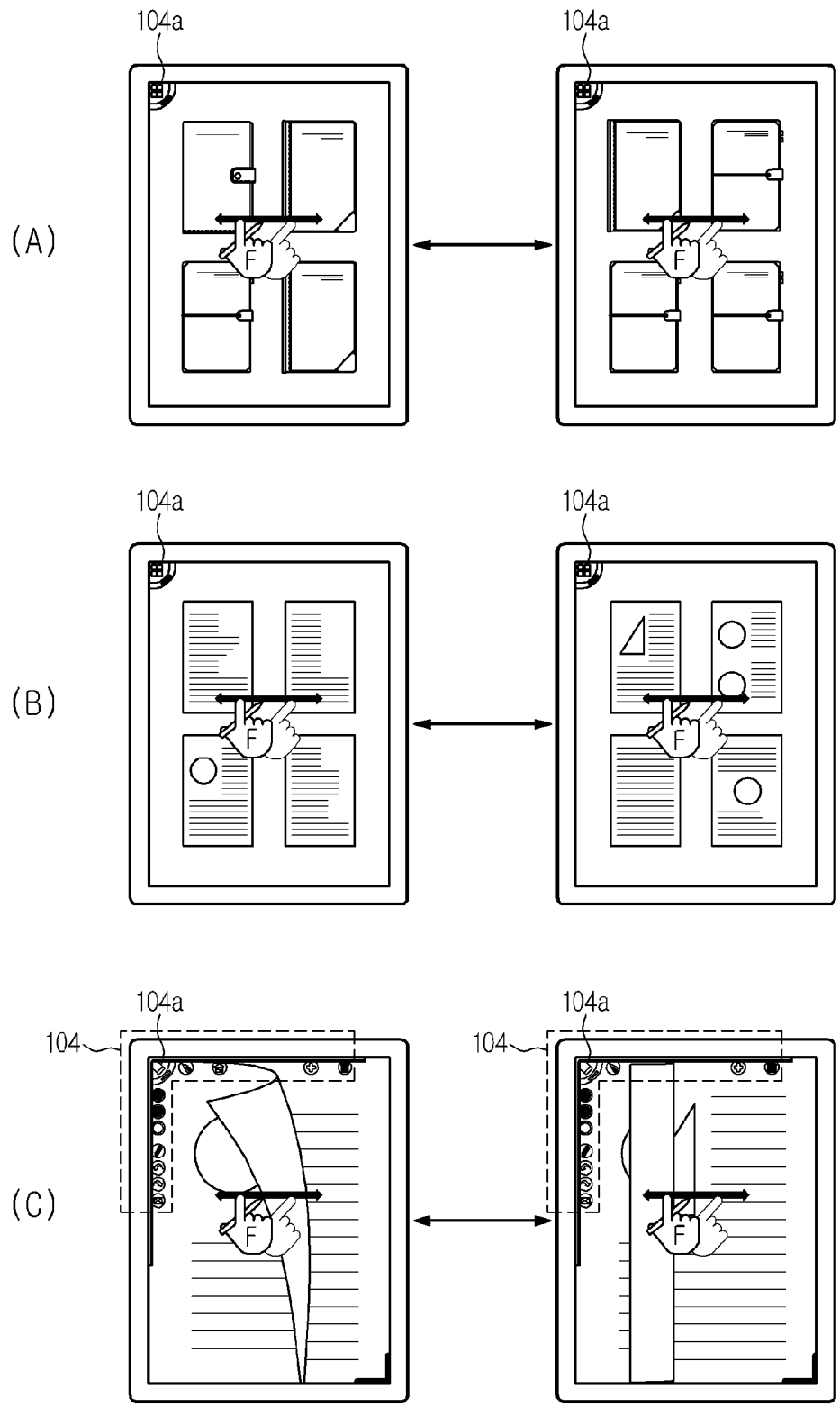
FIG. 54 illustrates a page turning procedure of the tablet of an embodiment.

FIG. 54 illustrates a screen flicking procedure of the tablet 100 of an embodiment. Referring to FIG. 54, the user may flick a screen according to flicking operation as shown in FIG. 54(A) without tapping or pressing the expandable menu button 104a. In FIG. 54(A), 4 notes are displayed in one screen and the 4 notes disappear from the display 102 according to flicking, and then 4 other notes are displayed. FIG. 54(B) shows flicking at the page level. Similar to the note level, the user may flick a screen according to flicking without tapping or pressing the expandable menu button 104a, as shown in FIG. 54(A). In FIG. 54(B), 4 pages are displayed on one screen and the 4 pages disappear from the display 102 according to flicking, and then 4 other pages are displayed. FIG. 54(C) shows page flicking when only one page is displayed on the display 102. In this case, page bending may be represented and flicking sound may be generated as if the user actually turns the page, providing a high degree of presence to the user. Furthermore, the expandable menu button 104a and the independent menu buttons 104b to 104m around the expandable menu button 104a can be automatically displayed in a single page display state in which writing input is possible at the page level, as shown in FIG. 54(C), improving user convenience. However, a hand gripping the pen and a hand not gripping no pen need not be discriminated from each other, and an interaction using a hand gripping the pen and an interaction using a hand not gripping a pen may be distinguished from each other to provide a more convenient environment for using the tablet.

Figure 55:
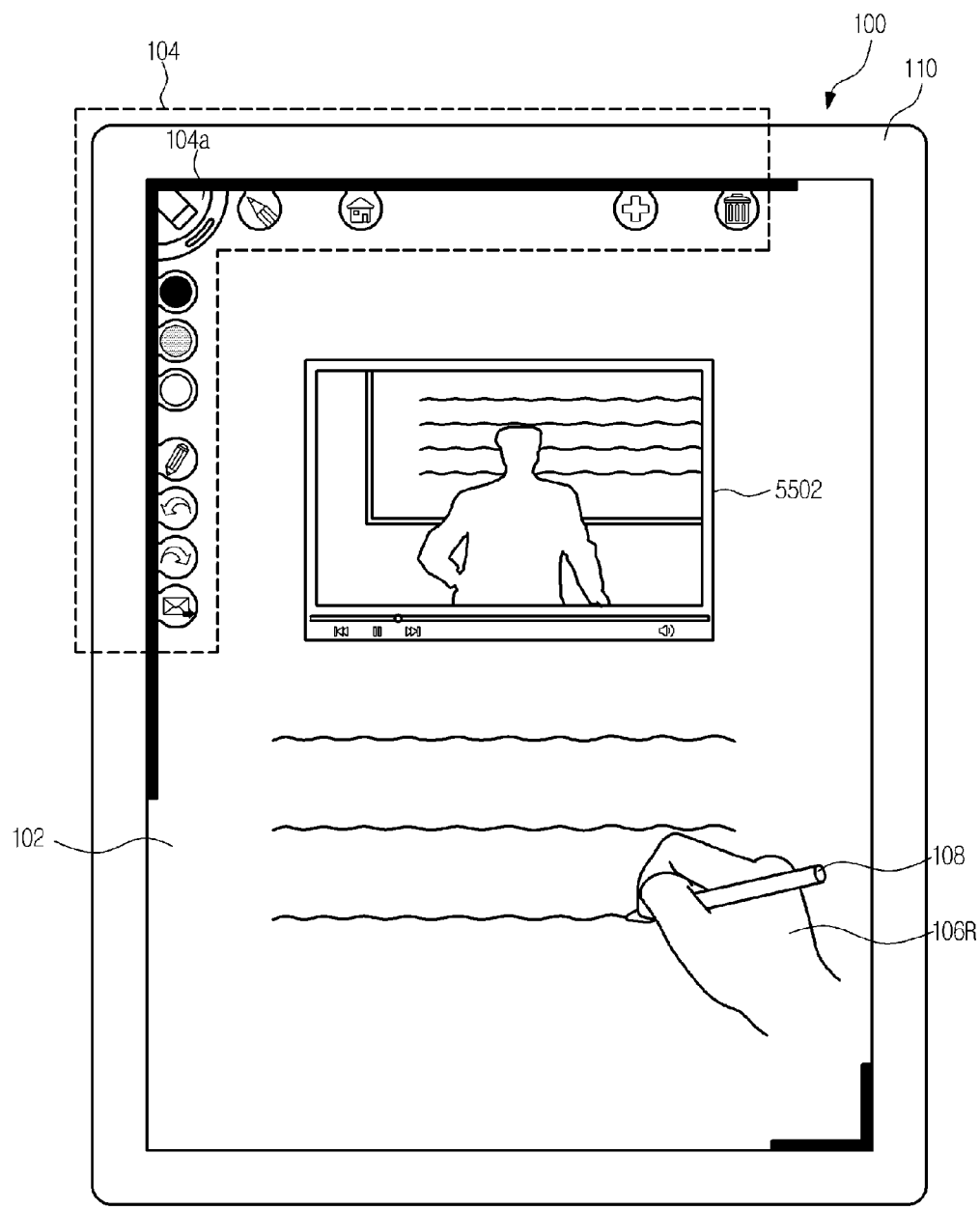
FIG. 55 illustrates a procedure of simultaneously performing video playback and writing/drawing in the tablet of an embodiment.

FIG. 55 illustrates a procedure of simultaneously performing video playback and writing/drawing in the tablet 100 of an embodiment. As shown in FIG. 55, a video 5502 can be played on a region of the display 102 and writing/drawing can be performed on a region other than the region in which the video 5502 is played during playback of the video 5502. According to this function, the user can make a note about the content of the video 5502 while watching the video 5502 or write about feeling or idea about the video 5502.

Processes, functions, methods, and/or software in apparatuses described herein may be recorded, stored, or fixed in one or more non-transitory computer-readable storage media (computer readable recording medium) that includes program instructions (computer readable instructions) to be implemented by a computer to cause one or more processors to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions may be executed by one or more processors or controllers. The described hardware devices may be configured to act as one or more software modules that are recorded, stored, or fixed in one or more computer-readable storage media, in order to perform the operations and methods described above, or vice versa. In addition, a non-transitory computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A portable electronic apparatus comprising:
    a touch display screen to display information and to receive a user input via at least one of pen-based input and touch-based input; and
    a controller operable to display a user interface on the touch display screen, the user interface including a handwriting region in which handwriting information can be input and an expandable menu changeable between an unexpanded state and an expanded state in which a plurality of user selectable color setting items associated with different colors are selectable from an expanded area of the expandable menu,
    wherein the expanded area of the expandable menu covers a portion of the handwriting region when the expandable menu is in the expanded state, and
    at least one of the plurality of user selectable color setting items is independently movable from the expanded area of the expandable menu to a location outside of the expanded area based on a user drag and drop input received via the touch display screen such that moved color setting items are available for user re-selection even when the expandable menu is in the unexpanded state.

2. The portable electronic apparatus according to claim 1, wherein the expandable menu in the unexpanded state is displayed at a top-left corner of the touch display screen, the expandable menu in the unexpanded state having a first convex border,
the expandable menu in the expanded state having a second convex border is displayed at the top-left corner of the touch display screen, a radius of curvature of the second convex border being larger than a radius of curvature of the first convex border.

3. The portable electronic apparatus according to claim 1, wherein the user interface further includes a first menu area extending vertically along a left side edge of the display area, the first menu area for containing a plurality of user selectable items which can be selected independent of the expandable menu.

4. The portable electronic apparatus according to claim 1, wherein the expandable menu in the unexpanded state is displayed at a top-right corner of the touch display screen, the expandable menu in the unexpanded state having a first convex border,
the expandable menu in the expanded state having a second convex border is displayed at the top-right corner of the touch display screen, a radius of curvature of the second convex border being larger than a radius of curvature of the first convex border.

5. The portable electronic apparatus according to claim 1, wherein a line thickness is selectable via the expandable menu in the expanded state, and
a selected line thickness setting is movable from the expanded area of the expandable menu to a location outside of the expanded area based on a user input received via the touch display screen such that the previously selected line thickness setting is available for user re-selection even when the expandable menu is in the unexpanded state.

6. The portable electronic apparatus according to claim 1, further comprising a bezel to support the touch display screen,
wherein at least two proximity sensors connected to the bezel for sensing approach of a right hand and a left hand, and
the controller determines whether to display the user interface in a right-hand user mode or in a left-hand user mode based on information from the at least two proximity sensors.

7. The portable electronic apparatus according to claim 1, further comprising a bezel to support the touch display screen,
wherein at least one proximity sensor connected to the bezel for sensing approach of a hand,
the expandable menu is not displayed on the touch display screen when the controller determines that the user hand is not within a predetermined distance of the bezel based on information from the proximity sensor, and
if the controller determines that a user hand is approaching the bezel based on information from the proximity sensor, the expandable menu is displayed on the touch display screen.

8. The portable electronic apparatus according to claim 3, wherein the controller receives a first input for deactivating the at least two proximity sensors, and deactivates the at least two proximity sensors in response to the first input, and
the controller receives a second input for activating the at least two proximity sensors and activates the at least two proximity sensors in response to the second input.

9. The portable electronic apparatus according to claim 1, wherein the user interface includes an expandable menu button having at least one lower menu button,
the expandable menu button is expanded when the expandable menu button is tapped.

10. The portable electronic apparatus according to claim 9, wherein, when the at least one lower menu button displayed in the expanded area of the expandable menu button is moved to the outside of the expanded area, the at least one lower menu button is converted into an independent menu button.

11. A method comprising:
displaying a user interface on a touch display screen of a portable electronic apparatus, the user interface including a handwriting region in which handwriting information can be input and an expandable menu changeable between an unexpanded state and an expanded state in which a plurality of user selectable color setting items associated with different colors are selectable from an expanded area of the expandable menu, wherein the expanded area of the expandable menu covers a portion of the handwriting region when the expandable menu is in the expanded state; and
moving at least one of the plurality of user selectable color setting items from the expanded area of the expandable menu to a location outside of the expanded area based on a user drag and drop input received via the touch display screen such that moved color setting items are available for user re-selection even when the expandable menu is in the unexpanded state.

12. The method according to claim 11, further comprising:
displaying the expandable menu in the unexpanded state at a top-left corner of the touch display screen, the expandable menu in the unexpanded state having a first convex border; and
displaying, at the top-left corner of the touch display screen, the expandable menu in the expanded state having a second convex border, a radius of curvature of the second convex border being larger than a radius of curvature of the first convex border.

13. The method according to claim 11, further comprising:
displaying a first menu area extending vertically along a left side edge of the display area, the first menu area for containing a plurality of user selectable items which can be selected independent of the expandable menu.

14. The method according to claim 11, further comprising:
displaying a second menu area extending horizontally along a top side edge of the display area, the second menu area for containing a plurality of user selectable items which can be selected independent of the expandable menu.

15. The method according to claim 11, further comprising:
displaying the expandable menu in the unexpanded state at a top-right corner of the touch display screen, the expandable menu in the unexpanded state having a first convex border; and
displaying, at the top-right corner of the touch display screen, the expandable menu in the expanded state having a second convex border, a radius of curvature of the second convex border being larger than a radius of curvature of the first convex border.

16. The method according to claim 11, further comprising:
enabling a line thickness to be selectable via the expandable menu in the expanded state; and
moving a selected line thickness setting from the expanded area of the expandable menu to a location outside of the expanded area based on a user input received via the touch display screen such that the previously selected line thickness setting is available for user re-selection even when the expandable menu is in the unexpanded state.

17. The method according to claim 11, further comprising
using two proximity sensors of the portable electronic apparatus for sensing approach of a right hand and a left hand;
determining whether to display the user interface in a right-hand user mode or in a left-hand user mode based on information from the two proximity sensors;
displaying a plurality of frequently useable items of the user interface on a left side region of the touch display screen in the right-hand user mode; and
displaying the plurality of frequently useable items of the user interface on a right side region of the touch display screen in the left-hand user mode.

18. The method according to claim 11, further comprising:
using a proximity sensor of the portable electronic apparatus for sensing approach of a hand,
determining whether the hand is not within a predetermined distance of the proximity sensor based on information therefrom;
removing the expandable menu from the user interface on the touch display screen when it is determined that the hand is not within a predetermined distance based on information from the proximity sensor, and
re-displaying the expandable menu on the user interface if it is determined that a user hand is approaching the proximity sensor based on information from the proximity sensor.

19. The method according to claim 11, wherein the user interface includes an expandable menu button having at least one lower menu button,
the expandable menu button is expanded when the expandable menu button is tapped.

20. The method according to claim 19, wherein, when the at least one lower menu button displayed in the expanded area of the expandable menu button is moved to the outside of the expanded area, the at least one lower menu button is converted into an independent menu button.

* * * * *